United States Patent [19]

Sumita et al.

[11] Patent Number: 5,907,841
[45] Date of Patent: May 25, 1999

[54] DOCUMENT DETECTION SYSTEM WITH IMPROVED DOCUMENT DETECTION EFFICIENCY

[75] Inventors: Kazuo Sumita; Seiji Miike; Kenji Ono; Yoichi Takebayashi; Kimihito Takeda, all of Kanagawa-ken; Etsuo Ito, Saitama-ken, all of Japan

[73] Assignee: Kabushiki Kaisha Toshiba, Kawasaki, Japan

[21] Appl. No.: 08/690,931

[22] Filed: Aug. 1, 1996

Related U.S. Application Data

[63] Continuation of application No. 08/187,455, Jan. 28, 1994, abandoned.

[30] Foreign Application Priority Data

| Jan. 28, 1993 | [JP] | Japan | 5-012561 |
| Mar. 17, 1993 | [JP] | Japan | 5-056703 |
| Sep. 14, 1993 | [JP] | Japan | 5-250999 |

[51] Int. Cl.$^6$ .................................................. G06F 17/30
[52] U.S. Cl. ......................................... 707/6; 707/4; 707/5
[58] Field of Search .................................... 395/791, 793, 395/605; 707/1–5, 6

[56] References Cited

U.S. PATENT DOCUMENTS

| 5,020,019 | 5/1991 | Ogawa | 364/DIG. 2 |
| 5,099,426 | 3/1992 | Carlgreen et al. | 364/419 |
| 5,151,857 | 9/1992 | Matsui | 364/419 |
| 5,265,065 | 11/1993 | Turtle | 395/600 |
| 5,297,027 | 3/1994 | Morimoto et al. | 364/419.19 |
| 5,321,833 | 6/1994 | Chang et al. | 395/600 |
| 5,649,193 | 7/1997 | Sumita et al. | 395/614 |

FOREIGN PATENT DOCUMENTS

| 0 361 464 | 4/1990 | European Pat. Off. . |

OTHER PUBLICATIONS

"Automatic Construction of Networks of Concepts Characterizing Document Databases", Chen et al., IEEE transactions on Systems, Man, and Cybernetics, vol. 22, No. 5, Sep. 1992.

Wendlandt et al., "Incorporating a Semantic Analysis into a Document Retrieval Strategy", Oct. 1991, pp. 270–279.

Jacobs et al., "Natural Language Techniques for Intelligent Information Retrieval", Jun. 1988, pp. 85–99.

IBM Technical Disclosure Bullentin, "Intelligent Document Retrieval", vol. 34, No. 1, Jun. 1991, pp. 403–405.

Sembok et al., "Silol: A Simple Logical–Linguistc Document Retrieval System", Info. Proc. & Management, vol. 26, No. 1, (1990), pp. 111–134.

(List continued on next page.)

*Primary Examiner*—Thomas G. Black
*Assistant Examiner*—Hosain T. Alam
*Attorney, Agent, or Firm*—Foley & Lardner

[57] ABSTRACT

A document detection system capable of detecting a desired document from a large number of documents easily and accurately in which the user can make a judgement concerning the appropriateness of the detection result quickly. In the system, those documents which contain a semantic structure of a detection command containing natural language expressions entered by a user are detected. Also, the keywords of each document can be extracted from the summary of each document and those documents whose keywords match with detection keywords specified by a user can be detected. Also, the summary of each detected document can be automatically generated according to text structures of each detected document and displayed along with the detected document itself. Also, the detection processing can be carried out with respect to the summaries of the documents instead of the documents themselves.

2 Claims, 112 Drawing Sheets

OTHER PUBLICATIONS

Japanese Word Dictionary, EDR Technical Report, Japan Electronic Dictionary Research Institute, Ltd., pp. 27–33 (Apr. 1990).

Doi, M. et al., Research on Model Based Document Processing System Darwin, Interact, pp. 1101–1106 (1987).

Sumita, K. et al., "A Discourse Structure Analyzer for Japanese Text", Proceedings of the International Conference on Fifth Generation Computer Systems 1992, pp. 1133–1140.

Faloutsos, C., "Access Methods for Text", Computing Surveys, vol. 17, No. 1, pp. 49–74 (Mar. 1985).

Liddy, E. D. et al., Dr–Link, Document Retrieval Using Linguistic Knowledge, Project Description, ACM SIGIR Forum, vol. 26, No. 2, pp. 39–43 (1992).

FIG. 7

(a) INPUT SENTENCE : 実例を用いた機械翻訳について知りたい。
(WANT TO KNOW ABOUT MACHINE TRANSLATION USING EXAMPLE)

(b) MORPHOLOGICAL ANALYSIS RESULT : 実例/を/用いた/機械翻訳/について/知/りたい/。
(WANT/TO/KNOW/ABOUT/MACHINE TRANSLATION/USING/EXAMPLE)

(c) SYNTACTIC ANALYSIS RESULT : 実例→wo→用いる→rentai→機械翻訳→nitsuite→知る
(EXAMPLE→wo→USING→rentai→MACHINE TRANSLATION→nitsuite→KNOW)

(d) SEMANTIC ANALYSIS RESULT : 実例→instrument→機械翻訳→obj→知る
(EXAMPLE→instrument→MACHINE TRANSLATION→obj→KNOW)

(e) UNNECESSARY EXPRESSION EXTRACTION RULE APPLICATION RESULT : 実例→instrument→機械翻訳
(EXAMPLE→instrument→MACHINE TRANSLATION)

(f) CONTENT WORD EXTRACTION RESULT : 実例, 機械翻訳
(EXAMPLE, MACHINE TRANSLATION)

(g) DETECTION KEY PRODUCTION RESULT : 実例+機械翻訳
(EXAMPLE + MACHINE TRANSLATION)

FIG. 8

SYNTACTIC STRUCTURE : Noun—wo→mochiiru—rentai→Sahen-Noun
SEMANTIC STRUCTURE : Noun—instrument→Sahen-Noun

FIG. 9

STRUCTURE TO BE DELETED : —obj→知る
                               (—obj→KNOW)

FIG.12

| ADDRESS | HEAD CHARACTER STORAGE REGION | ADDRESS | SUBSEQUENT CHARACTER STORAGE REGION |
|---|---|---|---|
| 00053 | 機, 00935, 0, 0 | 00935 | 械, 01201, 0, file4 (34,35,72,86), 0 |
| 00091 | 実, 01003, 01004, 0, 0 | 01003 | 験, 0, file20 (4,13,19,43,91), file23 (16,20), 0 |
| 00092 | 自, 01091, 0, 0 | 01004 | 例, 0, file25 (11,18,42), file21 (23), 0 |
| 00131 | 翻, 0, 0 | 01091 | 動, 0, file25 (21), file30 (19,31,49), 0 |
| | | 01100 | 訳, 0, file25 (3,31), file21 (41), 0 |
| | | 01201 | 翻, 01309, 0, 0 |
| | | 01309 | 訳, 0, file25 (18,42), file21 (23), 0 |

FIG. 13

機械 (kikai) ： machine

実験 (jikken) ： experiment

実例 (jitsurei) ： example

自動 (jidou) ： automatic

翻訳 (honyaku) ： translation

機械翻訳 (kikai-honyaku) ： machine translation

| TARGET WORD | RELATION SYMBOL | SOURCE WORD | FILE NAME & SENTENCE No. |
|---|---|---|---|
| ≀ | ≀ | ≀ | ≀ |
| EXAMPLE | instrument | MACHINE TRANSLATION | file25 (18) ,file21 (23) ,··· |
| ≀ | ≀ | ≀ | ≀ |
| COMPUTER | instrument | TRANSLATION | file13 (83) ,file33 (2) ,··· |
| ≀ | ≀ | ≀ | ≀ |
| NATURAL LANGUAGE | object | TRANSLATION | file10 (41) ,file43 (52) ,··· |

FIG. 18

(a) TEXT STRUCTURE ((1 <EXTENSION> 2) <DIRECTION> 3)

(b) SENTENCES

① The advanced BWR that has been developed by us as a next BWR is our attempt for a superior light water reactor in which the reliability as well as the maintenance performance are improved, as expected for a next light water reactor.

② This ABWR has been employed as the sixth and seventh reactors at the K nuclear power plant for the first time in the world, and the governmental safety examination is currently in progress.

③ In the following, the features of the basic plant plan, the instrumental arrangement, and the main specification for the sixth and seventh reactors will be described.

FIG. 20

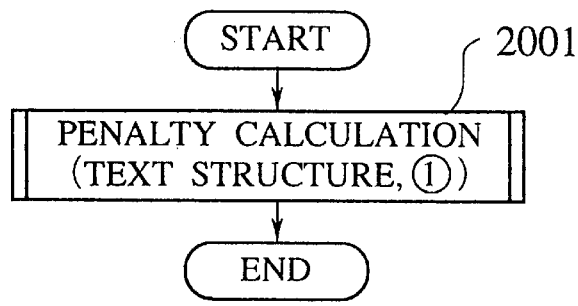

FIG.23

● Development of the K nuclear power plant
The advanced BWR (ABWR) that has been developed by us with concerted efforts in cooperation with U.S. EG Corp. as a next BWR is our attempt for a light water reactor which is economical as well as easy to use while further improving the reliability and safety as well as the rate of operation, operation performance, and maintenance performance, as expected for a next light water reactor.
In this paper, the specification of this ABWR will be described.

● Development of the K nuclear power plant
In this paper, the specification of the advanced BWR (ABWR) that has been developed by us with concerted efforts in cooperation with U.S. EG Corp. as a next BWR will be described.

| ORIGINAL SENTENCE POINTER 1 |
| SUMMARY POINTER 1 |
| SUMMARY SENTENCE NUMBER 1 |
| ORIGINAL SENTENCE POINTER 2 |
| SUMMARY POINTER 2 |
| SUMMARY SENTENCE NUMBER 2 |

FIG.24

| PRIORITY ORDER | CONDITIONS |
|---|---|
| 1 | Sentences containing keywords include ones coinciding with sentences in summary, and sentences containing semantic structures include ones coinciding with sentences in summary. |
| 2 | Sentences containing keywords include ones coinciding with sentences in summary, and sentences containing semantic structures include ones coinciding with sentences not in summary. |
| 3 | Sentences containing keywords do not coincide with any sentences in summary, and sentences containing semantic structures include ones coinciding with sentences not in summary. |
| 4 | Sentences containing keywords include ones coinciding with sentences in summary, and there is no sentence containing semantic structures. |
| 5 | Sentences containing keywords do not coincide with any sentences in summary, and there is no sentence containing semantic structures. |

FIG.25

DOCUMENTS & SENTENCES CONTAINING
KEYWORDS "EXAMPLE" & "MACHINE TRANSLATION"

: file7 (13,21) ,file13 (11,39) ,file21 (23) ,
file22 (39) ,file25 (18,42) ,file36 (9,14)

DOCUMENTS & SENTENCES CONTAINING
A STRUCTURE OF "EXAMPLE -instrument→MACHINE TRANSLATION"

: file7 (21) ,file21 (23) ,file25 (42)

SUMMARY SENTENCE No. IN
SUMMARY SENTENCE MEMORY file 7 : 11, 12, 26, 27, 28
file13 : 9, 10, 11, 42, 43, 44
file21 : 23, 24, 33, 34, 35
file22 : 42, 43, 44, 45
file25 : 10, 11, 12, 18, 19
file36 : 49, 50, 51, 52

FIG.26

| SERIAL No. | FILE NAME | DISPLAY PRIORITY ORDER | # OF DETECTIONS |
|---|---|---|---|
| 1 | file21 | 1 | 3 |
| 2 | file25 | 2 | 4 |
| 3 | file 7 | 3 | 1 |
| 4 | file13 | 4 | 2 |
| 5 | file36 | 5 | 2 |
| 6 | file22 | 5 | 1 |

FIG.29

| TARGET WORD | RELATION SYMBOL | SOURCE WORD |
|---|---|---|
| ⸹ | ⸹ | ⸹ |
| EXAMPLE | instrument | MACHINE TRANSLATION |
| NATURAL LANGUAGE | object | TRANSLATION |
| ⸹ | ⸹ | ⸹ |

FIG.27

| FILE NAME | DOCUMENT NAME | AUTHOR | ISSUE YEAR | PRINTED PUBLICATION | NUMBER OF DETECTIONS |
|---|---|---|---|---|---|
| file 7 | Natural Language Processing using Corpus | K. Yamada | 1988 | Prep. C Academy | 1 |
| file13 | Similarity Calculation Method for Translation Example | A. Sasaki | 1991 | Proc. A Society | 2 |
| file21 | Machine Translation based on Translation Example | M. Tanaka | 1992 | J. A Society | 3 |
| file22 | Natural Language Processing and Text Base | H. Noda | 1989 | J. B Society | 1 |
| file25 | Technical Trend in Machine Translation | T. Suzuki | 1990 | Proc. B Society | 4 |
| file36 | Application of Parallel Processing to Language Processing | K. Kobayashi | 1991 | Prep. D Academy | 2 |

FIG.28

The detected documents are as follows. There are 6 documents in total.

| SERIAL No. | DOCUMENT NAME | AUTHOR | ISSUE YEAR | PRINTED PUBLICATION | DISPLAY PRIORITY ORDER | # OF DETECTIONS |
|---|---|---|---|---|---|---|
| 1 | Machine Translation based on Translation Example | M. Tanaka | 1992 | J. A Society | 1 | 3 |
| 2 | Technical Trend in Machine Translation | T. Suzuki | 1990 | Proc. B Society | 2 | 4 |
| 3 | Natural Language Processing using Corpus | K. Yamada | 1988 | Prep. C Academy | 3 | 1 |
| 4 | Similarity Calculation Method for Translation Example | A. Sasaki | 1991 | Proc. A Society | 4 | 2 |
| 5 | Application of Parallel Processing to Language Processing | K. Kobayashi | 1991 | Prep. D Academy | 5 | 2 |
| 6 | Natural Language Processing and Text Base | H. Noda | 1989 | J. B Society | 5 | 1 |

FIG.31

| | |
|---|---|
| INPUT SENTENCE | : 計算機設計について知りたい。<br>(WANT TO KNOW ABOUT COMPUTER DESIGN) |
| MORPHOLOGICAL<br>ANALYSIS<br>RESULT | : 計算機/設計/について/知り/たい<br>(WANT / TO / KNOW / ABOUT / COMPUTER / DESIGN) |
| SYNTACTIC<br>ANALYSIS<br>RESULT | : 計算機→rentai→設計→nitsuite→知る<br>(COMPUTER→rentai→DESIGN→nitsuite→KNOW) |
| SYNTACTIC<br>ANALYSIS<br>RESULT | : 計算機→instrument→設計→object→知る<br>(COMPUTER→instrument→DESIGN→object→KNOW)<br>計算機→object→設計→object→知る<br>(COMPUTER→object→DESIGN→object→KNOW) |
| UNNECESSARY<br>EXPRESSION<br>EXTRACTION RULE<br>APPLICATION RESULT | : 計算機→instrument→設計<br>(COMPUTER→instrument→DESIGN)<br>計算機→object→設計 (COMPUTER→object→DESIGN) |

FIG.32A

| TARGET WORD | RELATION SYMBOL | SOURCE WORD | FILE NAME & SENTENCE No. |
|---|---|---|---|
| ≀ | ≀ | ≀ | ≀ |
| COMPUTER | instrument | DESIGN | file29 (43) ,file38 (11) ,··· |
| COMPUTER | object | DESIGN | file29 (43) ,file38 (11) ,··· |
| ≀ | ≀ | ≀ | ≀ |

FIG.32B

| TARGET WORD | RELATION SYMBOL | SOURCE WORD | FILE NAME & SENTENCE No. |
|---|---|---|---|
| ≀ | ≀ | ≀ | ≀ |
| COMPUTER | object | DESIGN | file29 (43) ,file38 (11) ,··· |
| ≀ | ≀ | ≀ | ≀ |

FIG. 34

INPUT SENTENCE : (計算機+パソコン) による (機械翻訳+自動翻訳) について知りたい。
(WANT TO KNOW ABOUT (MACHINE TRANSLATION+AUTOMATIC TRANSLATION) BY (COMPUTER+PERSONAL COMPUTER))

MORPHOLOGICAL : 計算機+パソコン/による/機械翻訳+自動翻訳/について/知り/たい
ANALYSIS (WANT/TO/KNOW/ABOUT/MACHINE TRANSLATION+AUTOMATIC
RESULT TRANSLATION/BY/COMPUTER+PERSONAL COMPUTER)

SYNTACTIC : (計算機+パソコン) —niyoru→ (機械翻訳+自動翻訳) —nitsuite→知る
ANALYSIS ((COMPUTER+PERSONAL COMPUTER) —niyoru→ (MACHINE
RESULT TRANSLATION+AUTOMATIC TRANSLATION) —nitsuite→KNOW)

SEMANTIC : (計算機+パソコン) —instrument→ (機械翻訳+自動翻訳) —object→知る
ANALYSIS RESULT ((COMPUTER+PERSONAL COMPUTER) —instrument→ (MACHINE
TRANSLATION+AUTOMATIC TRANSLATION) —object→KNOW)

UNNECESSARY : (計算機+パソコン) —instrument→ (機械翻訳+自動翻訳)
EXPRESSION ((COMPUTER+PERSONAL COMPUTER) —instrument→
EXTRACTION RULE (MACHINE TRANSLATION+AUTOMATIC TRANSLATION)
APPLICATION RESULT LOGIC OPERATOR : 計算機—instrument→機械翻訳
INTERPRETATION (COMPUTER—instrument→MACHINE TRANSLATION)
PROCESSING RESULT 計算機—instrument→自動翻訳
(COMPUTER—instrument→AUTOMATIC TRANSLATION)
パソコン—instrument→機械翻訳
(PERSONAL COMPUTER—instrument→MACHINE TRANSLATION)
パソコン—instrument→自動翻訳
(PERSONAL COMPUTER—instrument→AUTOMATIC TRANSLATION)

FIG.35

| INPUT SENTENCE : | 自然言語を翻訳することを目的とした何か。<br>(SOMETHING WHICH AIMED AT TRANSLATING NATURAL LANGUAGE) |
|---|---|
| MORPHOLOGICAL ANALYSIS RESULT | 自然言語/を/翻訳する/こと/を/目的/と/した/何か<br>(SOMETHING / WHICH / AIMED / AT / TRANSLATING / NATURAL LANGUAGE) |
| SYNTACTIC ANALYSIS RESULT | 自然言語−wo→翻訳する−wo→する−rentai→何か<br>　　　　　　　　　　　　　　　　↑<br>　　　　　　　　　　　　　　　goal<br>　　　　　　　　　　　　　　　　│<br>　　　　　　　　　　　　　　　目的<br><br>(NATURAL LANGUAGE−wo→TRANSLATING−wo→DO−rentai→SOMETHING)<br>　　↑<br>　goal<br>　　│<br>OBJECT |
| SEMANTIC ANALYSIS RESULT | 自然言語−object→翻訳する−goal→ ?<br>(NATURAL LANGUAGE−object→TRANSLATING−goal→ ? ) |

FIG.36

| | |
|---|---|
| INPUT SENTENCE: | 1980年以降の田中誠の機械翻訳の論文について知りたい。<br>(WANT TO KNOW ABOUT PAPERS OF M.TANAKA ON MACHINE TRANSLATION SINCE 1980) |
| MORPHOLOGICAL ANALYSIS RESULT | 1980/年/以降/の/田中誠/の/機械翻訳/の/論文/について/知/り/た/い。<br>(WANT / TO / KNOW / ABOUT / PAPERS / OF / M.TANAKA / ON / MACHINE TRANSLATION / SINCE / 1980) |
| SYNTACTIC ANALYSIS RESULT | 機械翻訳—rentai→論文—nitsuite→知る<br>(MACHINE TRANSLATION—rentai→ PAPERS—nitsuite→KNOW) |
| SEMANTIC ANALYSIS RESULT | 機械翻訳—reletion→論文—object→知る<br>(MACHINE TRANSLATION—reletion→ PAPERS—object→KNOW) |
| UNNECESSARY EXPRESSION EXTRACTION RULE APPLICATION RESULT | : 機械翻訳 (MACHINE TRANSLATION) |

FIG.37

```
CONDITION : 数値+「年」+「以降」
            "SINCE" +NUMERALS

ACTION : 文書の書誌事項中の発行年が数値以上の値
            であるものを検索する。
            LOOK UP THOSE DOCUMENTS WITH
            ISSUE YEAR NOT LESS THAN THE NUMERALS

CONDITION : 人名固有名詞+「の」
            "OF" +PERSON'S NAME

ACTION : 文書の書誌事項中の著者に人名固有名詞を
            含むものを検索する。
            LOOK UP THOSE DOCUMENTS WITH AUTHOR
            INCLUDING THE PERSON'S NAME
```

FIG.38

```
STRUCTURE TO BE DELETED : −object→知る (−object→KNOW)
STRUCTURE TO BE DELETED : 論文 (PAPERS)
```

FIG.39

| SCORE | CONDITIONS |
|---|---|
| 10 | Semantic structure is contained in the title. |
| 9 | Semantic structure is contained in the table of contents. |
| 8 | Keywords are contained in the title. |
| 7 | Keywords are contained in the table of contents. |
| 6 | Semantic structure is contained in sentences of the summary. |
| 5 | Keywords are contained in sentences of the summary. |
| 4 | Semantic structure is contained in the index. |
| 3 | Semantic structure is contained in the references. |
| 2 | Keywords are contained in the index. |
| 1 | Keywords are contained in the references. |

FIG.40

| TARGET WORD | RELATION SYMBOL | SOURCE WORD | FILE NAME & SENTENCE No. |
|---|---|---|---|
| ≀ | ≀ | ≀ | ≀ |
| COMPUTER | instrument | DESIGN | file71 (24) ,··· |
| COMPUTER | object | DESIGN | file83 (43) ,··· |
| ≀ | ≀ | ≀ | ≀ |

FIG.41

| TARGET WORD | RELATION SYMBOL | SOURCE WORD | FILE NAME & SENTENCE No. |
|---|---|---|---|
| ⟨ | ⟨ | ⟨ | ⟨ |
| EXAMPLE | instrument | MACHINE TRANSLATION | file25 (18) ,file21 (23) ,··· |
| EXAMPLE | object | ACCUMULATION | file21 (47) ,··· |
| ⟨ | ⟨ | ⟨ | ⟨ |

FIG.43

| CONDITION | VALUE |
|---|---|
| PART OF SPEECH | NOUN |
| PART OF SPEECH | VERB |

FIG.42

| # OF WORDS | WORD | RELATION SYMBOL | RELATED DIRECTION | WORD | RELATION SYMBOL | RELATED DIRECTION | WORD | FILE NAME & SENTENCE No. |
|---|---|---|---|---|---|---|---|---|
| ~ | ~ | ~ | ~ | ~ | ~ | ~ | ~ | ~ |
| 3 | LANGUAGE | object | > | TRANSLATE | goal | > | DEVICE | file54 (44), ... |
| ~ | ~ | ~ | ~ | ~ | ~ | ~ | ~ | ~ |

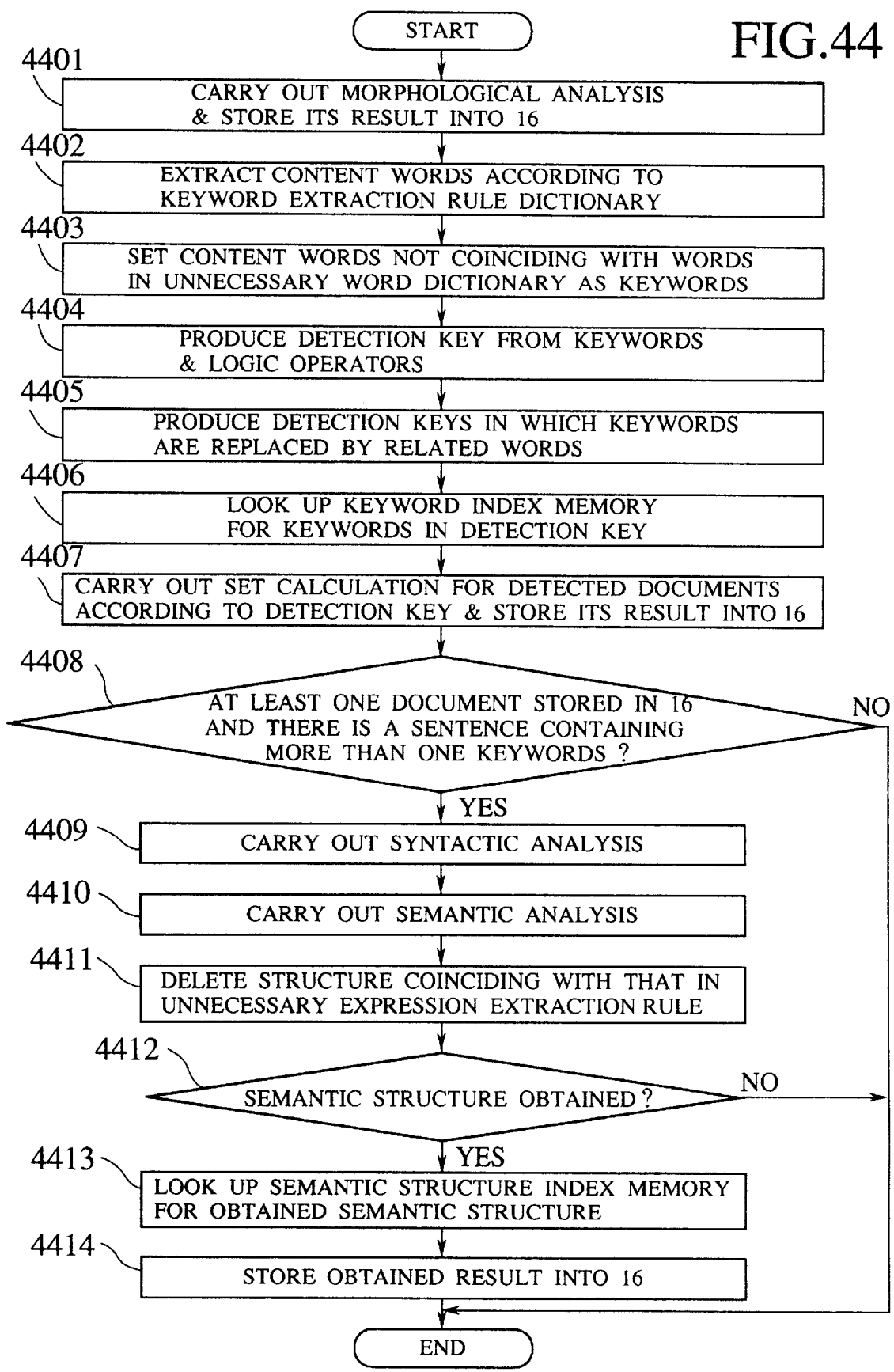

FIG.45

(a) SEMANTIC STRUCTURE OBTAINED FROM INPUT SENTENCE
計算機－instrument→設計 （COMPUTER－instrument→DESIGN）

(b) SEMANTIC STRUCTURE OBTAINED FROM DOCUMENT
計算機－instrument→体制 （COMPUTER－instrument→SYSTEM
```
            ↑                              ↑
         relation                       relation
            |                              |
          自動化                         AUTOMATION
            |                              |
           obj                            obj
            ↓                              ↓
          設計                           DESIGN
```

FIG.46

The detected documents are as follows. There are 6 documents in total.

| SERIAL No. | DOCUMENT NAME | AUTHOR | DISPLAY PRIORITY ORDER | SUMMARY RELIABILITY | # OF DETECTIONS |
|---|---|---|---|---|---|
| 1 | Machine Translation based on Translation Example | M. Tanaka | 1 | 5.6% | 3 |
| 2 | Technical Trend in Machine Translation | T. Suzuki | 2 | 3.1% | 4 |
| 3 | Natural Language Processing using Corpus | K. Yamada | 3 | 4.8% | 1 |
| 4 | Similarity Calculation Method for Translation Example | A. Sasaki | 4 | 1.5% | 2 |
| 5 | Application of Parallel Processing to Language Processing | K. Kobayashi | 5 | 3.1% | 2 |
| 6 | Natural Language Processing and Text Base | H. Noda | 5 | 2.8% | 1 |

FIG.48

⌈DETECTED DOCUMENT LIST⌋

Key computer DS6060 for engineering automation system

Author ： R.Kobayashi, Y.Kobayashi, T.Hayashi

High speed image processor TOSPIX−U

Author ： K.Kadoya, H.Yamamoto, A.Ohtani

CAD / CAM system for electrical design

Author ： K.Ishida

FIG.49

⌈SUMMARY⌋

Key Computer DS6060 for Engineering Automation System

R.Kobayashi, Y.Kobayashi, T.Hayashi

In our highly information oriented society, the construction of multifarious systems demands···

1 Introduction

In this paper, the hardware technology and the basic software of DS6060 will be described.

2 Advanced hardware 2. 1 High performance architecture

DS6060 is a super - mini - computer for EA
(Engineering Automation) and FA (Factory Automation) ,···

FIG.50

⌈ORIGINAL DOCUMENT⌋

Key Computer DS6060 for Engineering Automation System

R.Kobayashi, Y.Kobayashi, T.Hayashi

In our highly information oriented society, the construction of multifarious systems demands···

DS6060 is a key processor for EA (Engineering Automation) system supported by ···

FIG.52

「SUMMARY」

2. 1 High performance architecture

DS6060 is a super - mini - computer for EA (Engineering Automation) and FA (Factory Automation) ,···

2. 2 High speed hardware technology

DS6060 utilizes the advanced hardware technology to realize···

2. 2. 1 Latest VLSI technology

The CMOS / SOS (Silicon On Sapphire) gate array which is at the highest level in the world···

2. 2. 2 High - level parallel processing hardware

The instruction processing in each ACP is executed···

2. 2. 3 Rich operation processors

FIG.53

⌈ORIGINAL DOCUMENT⌋

2. 1 High performance architecture

DS6060 is a super - mini - computer for EA
(Engineering Automation) and FA (Factory Automation) ,···

(a) Object type multiprocessor

DS6060 adopts the multiprocessor scheme in which···

(b) Virtual memory control

The demand paging scheme is adopted···

FIG.56

⌈SUMMARY⌋

1 Introduction

> In this paper, the hardware technology and the basic software of DS6060 will be described.

2 Advanced hardware

2 . 1 High performance architecture

> DS6060 is a super-mini-computer for EA (Engineering Automation) and FA (Factory Automation) ···

2 . 2 High speed hardware technology

> DS6060 utilizes the advanced hardware technology to realize···

2 . 2 . 1 Latest VLSI technology

> The CMOS / SOS / (Silicon On Sapphire) gate array which is at the highest level in the world···

FIG.57

「ORIGINAL DOCUMENT」

1 Introduction

DS6060 is the newest computer developed by the combined efforts of our renowned semiconductor technique and our designing technique which is ⋯

FIG.58

[DETECTED DOCUMENT LIST]

Key computer DS6060 for engineering automation system
    Author : R. Kobayashi, Y. Kobayashi, T. Hayashi High speed image processor TOSPIX - U
    Author : K. Kadoya, H. Yamamoto, A. Ohtani CAD / CAM system for electrical design Author : K. Ishida

FIG.59

⌈SUMMARY⌋

CAD / CAM System for Electrical Design

K. Ishida

1 Introduction

In this paper, the outline and the function of ···

2 System outline and configuration

This system is centered around the automatic design function for digital circuit substrate ···

3 System function 3.1 Logical design and circuit diagram input

This is a part for inputting a printed substrate design ···

FIG.60

⌈ORIGINAL DOCUMENT⌋

CAD / CAM System for Electrical Design

K. Ishida

1 Introduction

In conjunction with the recent innovations in ···

2 System outline and configuration

This system is centered around the automatic design function for digital circuit substrate ···

The system comprises a central workstation ···

FIG.61

[ITEMS FOR SUMMARY DISPLAY]

- [✓] TITLE
- [ ] ENGLISH TITLE
- [ ] AUTHOR
- [ ] ENGLISH ABSTRACT
- [✓] CHAPTER / SECTION HEADER ─┬─ [✓] "INTRODUCTION"
- [✓] ABSTRACT OF CHAPTER ─────┼─ [✓] "CONCLUSION"
- [ ] REFERENCES                └─ [ ] ALL CHAPTERS

FIG.62

⌈SUMMARY⌋

CAD / CAM System for Electrical Design

1 Introduction
    In this paper, the outline and the function of ···

2 System outline and configuration

3 System function 3.1 Logical design and circuit diagram input 3.2 Automatic pattern design 3.3 Interactive pattern design 3.4 DRC function and CAM output 4 System function grade - up 5 Conclusion
    The CAD / CAM system for printed substrate described above is ···

FIG.64

| DISPLAYED SUMMARY SENTENCE NUMBER | CHARACTER POSITION RANGE | CORRESPONDING ORIGINAL DOCUMENT SENTENCE NUMBER |
|---|---|---|
| 1 | 1~13 | 1 |
| 2 | 14~19 | 4 |
| 3 | 20~83 | 5 |
| 4 | 84~94 | 8 |
| 5 | 95~102 | 16 |
| 6 | 103~106 | 32 |
| 7 | 117~135 | 64 |
| 8 | 136~159 | 92 |
| 9 | 160~174 | 128 |
| 10 | 175~185 | 156 |
| 11 | 186~191 | 204 |
| 12 | 192~320 | 215 |

FIG.65

⌈ORIGINAL DOCUMENT⌋

3 System function 3. 1 Logical design and circuit diagram input

This is a part for inputting a printed substrate design ⋯
As a basic function, it is equipped with ⋯
In addition, it is equipped with ⋯

3. 2 Automatic pattern design

In the automatic arranging processing ⋯

(a) INPUT SENTENCE

ON TOPICS FOR TRANSLATION BASED ON EXAMPLES (b) MORPHOLOGICAL ANALYSIS RESULT :

ON / TOPICS / FOR / TRANSLATION / BASED / ON / EXAMPLES (c) CONTENT WORD EXTRACTION RESULT :

TOPICS, TRANSLATION, EXAMPLES (d) KEYWORDS :

TRANSLATION, EXAMPLES

FIG.73

1
  The ABWR adopts various new technologies and new designs including an advanced control rod drive mechanism (ACRDM) in which operation performance and load follow - up performance are improved ⋯

2
  In this project, the main features of the ABWR such as the ACRDM were developed ⋯

FIG.77

| DOCUMENT ID | WORD 1 | POINTER 11 TO SENTENCE USING WORD 1 | POINTER 1 TO DEFINING SENTENCE OF WORD 1 |
|---|---|---|---|
| | WORD 1 | POINTER 12 TO SENTENCE USING WORD 2 | POINTER 1 TO DEFINING SENTENCE OF WORD 1 |
| | ~ | ~ | ~ |
| | WORD 2 | POINTER 21 TO SENTENCE USING WORD 2 | POINTER 2 TO DEFINING SENTENCE OF WORD 2 |
| | ~ | ~ | ~ |

FIG.78

| DOCUMENT ID | RELATION 1 | POSITION 1 | DOCUMENT NAME 1 |
|---|---|---|---|
| | RELATION 2 | POSITION 2 | DOCUMENT NAME 2 |
| | ~ | ~ | ~ |

| | | |
|---|---|---|
| 0000 | SERIAL RELATION | RIGHT |
| 0002 | EXAMPLE | LEFT |
| | DIRECTION | LEFT |
| | DIRECTION | RIGHT |
| | SERIAL RELATION | LEFT |
| | EXAMPLE | RIGHT |

FIG.84

| addr | value | | addr | value |
|---|---|---|---|---|
| 0000 | SERIAL RELATION | ← TEXT STRUCTURE. Rel | 0010 | 2 |
| | 0003 | ← TEXT STRUCTURE. L | | -1 |
| | 0008 | ← TEXT STRUCTURE. R | | -1 |
| | 0 | ← TEXT STRUCTURE. Level | | 2 |
| 0004 | EXAMPLE | | 0014 | 3 |
| | 000C | | | -1 |
| | 0010 | | | -1 |
| | 1 | | | 2 |
| 0008 | EXTENSION | | 0018 | 4 |
| | 0014 | | | -1 |
| | 0018 | | | -1 |
| | 1 | | | 2 |
| 000C | 1 | | | |
| | -1 | | | |
| | -1 | | | |
| | -2 | | | |

FIG.89A
FIG.89B
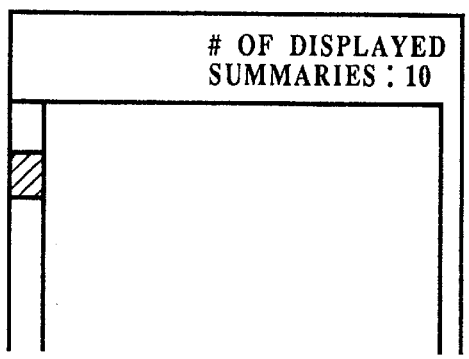
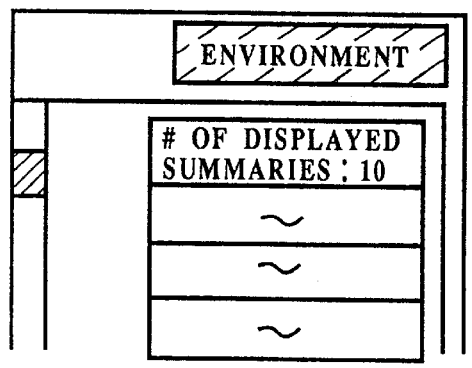
FIG.91A
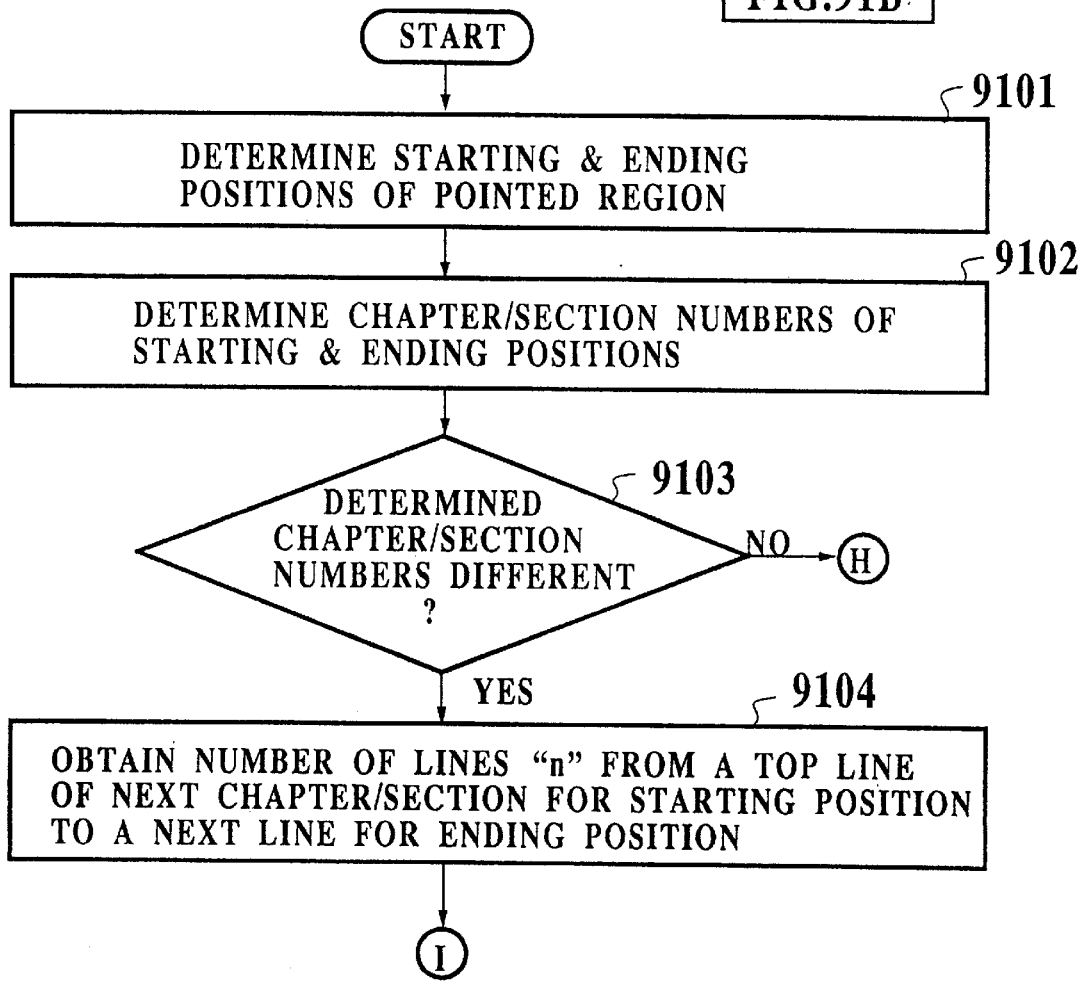

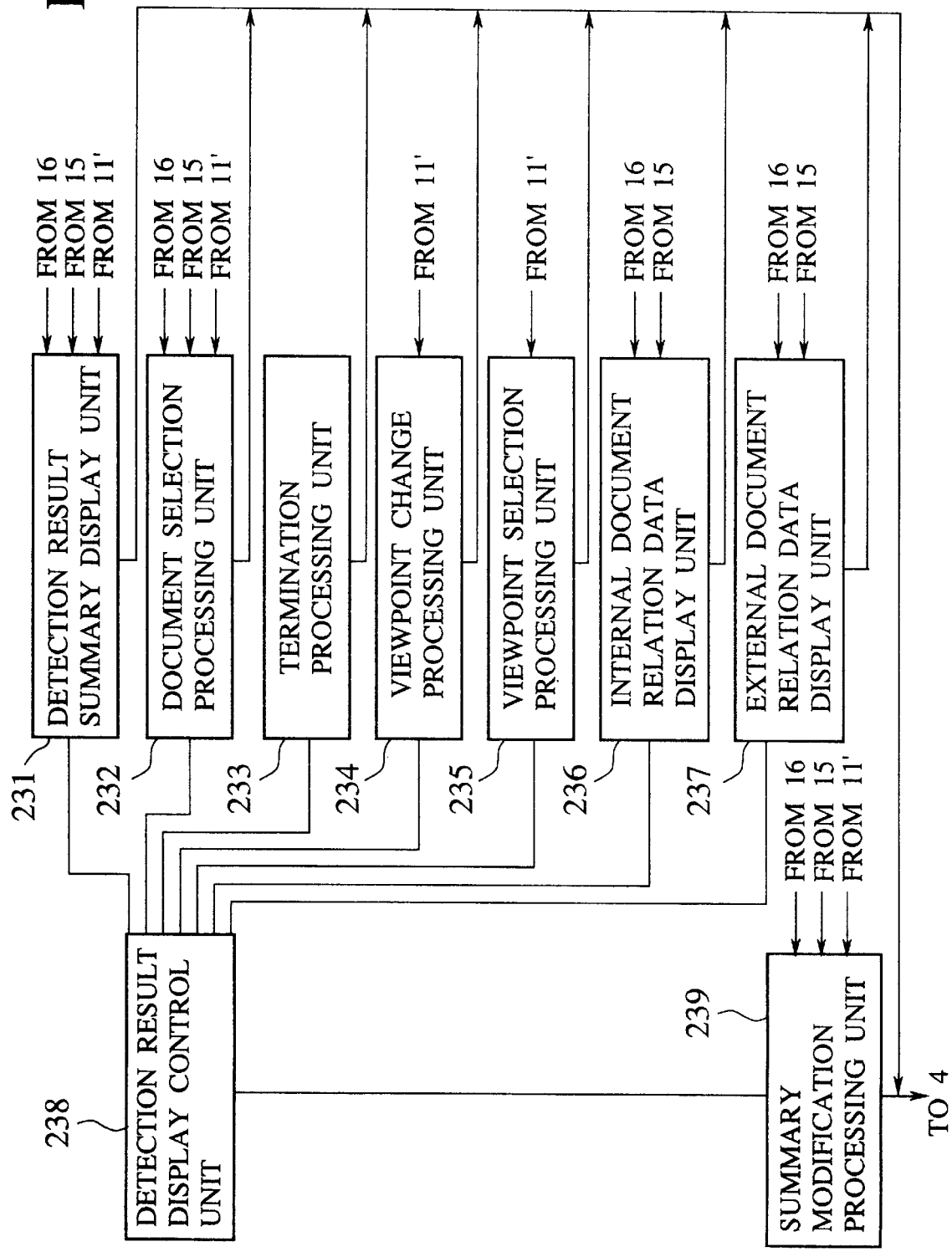

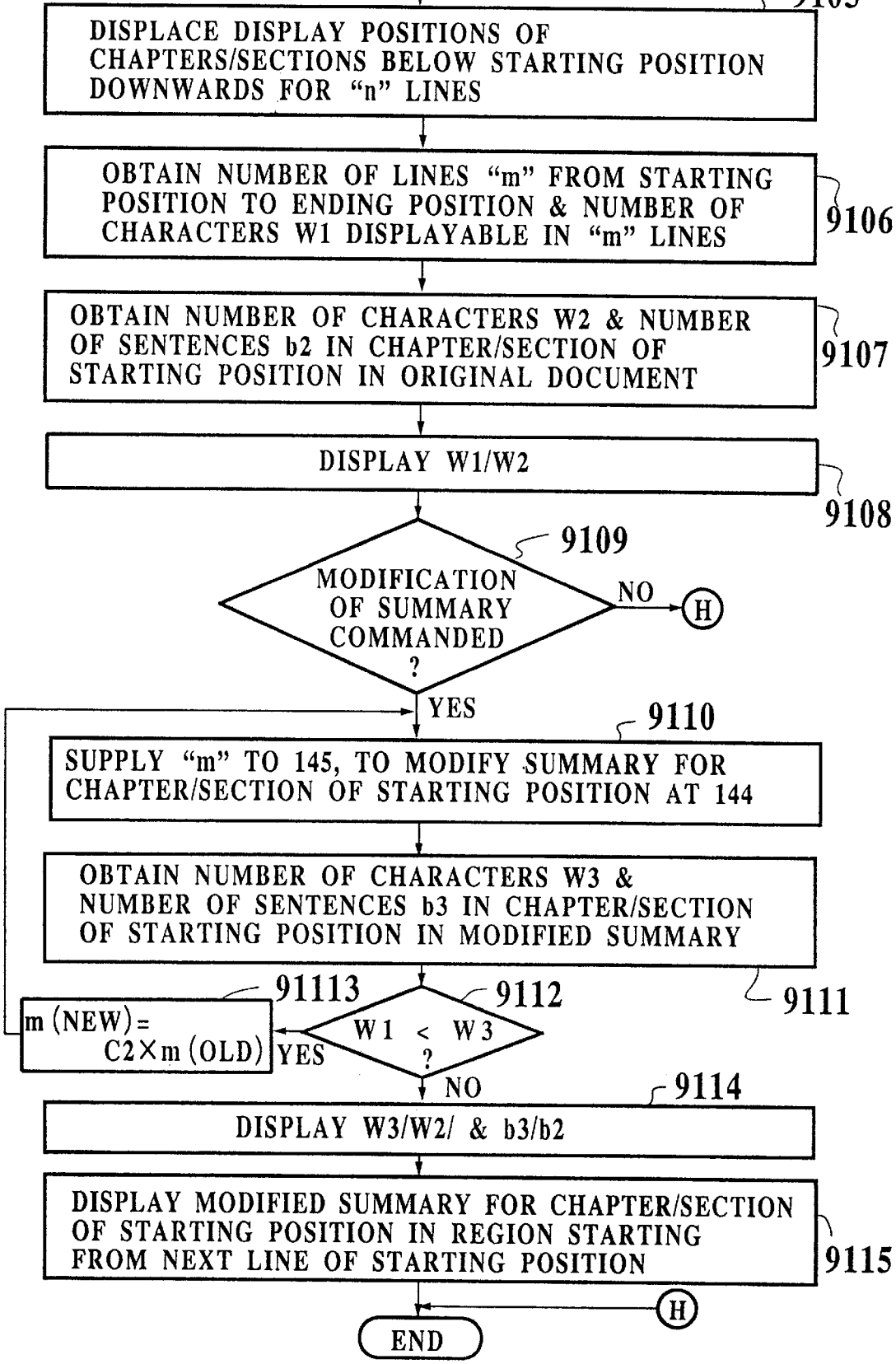

FIG.92

2. Classification of remote handling devices 2.1 Remote maintenance operation devices (Maintenance robots)
   These maintenance robots are required to be highly flexible and intelligent. In addition, the following conditions not required for industrial robots are required, so that there are many technological problems.
   Our company is committed to the new development to resolve these problems.

2.2 Remote measurement devices
   .
   .
   .
   .
   .

2.3 Remote inspection devices
   .
   .
   .
   .
   .

FIG.93

2. Classification of remote handling devices 2.1 Remote maintenance operation devices (Maintenance robots)
   These maintenance robots are required to be highly flexible and intelligent. In addition, the following conditions not required for industrial robots are required, so that there are many technological problems.
   Our company is committed to the new development to resolve these problems.

2.2 Remote measurement devices
   .
   .
   .
   .
   .

2.3 Remote inspection devices
   .
   .
   .
   .
   .

FIG.94

2. Classification of remote handling devices 2.1 Remote maintenance operation devices (Maintenance robots)
These maintenance robots are required to be highly flexible and intelligent. In addition, the of following conditions not required for industrial robots are required, so that there are many technological problems.

(1) Need for access functions to maintenance targets (2) Irregularity and complexity of maintenance targets
Our company is committed to the new development to resolve these problems.

2.2 Remote measurement devices
.
.
.
.

2.3 Remote inspection devices
.
.
.
.

FIG.97

1. Introduction
   ▲
2. Plant specification and main features
3. Features of construction work

.
   .
   .
   .

4. Outline of test running
5. Conclusion

| # OF SUMMARY SENTENCES | SUMMARY/ DOCUMENT RATIO |
|---|---|
| ☐ 2 | 15% |
| ☐ 4 | 31% |
| ☐ 7 | 54% |
| ☐ 10 | 77% |
| ☐ 13 | 100% |

FIG.98

1. Introduction
   ▲
2. Plant specification and main features
3. Features of construction work

.
   .
   .
   .

4. Outline of test running
5. Conclusion

| # OF SUMMARY SENTENCES | SUMMARY/ DOCUMENT RATIO |
|---|---|
| ☐ 2 | 15% |
| ☐ 4 | 31% |
| ■ 7 | 54% |
| ☐ 10 | 77% |
| ☐ 13 | 100% |

FIG.99

1. Introduction
    It was 1968 when our cooperative research with ・・・.
    Upon the decision by the governmental committee for ・・・.
    From the early '70's to the late '70's, the light water reactors of ・・・.
    Our company had strived for the establishment of ・・・. On the other hand, under the leadership of the ministry of ・・・.
    Based on such a background, our company has been proposing ・・・. During this period, we have contributed ・・・.

2. Plant specification and main features

3. Features of construction work

・
・
・
・

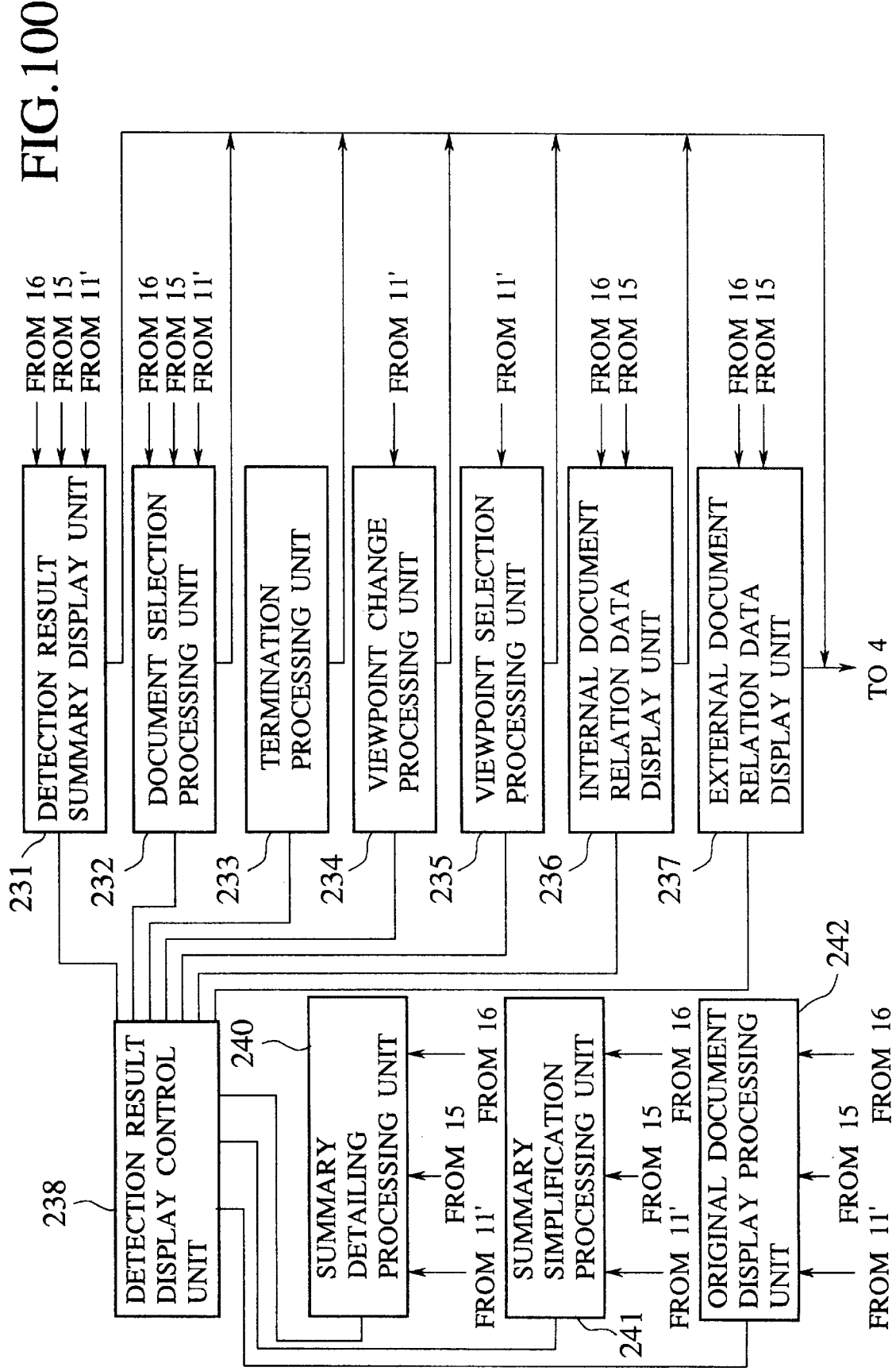

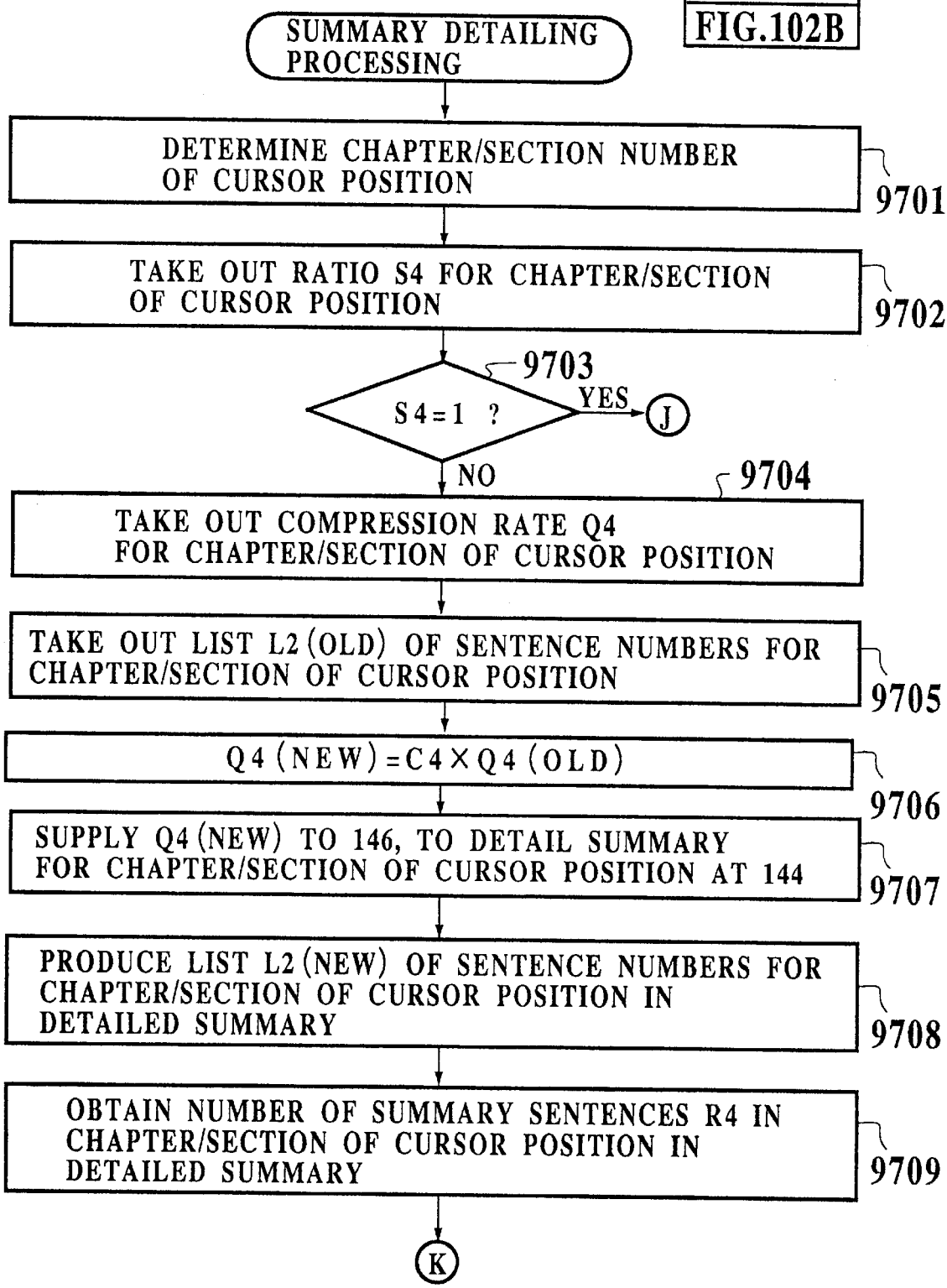

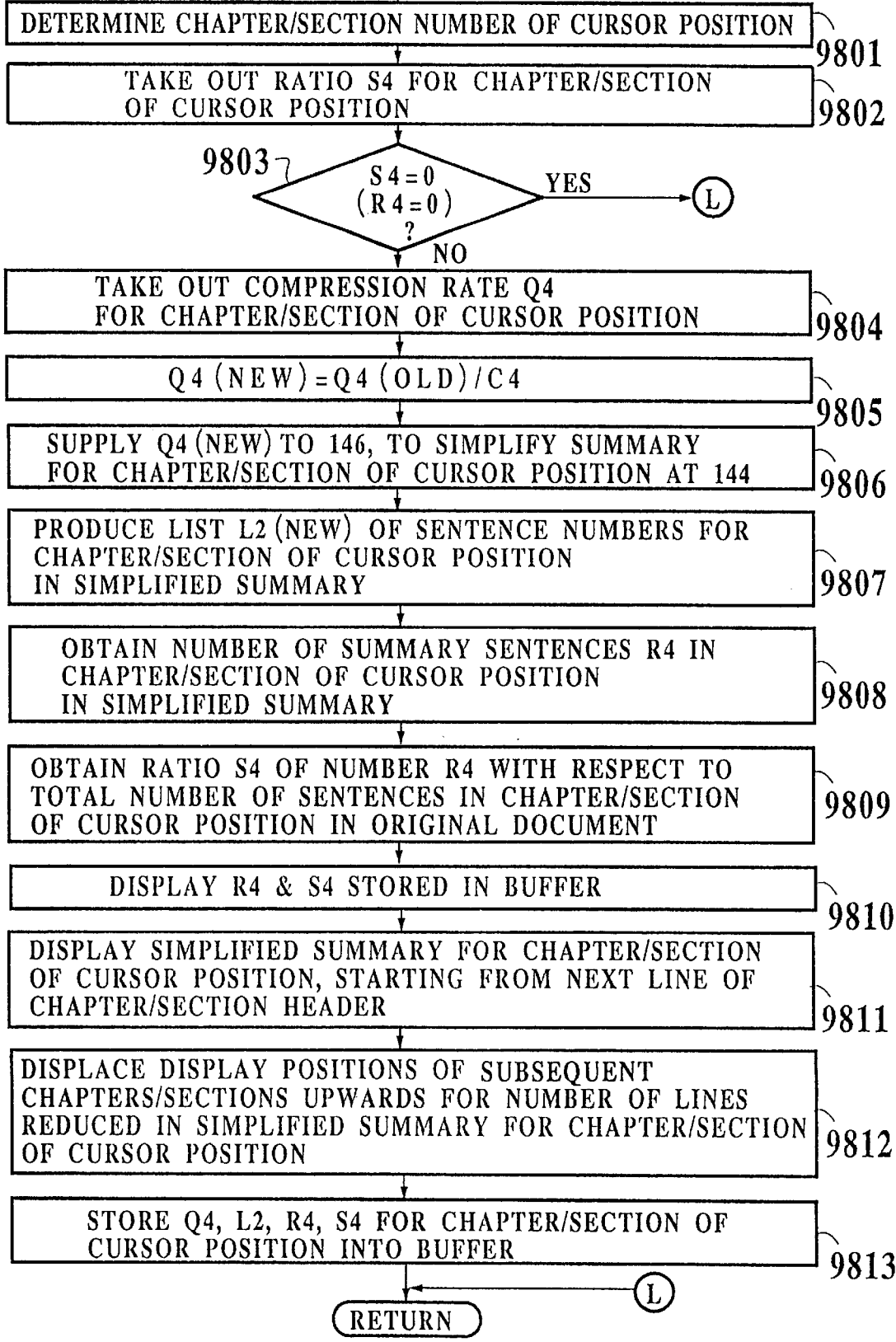

FIG.105

( DETAIL )  ( SIMPLE )  ( ORIGINAL )

CONSTRUCTION OF THE FIRST REACTOR AT THE X NUCLEAR POWER PLANT

J.Kaji (1), K.Fujita (2), Y.Takiguchi (3)

The first reactor at the X nuclear power plant is a BWR power station with · · · .

· · · · · ·

· · · · · · .

In addition to this first reactor at the X nuclear power plant, · · · .

1. Introduction

It was 1968 when our cooperative research with · · · .

During this period, we have contributed · · · .

2. Plant specification and main feature

3. Features of construction work

( DETAIL )  ( SIMPLE )  ( ORIGINAL )

CONSTRUCTION OF THE FIRST REACTOR AT THE X NUCLEAR POWER PLANT

J.Kaji (1), K.Fujita (2), Y.Takiguchi (3)

The first reactor at the X nuclear power plant is a BWR power station with · · · .

· · · · · ·

· · · · · · .

In addition to this first reactor at the X nuclear power plant, · · · .

1. Introduction

It was 1968 when our cooperative research with · · · .

Upon the decision by the governmental committee for · · · ,

Based on such a background our company has been proposing · · · . During this period, we have contributed · · · .

2. Plant specification and main features
3. Features of construction work

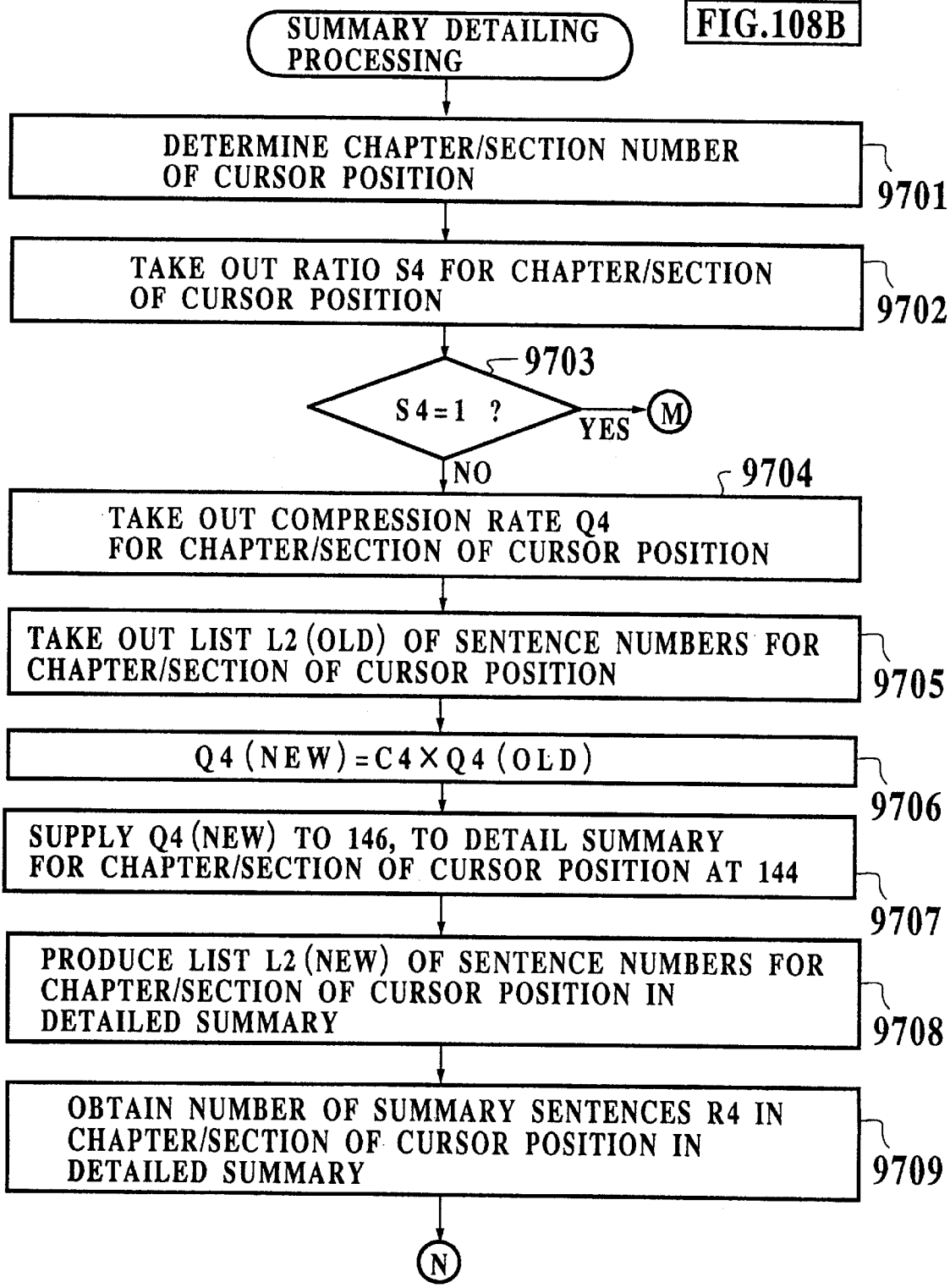

1. Introduction
   It was 1968 when our cooperative research with · · · ·.
   During this period, we have contributed · · · ·.

2. Plant specification and main features

3. Features of construction work

4. Outline test running

5. Conclusion

1. Introduction
   <mark>It was 1968 when our cooperative research with · · · ·.</mark> It was an era in which · · · ·.
   Upon the decision by the governmental committee for · · · ·.
   From the early '70's to the late '70's, the light water reactors of · · · ·.
   Also, the accident at the PWR power station in · · · ·.
   Our company had strived for the establishment of · · · ·. On the other hand, under the leadership of the ministry of · · · ·.
   Based on such a background, our company has been proposing · · · ·. The construction of the first reactor was · · · ·. <mark>During this period, we have contributed · · ·</mark>

·
   ·
   ·

1. Introduction
   The first reactor at the Y nuclear power plant (2F-1) which is · · · . Starting from this first reactor · · · .
   In parallel to the plannings and the constructions of these power stations, · · · .
   The mutual relationships among these improvements and developments are · · · .
   In this paper, the improvement and development technologies and · · · .

2. Current status and future 2.1 Improvement of reliability
   The BWR power stations in our nation have · · · . As for the power stations in constructions,
   · · · .

2.1.1 Improvement of safety of fuel
   The safety of fuel in the currently operating power stations has · · · .

FIG.112

| SENTENCE NUMBER | SENTENCE TYPE | PARAGRAPH NUMBER |
|---|---|---|
| 1 | CHAPTER HEADER | 0 |
| 2 | SENTENCE | 1 |
| 3 | SENTENCE | 1 |
| 4 | SENTENCE | 2 |
| 5 | SENTENCE | 3 |
| 6 | SENTENCE | 3 |
| 7 | CHAPTER HEADER | 0 |
| 8 | SECTION HEADER | 0 |
| 9 | SENTENCE | 4 |
| 10 | SENTENCE | 4 |
| 11 | SUB-SECTION HEADER | 0 |
| 12 | SENTENCE | 5 |

FIG.113

DOCUMENT DETECTION SYSTEM WITH IMPROVED DOCUMENT DETECTION EFFICIENCY

This application is a continuation of application Ser. No. 08/187,455, filed Jan. 28, 1994, now abandoned.

BACKGROUND OF THE INVENTION

1. Field of the Invention

The present invention relates to a document detection system for detecting desired documents from a large number of documents stored in a document database. It is to be noted that the term "retrieval" is often used in the literature of the field instead of the term "detection" used in the following description. The present specification adheres to the use of the term "detection" throughout.

2. Description of the Background Art

In recent years, due to the significant progress and spread of computers, the electronic manipulations of documents are becoming increasingly popular as in the electronic news and electronic mail systems and the CDROM publications of data sources such as dictionaries and encyclopedia that had only been available on papers, and it is expected that this trend of the electronic manipulations of documents will continue at an increasing pace in future.

In conjunction with such electronic manipulations of documents, much attentions have been attracted to a document detection system for detecting desired documents from a large number of documents efficiently, so as to enable the effective utilization of the documents stored in a database system in advance.

As a conventionally available document detection system, there has been a system which uses keywords in combination with logic operators such as AND, OR, NOT or proximity operators for specifying numbers of characters, sentences, and paragraphs that can exist between keywords, and detects a document by using a specified combination of keywords and operators as a detection key.

However, in such a conventional document detection system, it is not necessarily possible to detect the document that is truly desired by a user. Namely, in a case of employing the detection key using the logic operators, when the specified detection key is "computer AND designing", a document having a content of "designing by a computer" as well as a document having a content of "designing of a computer" can be detected, so that at least one of them will have a content irrelevant to a desired content. On the other hand, when the detection key using the proximity operators is employed, the detection is based solely on a physical distance between keywords, so that there is no guarantee that the detected document has a desired content.

Thus, in such a conventional document detection system, the detection result could contain many documents with contents actually irrelevant to the desired content, so that it has been necessary to use the detection key formed by as many keywords that are expected to be related to the desired content as possible. However, in practice, the detection result obtained by using such a detection key formed by a large number of disjunctive keywords would end up containing a considerable number of detection noises and Junks.

For this reason, the conventional document detection system requires an enormous amount of time for an user to single out the desired document by checking each of the detected documents one by one. On the other hand, if the detection key is formed by narrow keywords in order to reduce the number of the detection noises, the probability for the detection error would be increased.

As a result, in the conventional document detection system, it has been difficult to reduce the number of the detection noises without causing the detection error unless the user has a detailed knowledge concerning what kinds of keywords are contained in what kinds of documents, and consequently it has been formidably difficult for an ordinary user without such a detailed knowledge to handle the conventional document detection system effectively.

In addition, in the conventional document detection system, the detection result has been informed by displaying either a number of detected documents or titles of the detected documents alone, so that in order for the user to check each of the detected documents to see if it is the desired document or not, it has been necessary for the user to read the entire content of each of the detected documents one by one, and this operation has been enormously time consuming.

Moreover, in the conventional document detection system, in displaying the titles of the detected documents, the titles are simply arranged in a prescribed order according to the user's query such as an order of descending similarities to the keywords used in the detection key. For this reason, it has been impossible for the user to comprehend the relative relationships among the detected documents and the level of similarity with respect to the detection command for each of the detected documents from the displayed detection result, and consequently it has been difficult for the user to have an immediate impression for the appropriateness of the displayed detection result.

Furthermore, in the conventional document detection system, the detection scheme is limited to that in which each document as a whole is treated as a single entity, so that the document containing the desired content in the background section and the document containing the desired content in the conclusion section will be detected together in mixture. In other words, the detection result contains a variety of documents mixed regardless of viewpoints in which the desired contents appear in the documents. For example, if there is no interest in what had been done in the past, the detected document which matches with the given keywords in the background section will be of no use. Yet, in the conventional document detection system, the documents having different perspectives such as the document containing the desired content in the background section and the document containing the desired content in the conclusion section will not be distinguished, and the mixed presence of these documents in different perspectives makes it extremely difficult for the user to judge the appropriateness of the detection result.

In view of these problems, there has been a proposition for a scheme to reduce the burden on the user to read the entire content of each detected document by displaying only a portion of each detected document. However, in such a scheme, it is often impossible to make a proper judgement as to whether it is the desired document or not unless the relationship of the displayed portion and the remaining portion becomes apparent. For example, when the background section containing the desired content is displayed for one document while the conclusion section containing the desired content for the other document, as these documents cannot be comprehended in a unified viewpoint, it is difficult for the user to make a proper judgement as to which one of these document is the necessary one. As a result, in order to fully comprehend the perspectives of the displayed portions in these documents, the user would be forced to read the entire contents of these documents after all, so that it cannot contribute to the reduction of the burden on the user at all.

Also, there has been a proposition for a scheme to reduce the burden on the user to read the entire content of each detected document by providing a man-made document summary for each stored document in advance in correspondence to each stored document itself and displaying the document summary at a time of displaying the detection result. However, in such a scheme, an enormous amount of human effort is required for preparing the document summary for each document at a time of producing the database itself, which is not practically justifiable unless the database system has a remarkably high utilization rate. Moreover, there are many already existing database systems in which the document summary for each document is not provided, and an enormous amount of human efforts is similarly required for preparing the document summary for each document in such an already existing database system. In addition, the man-made document summary is produced in the very general viewpoint alone, so that there is no guarantee that each document is summarized from a viewpoint suitable for the required detection. As a result, the document summary displayed as the detection result can be quite out of point from the viewpoint of the user with the specific document detection objective, and in such a case, it is possible for the user to overlook the actually necessary document at a time of judging whether each detected document is the desired document or not.

SUMMARY OF THE INVENTION

It is therefore an object of the present invention to provide a document detection system capable of detecting a desired document from a large number of documents easily and accurately.

It is another object of the present invention to provide a document detection system capable of automatically preparing and displaying a document summary for each document in a viewpoint which is efficiently comprehensible for the user, considering the limited visual data processing ability of the human user, such that the user can make a judgement concerning the appropriateness of the detection result quickly.

According to one aspect of the present invention there is provided a document detection system, comprising: input analysis means for determining a semantic structure of a detection command containing natural language expressions entered by a user; document storage means for storing a plurality of detection target documents; and detection processing means for detecting those detection target documents stored in the document storage means which contain the semantic structure of the detection command determined by the input analysis means as detected documents.

According to another aspect of the present invention there is provided a document detection system, comprising: input means for entering a detection command containing detection keywords specified by a user; document storage means for storing a plurality of detection target documents; summary generation means for generating a summary of each detection target document stored in the document storage means, and extracting keywords of each detection target document from the summary of each detection target document; and detection processing means for detecting those detection target documents stored in the document storage means whose keywords extracted by the summary generation means match with the detection keywords in the detection command entered at the input means as detected documents.

According to another aspect of the present invention there is provided a document detection system, comprising: input means for entering a detection command specified by a user; document storage means for storing a plurality of detection target documents; detection processing means for detecting those detection target documents stored in the document storage means which match with the detection command entered at the input means as detected documents; summary generation means for automatically generating a summary of each detected document obtained by the detection processing means according to text structures of each detected document; and detection result output means for displaying each summary generated by the summary generation means.

According to another aspect of the present invention there is provided a document detection system, comprising: input means for entering a detection command specified by a user; document storage means for storing a plurality of detection target documents; summary generation means for generating summaries of the detected documents stored in the document storage means; summary storage means for storing the summaries generated by the summary generation means; and detection processing means for detecting those summaries stored in the summary storage means which match with the detection command entered at the input means.

Other features and advantages of the present invention will become apparent from the following description taken in conjunction with the accompanying drawings.

BRIEF DESCRIPTION OF THE DRAWINGS

FIG. 7 is a table of exemplary results obtained at various stages in the flow chart of FIG. 6.

FIG. 8 is a diagrammatic illustration of an exemplary semantic analysis rule used in the flow chart of FIG. 6.

FIG. 9 is a diagrammatic illustration of an exemplary unnecessary expression rule used in the flow chart of FIG. 6.

FIG. 12 is a diagrammatic illustration of an exemplary keyword index memory used in the flow chart of FIG. 11.

FIG. 13 is a list of selected Japanese-English correspondences useful in understanding the keyword index memory shown in FIG. 12.

FIG. 18 is a diagrammatic illustration of exemplary text structure and sentence handled in the summary generation unit of FIG. 17.

FIG. 20 is a schematic flow chart for a key sentence Judgement unit in the summary generation unit of FIG. 17.

FIG. 23 is a diagrammatic illustration of an exemplary summary sentence memory in an individual data storage unit in the main part of FIG. 2.

FIG. 24 is a table representing an exemplary display priority rule dictionary in the detection control unit shown in FIG. 2.

FIG. 25 is a diagrammatic illustration of an exemplary data content of the individual data storage unit shown in FIG. 2.

FIG. 26 is an illustration of an exemplary detection result display used in the system of FIG. 1.

FIG. 27 is a diagrammatic illustration of an exemplary data content for the detection result in the individual data storage unit shown in FIG. 2.

FIG. 28 is an illustration of an exemplary detection result screen display in the system of FIG. 1, for the exemplary data content of FIG. 27.

FIG. 29 is a table representing an exemplary analysis result learning dictionary in the detection control unit shown in FIG. 2.

FIG. 31 is a table of exemplary analysis results obtained by the input analysis unit shown in FIG. 2 in the first variation of the first embodiment.

FIGS. 32A and 32B are diagrammatic illustrations of an exemplary semantic structure index memory before and after the operation of FIG. 30, respectively.

FIG. 34 is a table of exemplary analysis results obtained by the input analysis unit shown in FIG. 2 in the second variation of the first embodiment.

FIG. 35 is a table of another exemplary analysis results obtained by the input analysis unit shown in FIG. 2 in the second variation of the first embodiment.

FIG. 36 is a table of exemplary analysis results obtained by the input analysis unit shown in FIG. 2 in the third variation of the first embodiment.

FIG. 37 is a diagrammatic illustration of an exemplary bibliographical matter analysis rules used in the fourth variation of the first embodiment.

FIG. 38 is a diagrammatic illustration of an exemplary unnecessary expression rule used in the fourth variation of the first embodiment.

FIG. 39 is a diagrammatic illustration of a display priority score conditions used in the fifth variation of the first embodiment.

FIG. 40 is a diagrammatic illustration of one exemplary semantic structure index memory in the fifth variation of the first embodiment.

FIG. 41 is a diagrammatic illustration of another exemplary semantic structure index memory in the fifth variation of the first embodiment.

FIG. 42 is a diagrammatic illustration of an exemplary semantic structure index memory in the sixth variation of the first embodiment.

FIG. 43 is a diagrammatic illustration of an exemplary keyword extraction rule dictionary used in the seventh variation of the first embodiment.

FIG. 44 is a flow chart for an operation of the input analysis unit and the detection processing unit shown in FIG. 2 in the seventh variation of the first embodiment.

FIG. 45 is a table of exemplary semantic structures handled in the eighth variation of the first embodiment.

FIG. 46 is an illustration of an exemplary detection result screen display used in the tenth variation of the first embodiment.

FIG. 48 is an illustration of an exemplary detection result display for a list of document identified in the fourteenth variation of the first embodiment.

FIG. 49 is an illustration of an exemplary detection result display for a summary in the fourteenth variation of the first embodiment.

FIG. 50 is an illustration of an exemplary detection result display for an original document in the fourteenth variation of the first embodiment.

FIG. 52 is an illustration of an exemplary detection result display for a summary in the fifteenth variation of the first embodiment.

FIG. 53 is an illustration of an exemplary detection result display for an original document in the fifteenth variation of the first embodiment.

FIG. 56 is an illustration of an exemplary detection result display for a summary in the fifteenth variation of the first embodiment in response to a next page button.

FIG. 57 is an illustration of an exemplary detection result display for an original document in the fifteenth variation of the first embodiment in response to a next page button.

FIG. 58 is an illustration of an exemplary detection result display for a list of document identified in the fifteenth variation of the first embodiment.

FIG. 59 is an illustration of an exemplary detection result display for a summary in the fifteenth variation of the first embodiment corresponding to the list of FIG. 58.

FIG. 60 is an illustration of an exemplary detection result display for an original document in the fifteenth variation of the first embodiment corresponding to the list of FIG. 58.

FIG. 61 is an illustration of an exemplary screen display for summary display item change command input used in the sixteenth variation of the first embodiment.

FIG. 62 is an illustration of an exemplary detection result display for a summary in the sixteenth variation of the first embodiment.

FIG. 64 is a diagrammatic illustration of an exemplary summary sentence table used in the sixteenth variation of the first embodiment.

FIG. 65 is an illustration of an exemplary detection result display for an original document in the sixteenth variation of the first embodiment corresponding to the summary of FIG. 62.

FIG. 73 is an illustration of an exemplary document to be handled in the second embodiment.

FIG. 77 is a diagrammatic illustration of an exemplary internal document relation data in the individual data storage shown in FIG. 66.

FIG. 78 is a diagrammatic illustration of an exemplary external document relation data in the individual data storage shown in FIG. 66.

FIG. 84 is a diagrammatic illustration of a data structure for the text structure analysis result used in the first variation of the second embodiment.

FIGS. 89A and 89B are illustrations of exemplary window displays used in the third variation of the second embodiment.

FIG. 90 is a detailed block diagram for a functional configuration of the detection result output unit shown in FIG. 66 in the fourth variation of the second embodiment.

FIGS. 91A and 91B and flow charts for an operation of a summary modification processing unit in the detection result output unit of FIG. 90.

FIG. 92 is an illustration of an exemplary summary display before the operation of FIG. 91.

FIG. 93 is an illustration of the exemplary summary display during the operation of FIG. 91.

FIG. 94 is an illustration of the exemplary summary display after the operation of FIG. 91.

FIG. 97 is an illustration of an exemplary summary display before the operation of FIG. 96.

FIG. 98 is an illustration of the exemplary summary display during the operation of FIG. 96.

FIG. 99 is an illustration of the exemplary summary display after the operation of FIG. 96.

FIG. 100 is a detailed block diagram for a functional configuration of the detection result output unit shown in FIG. 66 in the sixth variation of the second embodiment.

FIGS. 102A and 102B are flow charts for an operation of a summary detailing processing unit in the detection result output unit of FIG. 100.

FIG. 103 is a flow chart for an operation of a summary simplification processing unit in the detection result output unit of FIG. 100.

FIG. 105 is an illustration of an exemplary summary display before the operation of FIG. 102.

FIG. 106 is an illustration of the exemplary summary display after the operation of FIG. 102.

FIG. 108A and 108B are flow charts for an operation of a summary detailing processing unit in the detection result output unit shown in FIG. 100 in the seventh variation of the second embodiment.

FIGS. 110A and 110B are illustrations of the exemplary summary and original document displays obtained in the seventh variation of the second embodiment.

FIG. 112 is an illustration of an exemplary original document handled in the eighth variation of the second embodiment.

FIG. 113 is an illustration of the exemplary paragraph data obtained from the original document of FIG. 112 by the operation of FIG. 112.

DETAILED DESCRIPTION OF THE PREFERRED EMBODIMENTS

Figure 1:
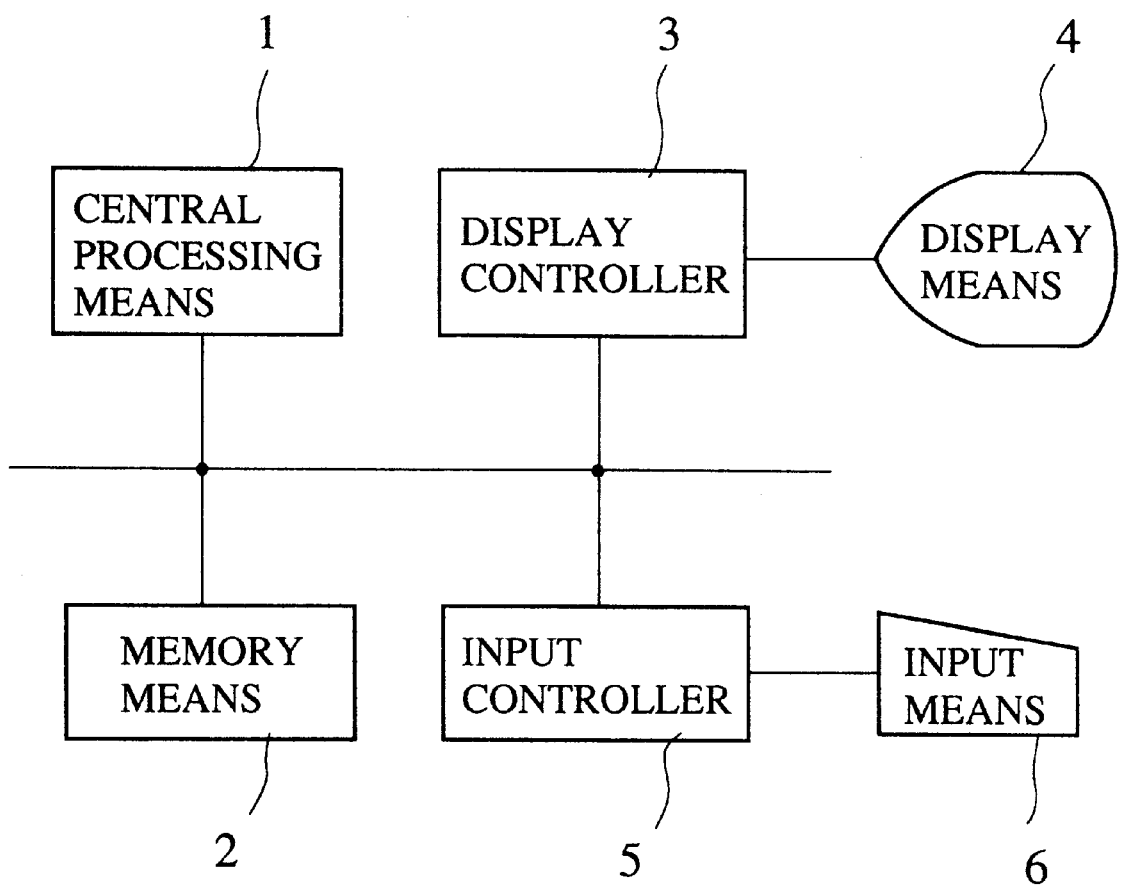
FIG. 1 is a schematic block diagram of a first embodiment of the document detection system according to the present invention.

Referring now to FIG. 1, the first embodiment of a document detection system according to the present invention will be described in detail.

In this first embodiment, the document detection system has an overall configuration as shown in FIG. 1 in which a central processing means 1 is connected with a memory means 2, a display means 4 through a display controller 3, and an input means 6 through an input controller 5.

The central processing means 1 is formed by a processor for carrying out various processing operations such as the input analysis, the detection processing, and the summary generation. The memory means 2 is formed by a memory medium such as a semiconductor memory, a magnetic disk memory, an optical disk memory, etc. for storing documents as detection targets. The display means 4 is formed by a display device such as a liquid crystal display and a plasma display for displaying the text content of the document obtained as the detection result while also outputting other graphic, audio, and speech data contained in the document, under the control of the display controller 3. The input means 6 is formed from input devices such as a keyboard and a mouse for entering the detection commands and other inputs from the user, under the control of the input controller 6.

Here, it is to be noted that the document detection system may contain more than one of the central processing means 1 or more than one of the memory means 2, all of which are connected together by paths or a network, if desired.

Figure 2:
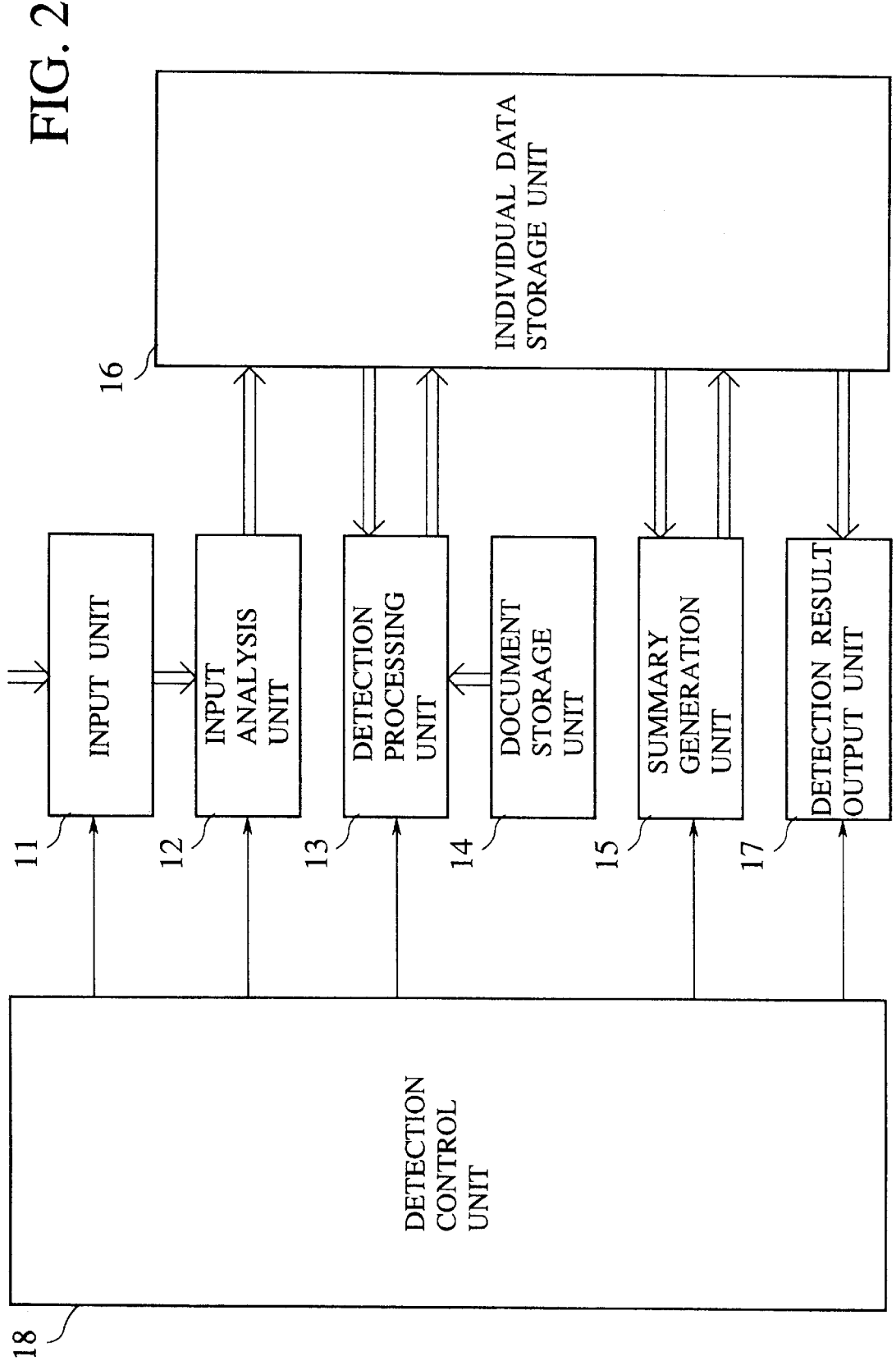
FIG. 2 is a block diagram for a functional configuration of a main part of the document detection system of FIG. 1.

In further detail, a main portion of the document detection system of this first embodiment has a functional configuration as shown in FIG. 2, which comprises: an input unit 11 for entering an input sentence in a natural language from the user; an input analysis unit 12 for carrying out various analyses of the input sentence including the morphological analysis, the syntactic analysis, and the semantic analysis; a detection processing unit 13 for carrying out the detection processing for detecting documents according to a syntactic analysis result obtained from the input sentence and a detection key constructed by using keywords extracted from the input sentence; a summary generation unit 14 for producing a summary of each detected document; a document storage unit 15, connected with the detection processing unit 13, for storing the document database; a detection result output unit 17 for outputting the results obtained by the input analysis unit 12, the detection processing unit 13, and the summary generation unit 14; an individual data storage unit 16, connected with the input analysis unit 12, the detection processing unit 13, the summary generation unit 14, and the detection result output unit 17, for storing individual data including the detected documents; and a detection control unit 18 for controlling the operations of the other processing modules including the input unit 11, the input analysis unit 12, the detection processing unit 13, the summary generation unit 14, and the detection result output unit 17, while managing user interactions.

In this FIG. 2, the document storage unit 15 and the individual data storage unit 16 belong to the memory means 2 in the overall configuration of FIG. 1, while the input unit 11, the input analysis unit 12, the detection processing unit 13, the summary generation unit 14, the detection result output unit 17, and the detection control unit 18 belong to the central processing means 1 in the overall configuration of FIG. 1. Also, in this FIG. 2, the thick arrows indicate data lines while thin arrows indicate control lines.

Figure 3:
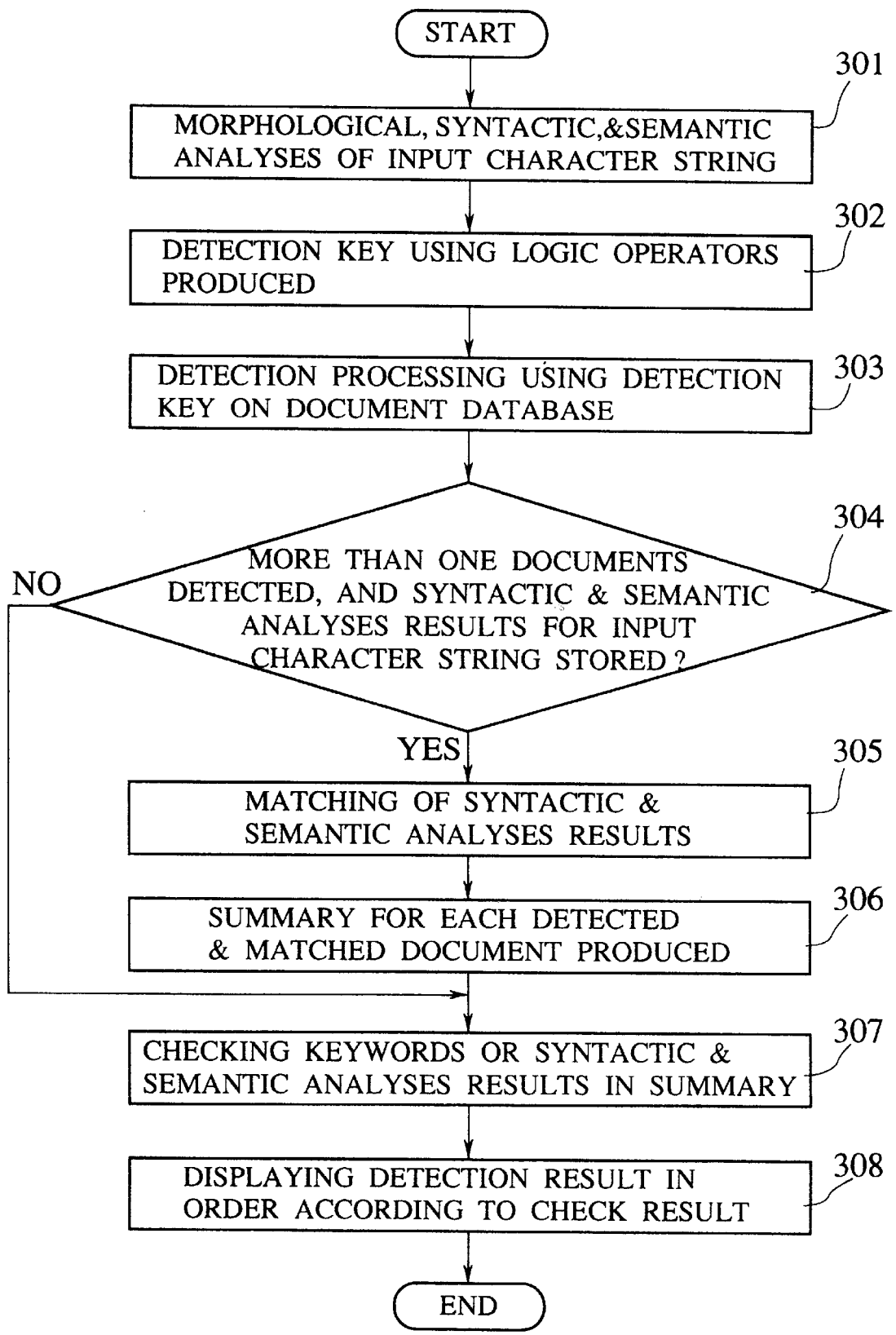
FIG. 3 is a flow chart for an overall operation of the main part shown in FIG. 2.

In this functional configuration of FIG. 2, the detection control unit 18 controls each processing module to realize the processing sequence as indicated in the flow chart of FIG. 3, as follows.

First, at the step 301, the input sentence in a form of input character string entered from the input unit 11 is transferred to the input analysis unit 12, at which the morphological analysis, the syntactic analysis, and the semantic analysis of the input character string are carried out. The results obtained by the input analysis unit 12 including the keywords in the input sentence are then stored in the individual data storage unit 16.

Next, at the step 302, the input analysis unit 12 produces a detection key by using the keywords in the input sentences stored in the individual data storage unit 16 in conjunction with logic operators as described in detail below.

Then, at the step 303, the detection processing unit 13 is activated to carry out the detection processing using the produced detection key on the document database stored in the document storage unit 15. A set of documents detected at this step 303 are temporarily stored in the individual data storage unit 16.

Next, at the step 304, the detection processing unit 13 judges whether more than one documents have been detected at the step 303 and the syntactic and semantic analyses results for the input character string are stored in the individual data storage unit 16, or not.

In a case of the affirmative, next at the step 305, the syntactic and semantic analyses results for the detected documents prepared in advance and stored in the document storage unit 15 are matched with the syntactic and semantic analyses results for the input character string stored in the individual data storage unit 16. A set of documents detected and matched at this step 305 are temporarily stored in the individual data storage unit 16. Otherwise, the step 305 is skipped.

Next, at the step 306, the text contents of the detected and matched documents stored in the individual data storage unit 16 are taken out from the document storage unit 15, and the summary generation unit 14 is activated to produce a summary for each detected and matched document from the text content. The summary for each detected and matched document obtained by the summary generation unit 14 is then stored in the individual data storage unit 16.

Then, at the step 307, the summary generation unit 14 checks the matching of the keywords or the syntactic and semantic analyses results for the input sentence in the summary for each detected and matched document. The check result obtained at this step 307 is then stored in the individual data storage unit 16.

Finally, at the step 308, the detection result output unit 17 is activated to display the detection result containing the document names or the summaries of those documents remaining in the individual data storage unit 16 after the step 307, in an order according to the check result obtained at the step 307. Here, the detection result output unit 17 can display and change the data stored in the individual data storage unit 16 in accordance with the commands entered from the user through the input unit 11, such that the user can select the desired document from the displayed detection result.

Now, the detailed operation of each processing module in this first embodiment will be described in detail.

Figure 4:
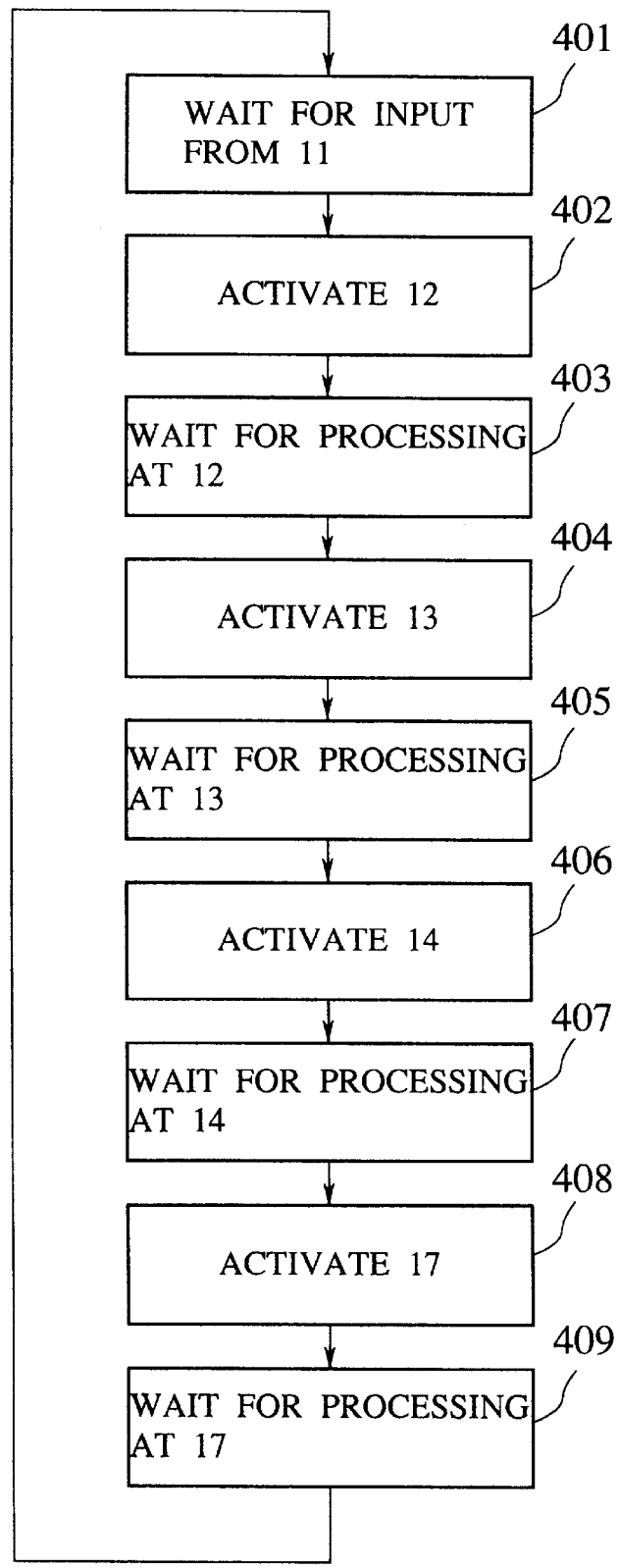
FIG. 4 is a flow chart for an operation of a detection control unit in the main part shown in FIG. 2.

First, the detection control unit 18 operates according to the flow chart of FIG. 4, as follows.

Namely, at first, the detection control unit 18 awaits for the input from the input unit 11 at the step 401. Then, when the input of the input character string at the input unit 11 is detected, the input analysis unit 12 is activated at the step 402. Next, the detection control unit 18 awaits for the end of the processing at the input analysis unit 12 at the step 403. Then, when the end of the processing at the input analysis unit 12 is detected, the detection processing unit 13 is activated at the step 404. Next, the detection control unit 18 awaits for the end of the processing at the detection processing unit 13 at the step 405. Then, when the end of the processing at the detection processing unit 13 is detected, the summary generation unit 14 is activated at the step 406. Next, the detection control unit 18 awaits for the end of the processing at the summary generation unit 14 at the step 407. Then, when the end of the processing at the summary generation unit 14 is detected, the detection result output unit 17 is activated at the step 408. Next, the detection control unit 18 awaits for the end of the processing at the detection result output unit 17 at the step 409. Then, when the end of the processing at the detection result output unit 17 is detected, the operation returns to the step 401 to repeat the process of the steps 401 to 409 for the next input sentence.

Figure 5:
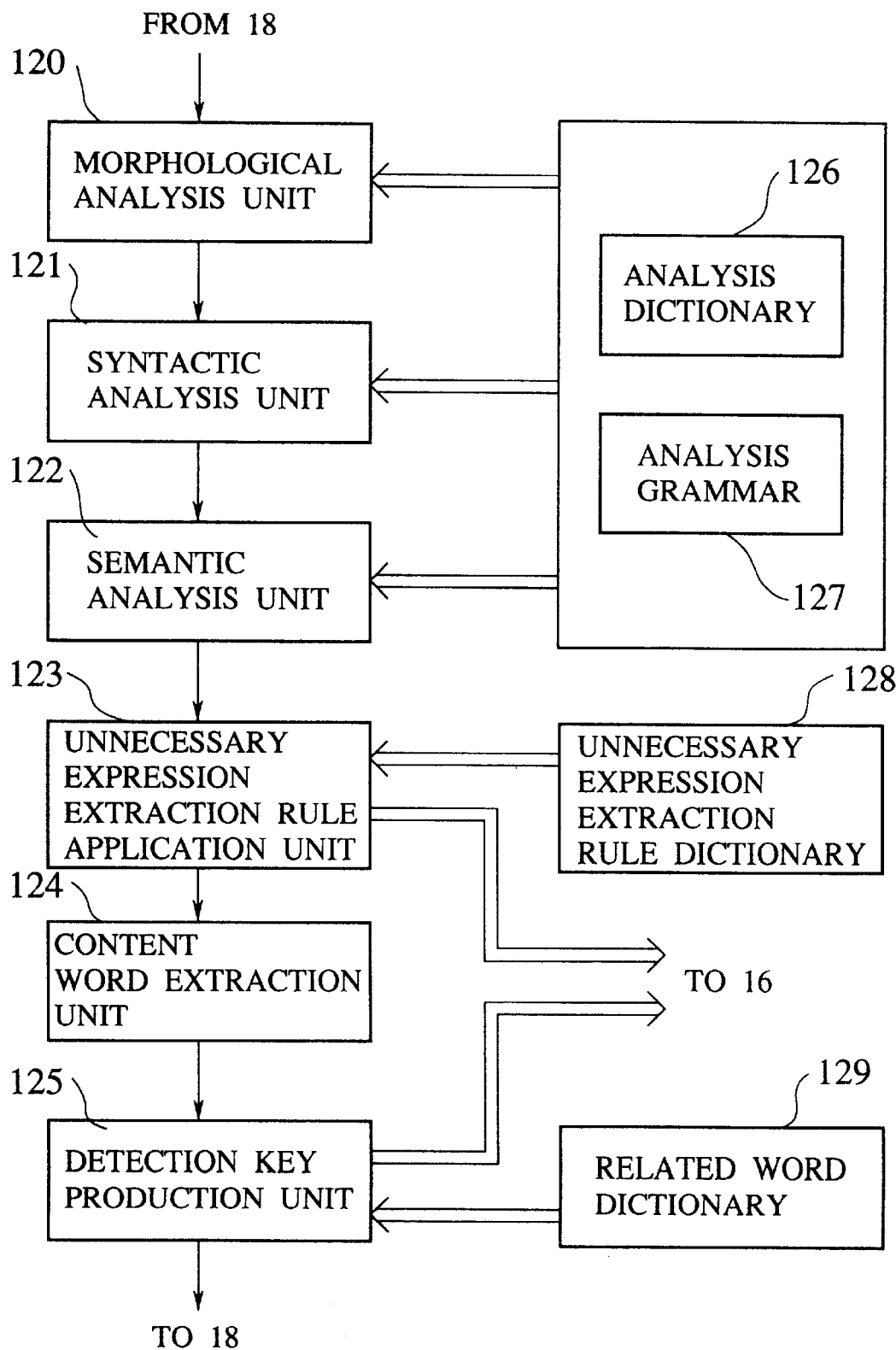
FIG. 5 is a detailed block diagram for a functional configuration of an input analysis unit in the main part shown in FIG. 2.

Next, the input analysis unit 12 has a detailed functional configuration as shown in FIG. 5, which comprises: a morphological analysis unit 120, a syntactic analysis unit 121, a semantic analysis unit 122, an unnecessary expression extraction rule application unit 123, a content word extraction unit 124, a detection key production unit 125, an analysis dictionary 126 and an analysis grammar 127 utilized in the morphological, syntactic, and semantic analyses, an unnecessary expression extraction rule dictionary utilized by the unnecessary expression extraction rule application unit 123, and a related word dictionary 129 utilized by the detection key production unit 125.

With this functional configuration of FIG. 5, the input analysis unit 12 operates according to the flow chart of FIG. 6, as follows.

First, at the step 601, the morphological analysis is carried out on the input sentence at the morphological analysis unit 120 by using the analysis dictionary 126, to divide the input sentences into words. Then, at the steps 602 and 603, the syntactic analysis and the semantic analysis are carried out at the syntactic analysis unit 121 and the semantic analysis unit 122, respectively, by using the analysis dictionary 126 and the analysis grammar 127. Here, the details of the morphological, syntactic, and semantic analyses to be carried out at these steps 601 to 603 are not essential to the present invention, and any known schemes can be adopted. For example, the schemes disclosed in "Japanese Word Dictionary", Japan Electronic Dictionary Research Institute, Ltd., April 1990, chapter 3, pp. 27–33, can be utilized here.

Next, at the step 604, the unnecessary expression extraction rule specified by the unnecessary expression extraction rule dictionary 128 is applied at the unnecessary expression extraction rule application unit 123, to delete a partial structure which coincides with each unnecessary expression specified by the unnecessary expression extraction rule, and then at the step 605, the structure obtained up to the step 604 is stored into the individual data storage unit 16.

Next, at the step 606, the content words in the structure obtained up to the step 604 are extracted at the content word extraction unit 124, and then at the step 607, the detection key is produced at the detection key production unit 125 by using the content words extracted at the step 606 along with appropriate logic operators.

Next, at the step 608, additional detection keys are also produced at the detection key production unit 125 by looking up related words of each extracted content word and replacing each extracted content word in the detection key produced at the step 607 by each looked up related word. Then, all the content words in the detection key as well as their related words are set as detection target keywords in the detection keys.

Finally, at the step 609, all the detection keys produced at the steps 607 and 608 are stored into the individual data storage unit 16.

Figure 6:
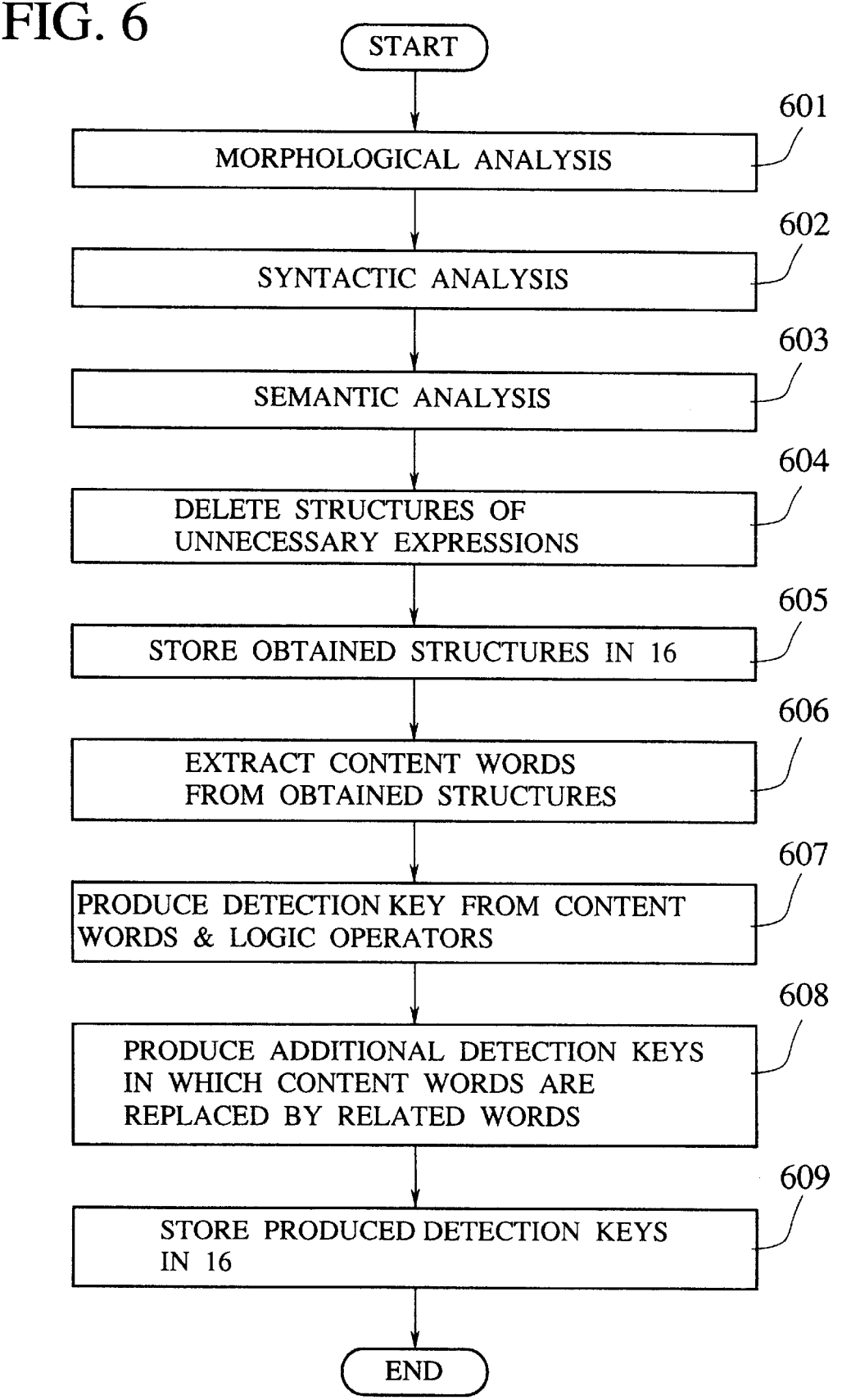
FIG. 6 is a flow chart for an operation of the input analysis unit of FIG. 5.

As a concrete example of the result of the operation by this input analysis unit 12, FIG. 7 shows various results obtained at various stages in the flow chart of FIG. 6 described above, for a particular input sentence in Japanese (with English translation provided in parentheses). More specifically, for the input sentence indicated in (a) of FIG. 7, the morphological analysis result appears as indicated in (b) of FIG. 7 in which the input sentence is divided into words. Then, the syntactic analysis result appears as indicated in (c) of FIG. 7 in which the tree structure representing the syntactic structure of the input sentence is generated. Then, the semantic analysis result appears as indicated in (d) of FIG. 7 in which the tree structure representing the semantic structure of the input sentence is generated.

In the semantic analysis, the semantic analysis rule specified in the analysis dictionary 126 such as that indicated in FIG. 8 for example is applied. Namely, this semantic analysis rule indicated in FIG. 8 specifies the semantic structure corresponding to the syntactic structure in which the Japanese verb "mochiiru" (meaning "use") appears between a noun and a so called sahen-noun (i.e., a noun that can be turned into a verb by affixing a Japanese verb "suru" (meaning "do") at the end) as a so called instrument case relationship between the noun and the sahen-noun. The similar semantic analysis rules are also specified in the analysis dictionary 126 for the other frequently used verbs such as "employ", "invoke", etc. It is noted here that in FIGS. 7 and 8, "wo" indicates a Japanese postpositional word, "rentai" indicates a symbol for a participial adjective, "nitsuite" indicates a Japanese expression meaning "about", and "obj" indicates a symbol for an objective case relationship.

Then, the unnecessary expression extraction result appears as indicated in (e) of FIG. 7 in which a partial structure which coincides with the unnecessary expression specified by the unnecessary expression extraction rule in the unnecessary expression extraction rule dictionary 128 is deleted from the tree structure obtained by the semantic analysis unit 122. Here, as shown in FIG. 9 for example, the unnecessary expression extraction rule indicates the partial structure to be deleted as "-obj→KNOW". It is to be noted, however, that the unnecessary expression extraction rule may indicate a word to be deleted instead of the partial structure to be deleted.

Then, the content word extraction result appears as indicated in (f) of FIG. 7 in which the content words "example" and "machine translation" are extracted from the tree structure obtained by the unnecessary expression extraction rule application unit 123.

Finally, the detection key production result appears as indicated in (g) of FIG. 7 in which the detection key is formed by connecting the content words extracted by the content word extraction unit 124 with an appropriate logic operator "+".

Figure 10:
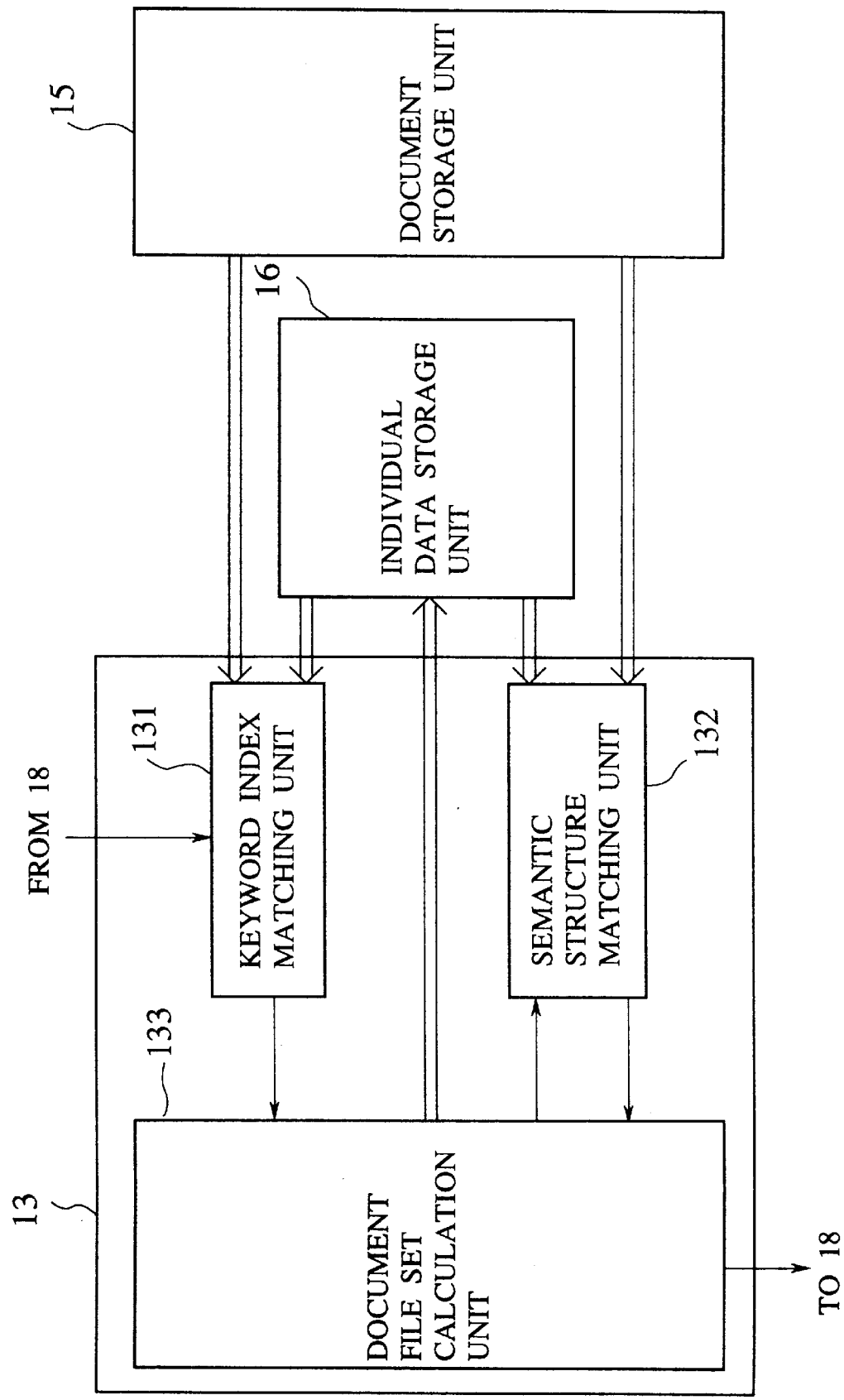
FIG. 10 is a detailed block diagram for a functional configuration of a detection processing unit in the main part shown in FIG. 2.

Next, the detection processing unit 13 has a detailed functional configuration as shown in FIG. 10, which comprises: a keyword index matching unit 131 and a semantic structure matching unit 132 which are connected with the document storage unit 15 and the individual data storage unit 16, and a document file set calculation unit 133 connected with the keyword index matching unit 131 and the semantic structure matching unit 132.

Figure 11:
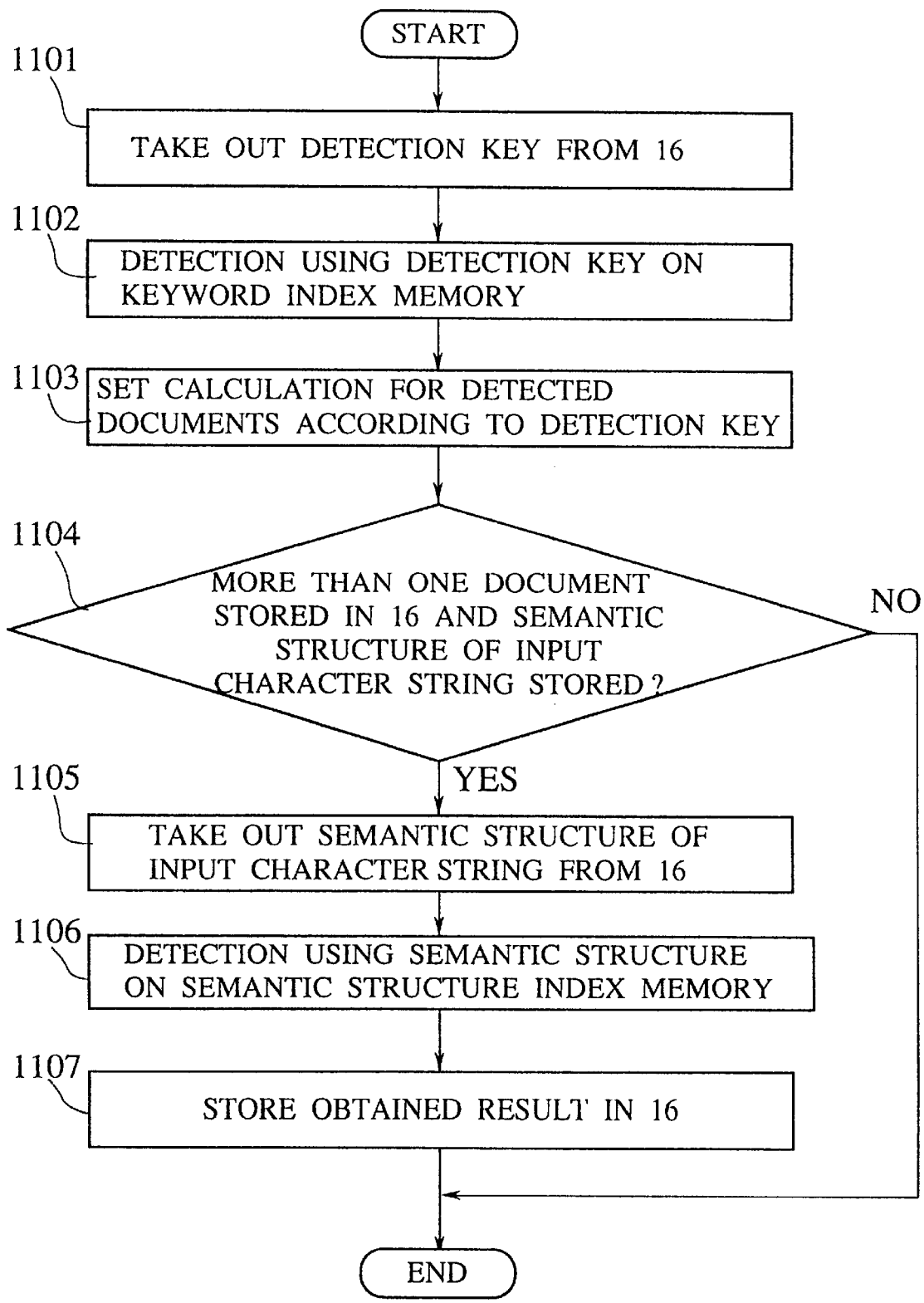
FIG. 11 is a flow chart for an operation of the detection processing unit of FIG. 10.

With this functional configuration of FIG. 10, the detection processing unit 13 operates according to the flow chart of FIG. 11, as follows.

First, at the step 1101, the detection key stored in the individual data storage unit 16 is taken out to the keyword index matching unit 131, and then at the step 1102, the detection using the taken out detection key is carried out on a keyword index memory in the document storage unit which stores all words of all the documents in the document database, so as to obtain those documents which contain the same words as those used in the detection key.

Next, at the step 1103, a set calculation for the detected documents obtained at the step 1102 is carried out by the document file set calculation unit 133 according to the detection key, and the set calculation result is stored in the individual data storage unit 16.

Then, at the step 1104, the semantic structure matching unit 132 judges whether more than one documents are stored in the individual data storage unit 16 as the detected documents obtained at the step 1103 and the semantic structure of the input character string is stored in the individual data storage unit 16, or not. In a case of the affirmative, the semantic structure of the input character string is taken out from the individual data storage unit 16 at the step 1105, and the detection using the taken out semantic structure is carried out on a semantic structure index memory in the document storage unit 15 which stores all the semantic structures of all the documents in the document database, so as to obtain those documents which have the same semantic structure as that of the input character string, and then the result obtained at the step 1106 is stored in the individual data storage unit 16 at the step 1107. Otherwise, the steps 1105 to 1107 are skipped.

In order to illustrate the keyword detection part of the operation by this detection processing unit 13 more concretely, FIG. 12 shows an exemplary content of the keyword index memory.

Namely, in this keyword index memory of FIG. 12, each kanji character involved in the keywords is assigned to a unique address, and each keyword formed by a plurality of kanji characters is specified by the link data registered after each kanji character, so as to reduce the required memory capacity and simplify the necessary detection procedure.

For example, for the Japanese keyword "kikai" (meaning "machine") formed by two kanji characters as indicated on the first line in FIG. 13, the first character registered at the address 00053 in the head character storage region has a link data "00935" specifying the second character of the keyword as that registered at the address 00935 in the subsequent character storage region. In addition, this second character at the address 00935 also has the link data "01201" specifying the third character, and the third character at the address 01201 has the link data "01309" specifying the fourth character, for another keyword "kikai-honyaku" (meaning "machine translation") formed by four kanji characters as indicated on the last line in FIG. 13 which contains the above described keyword "kikai" as a first part. Furthermore, the second character at the address 00935 also has a file data "file 4 (34, 35, 72, 86)" indicating that the keyword "kikai" is contained in the document data having the file name "file 4" at sentence No. 34, 35, 72, and 86. Similarly, the fourth character at the address 01309 has two file data "file 25 (18, 42)" and "file 21 (23)", indicating that the keyword "kikai-honyaku" is contained in the document data "file 25" at sentence No. 18 and 42 and the document data "file 21" at sentence No. 23. On the other hand, the first character at the address 00091 in the head character storage region is common to two keywords "jikken" (meaning "experiment") and "Jitsurei" (meaning "example") as indicated on the second and third lines in FIG. 13, so that it has two link data "01003" and "01004" specifying the respective second characters for these two keywords. In FIG. 12, an isolated "0" functions as a separator for separating the character, link data, and the file data. Also, the first characters of the keywords are registered in the continuous head character storage region in a sorted order such as that of JIS (Japanese Industrial Standard) codes.

Thus, the keyword index matching unit 131 looks up this keyword index memory to make a matching of each detection target keyword in the detection key, and obtains the documents containing the same detection target keyword as the detection key according to the document data registered for the matched keyword in the keyword index memory.

Figure 14A:
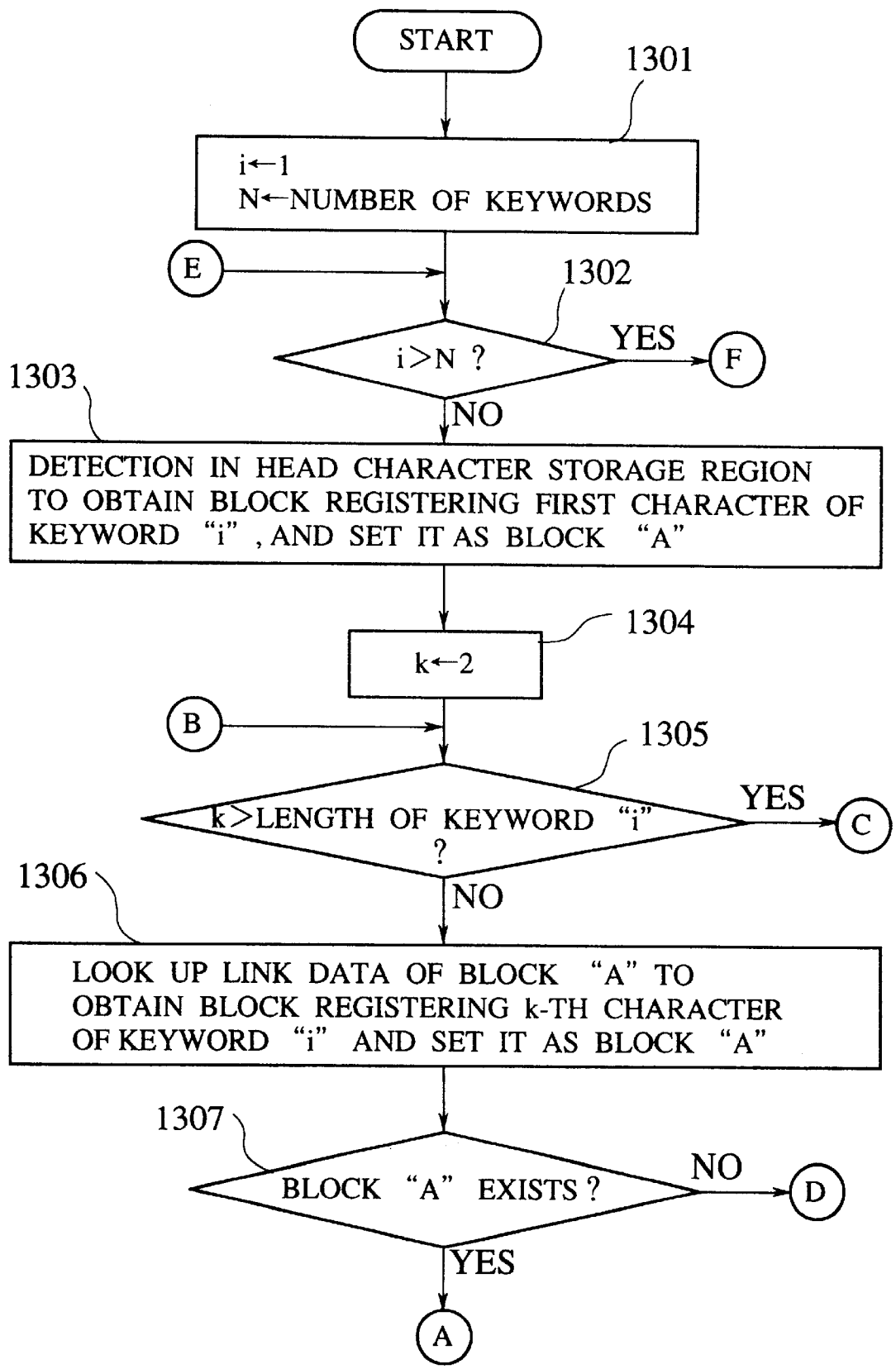
FIGS. 14A and 14B are a flow chart for an operation of a keyword index matching unit and a document file set calculation unit in the detection processing unit of FIG. 10.

More specifically, the keyword index matching unit 131 and the document file set calculation unit 133 operate according to the flow chart of FIGS. 14A and 14B as follows.

First, at the step 1301, a variable "i" indicating an index of each keyword to be detected is set to 1 and a variable "N" indicating a total number of keywords to be detected is set to a number of keywords involved in the detection key as an initialization.

Then, at the step 1302, whether "i" is greater than "N" or not is judged. Unless "i" is greater than "N" at the step 1302, next at the step 1303, the first character of the keyword "i" is detected in the head character storage region of the keyword index memory, and a block registering that first character is designated as a block "A". Here, as the head character storage region stores the first characters in a sorted order, so that the block registering the first character of the keyword "i" can be obtained easily by carrying out the binary search.

Next, at the step 1304, a variable "k" indicating a character position in the keyword "i" is set to 2, and then at the step 1305, whether "k" is greater than a character string length of the keyword "i" or not is judged. Unless "k" is greater than the length of the keyword "i", next at the step 1306, the link data registered in the block "A" is looked up to obtain a block registering the "k"-th character of the keyword "i", and an obtained block is newly designated as a block "A". Then, at the step 1307, whether the block "A" obtained at the step 1306 actually exists in the subsequent character storage region of the keyword index memory. If the block "A" actually exists, the variable "k" is incremented by one at the step 1308 and the operation returns to the step 1305 described above for the incremented value of the variable "k".

In a case "k" is greater than the length of the keyword "i" at the step 1305, next at the step 1309, the document file name registered as the document data in the block "A" is set to the document file set "i" for the keyword "i", and then the variable "i" is incremented by one at the step 1310 and the operation returns to the step 1302 described above for the incremented value of the variable "i".

In a case the block "A" does not exist at the step 1307, next at the step 1311, the document file set "i" for is the keyword "i" is set as an empty set, and then the variable "i" is incremented by one at the step 1310 and the operation returns to the step 1303 described above for the incremented value of the variable "i".

By these steps, the document file set for each keyword in the detection key is obtained. Then, in a case "i" becomes greater than "N" at the step 1302, next at the step 1312, the variable "i" is reset to 2, and the document file set 1 for the keyword 1 is set as the current document file set. Then, until the variable "i" exceeds "N" at the step 1313, the step 1314 in which the set calculation to update the current document file set to be a logical product ("AND") of the document file set "i" and the current document file set and the subsequent step 1315 in which the variable "i" is incremented by one are repeated, so as to eventually obtain the final current document file set containing those documents which contain all the keywords in the detection key.

Figures 15, 17:
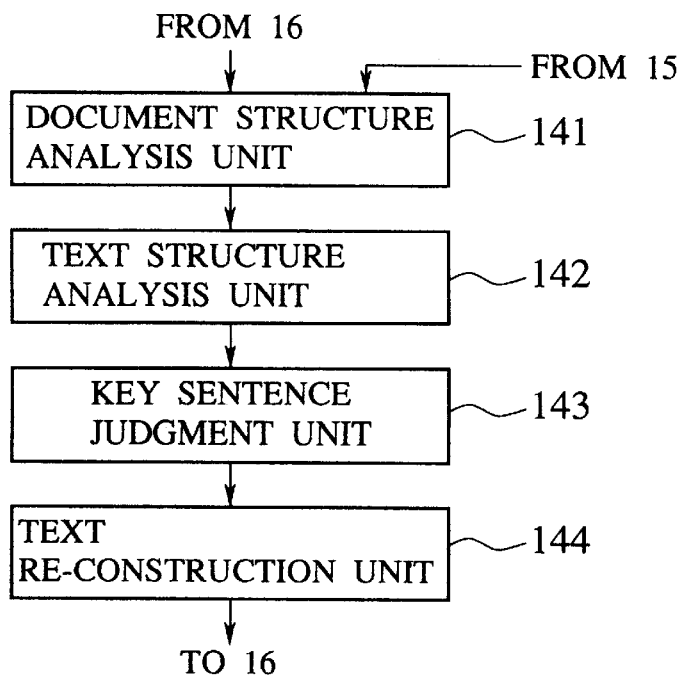
FIG. 15 is a diagrammatic illustration of an exemplary semantic structure index memory used in the flow chart of FIG. 11.
FIG. 17 is a detailed block diagram for a functional configuration of a summary generation unit in the main part shown in FIG. 2.

On the other hand, in order to illustrate the semantic structure detection part of the operation by this detection processing unit 13 more concretely, FIG. 15 shows an exemplary content of the semantic structure index memory.

Namely, in this semantic structure index memory of FIG. 15, each semantic structure specified by a set of target word, relation symbol, and source word is enlisted along with the document file names and the sentence No. containing each semantic structure. This semantic structure index memory is prepared in advance by carrying out the analysis of all the sentences of each document in the document database stored in the document storage unit 15. Thus, in the example shown in FIG. 15, the semantic structure of "instrument" case relationship between the source word "machine translation" and the target word "example" is contained in the document "file 25" at the sentence No. 18, the document "file 21" at the sentence No. 23, etc.

Figure 16:
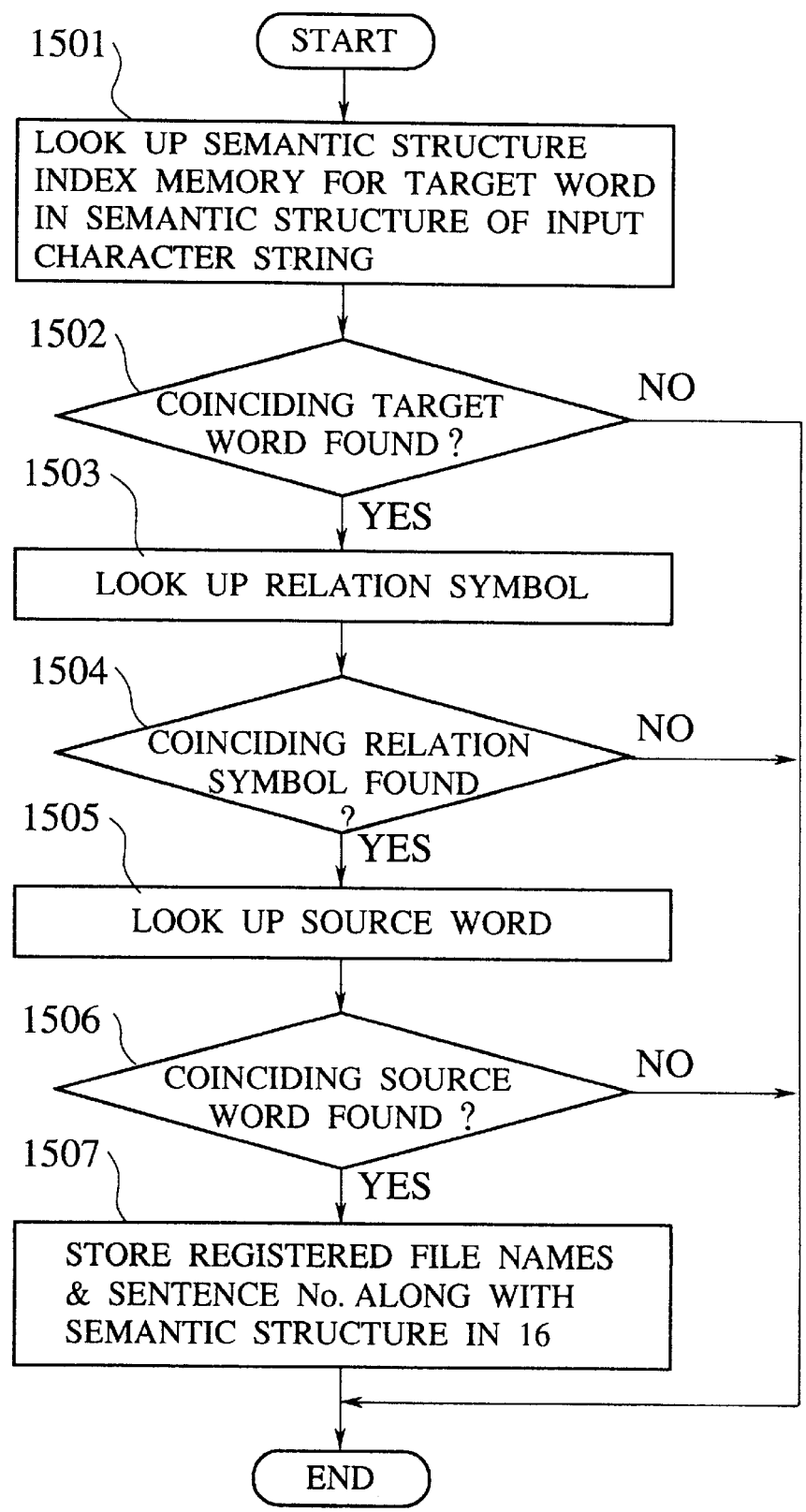
FIG. 16 is a flow chart for an operation of a semantic structure index matching unit in the detection processing unit of FIG. 10.

More specifically, the semantic structure index matching unit 132 operates according to the flow chart of FIG. 16 as follows.

First, at the step 1501, the semantic structure index memory is looked up for the target word in the semantic structure of the input character string. Then, only when the coinciding target word is found out in the semantic structure index memory at the step 1502, the relation symbol registered for the coinciding target word is looked up and matched with the relation symbol in the semantic structure of the input character string at the step 1503. Then, only when the coinciding relation symbol is found out in the semantic structure index memory at the step 1504, the source word registered for the coinciding relation symbol is looked up and matched with the source word in the semantic structure of the input character string at the step 1505. Then, only when the coinciding source word is found out in the semantic structure index memory at the step 1506, the document file names and sentence No. registered for the coinciding source word is stored into the individual data storage unit 16 along with the matched semantic structure itself.

Next, the summary generation unit 14 has a detailed functional configuration as shown in FIG. 17, which comprises: a document structure analysis unit 141, a text structure analysis unit 142, a key sentence judgement unit 143, and a text re-construction unit 144.

The document structure analysis unit 141 analyzes the chapter structure of each document by extracting title data indicating the chapters and sections in each document. Here, the details of the document structure analysis to be carried out by this document structure analysis unit 141 is not essential to the present invention, and any known schemes can be adopted. For example, the scheme disclosed in Doi, M., et al.: "Research on Model Based Document Processing System DARWIN", Human-Computer Interaction-INTERACT '87, H. J. Bullinger, B, Shackel (Ed.), Elsevier Science Publishers B.V. (North-Holand), 1987, pp. 1101–1106, can be utilized here.

The text structure analysis unit 142 analyzes the logical structure of the sentences of each chapter or section by extracting rhetorical expressions used in the sentences of each chapter or section. Here, again, the details of the text structure analysis to be carried out by this text structure analysis unit 142 is not essential to the present invention, and any known schemes can be adopted. For example, the scheme disclosed in Sumita, K., et al.: "A Discourse Structure Analyzer for Japanese Text", Proceedings of the International Conference on Fifth Generation Computer Systems 1992, Institute for New Generation Computer Technilogy (Ed.), pp. 1133–1140, can be utilized here.

The key sentence judgement unit 143 judges the key sentences according to the document structure and the text structure obtained by the document structure analysis unit 141 and the text structure analysis unit 142.

The text re-construction unit 144 generates a summary of each document from the key sentences obtained by the key sentence judgement unit 143.

In this manner, for an exemplary sentence shown in (b) of FIG. 18, a text structure shown in (a) of FIG. 18 can be obtained for example. In this example of FIG. 18, the text structure indicates that the second sentence has a relationship of "extension" with respect to the first sentence, while the third sentence has a relationship of "direction" with respect to the first and second sentences.

Figure 19:
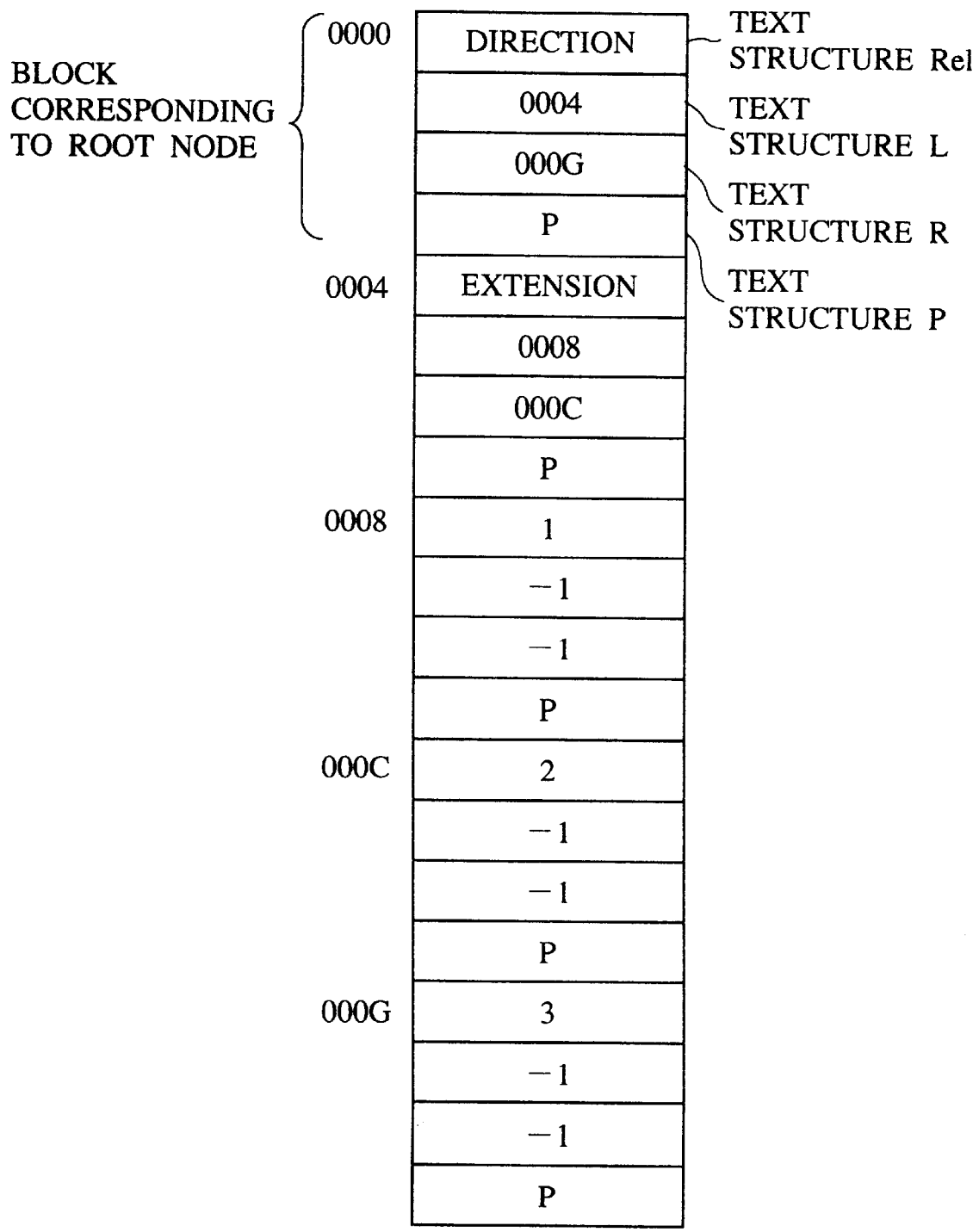
FIG. 19 is a diagrammatic illustration of a data structure for the text structure used in the summary generation unit of FIG. 17.

In this summary generation unit 14, the text structure is expressed by a data structure as shown in FIG. 19, in which a block for each node includes a "text structure Rel" indicating a relationship of each node, "text structure L" and "text structure R" indicating links to the nodes located on the left and right of each node, respectively, and a "text structure P" indicating a penalty for each node. Here, for a terminal node, the "text structure Rel" indicates a pointer to a corresponding sentence, while each of the "text structure L" and "text structure R" indicates the value "−1".

The key sentence judgement unit 143 operates according to the flow chart of FIG. 20, in which a penalty calculation at the step 2001 is carried out recursively for all the nodes. After the penalty is calculated for all the nodes, the terminal node with less penalty can be judged as more important.

In further detail, the penalty calculation for each node is carried out according to the flow chart of FIG. 21 as follows.

Here, the key sentence judgement unit 143 initially has an input in a form of the text structure obtained by the text structure analysis unit 142 and an initial value of the penalty. Then, first, at the step 2101, whether the text structure is a terminal node or not is judged. Namely, when the value indicated by the "text structure L" is "−1", it can be judged as the terminal node. In a case of the terminal node, the entered penalty value P is set to the "text structure P" indicating the penalty at the step 2102.

On the other hand, in a case of the non-terminal node, the relationship indicated by the "text structure Rel" is judged as one of a right stressed type, a left stressed type, and neither one of these, at the steps 2103 and 2106. This judgement is made according to the relationship table provided in the key sentence judgement unit 143 in advance. For example, the relationship table has the entries similar to the following (for a case of using Japanese):

|  |  |
| --- | --- |
| SERIAL RELATION | right stressed type |
| DIRECTION | right stressed type |
| EXEMPLIFICATION | left stressed type | such that the relationship table can indicate that the relationship of "serial relation" is the right stressed type, for example.

In a case the relationship indicated by the "text structure Rel" is the right stressed type, the node on the right hand side is more important, so that the penalty value obtained by adding the entered penalty value P and a predetermined penalty P1 is given to the "text structure L" at the step 2104, while the entered penalty value P itself is given to the "text structure R" at the step 2105.

On the contrary, in a case the relationship indicated by the "text structure Rel" is the left stressed type, the node on the left hand side is more important, so that the entered penalty value P itself is given to the "text structure L" at the step 2107, while the penalty value obtained by adding the entered penalty value P and a predetermined penalty P1 is given to the "text structure R" at the step 2108.

On the other hand, in a case the relationship indicated by the "text structure Rel" is neither one of the right stressed type and the left stressed type, the entered penalty value P itself is given to both of the "text structure L" and the "text structure R" at the steps 2109 and 2110.

In this manner, when the penalty calculation is made recursively for all the nodes, the sentence with a higher importance will have a smaller penalty value, while the sentence with a lower importance will have a larger penalty value.

Also, in this key sentence judgement unit 143, the manner of setting the penalty value can be altered by changing the data in the relationship table, so that by allowing the user to define each relationship in the relationship table as either one of the right stressed type and the left stressed type freely, the selections of the key sentences at the key sentence judgement unit 143 can be adjusted such that it becomes possible for the text re-construction unit 144 to generate the summary from a point of view desired by the user.

The text re-construction unit 144 operates according to the flow chart of FIG. 22, as follows.

First, at the step 2201, all the sentences with the penalty obtained at the key sentence judgement unit 143 less than a predetermined threshold P2 are selected.

Then, the connective expressions in the sentences selected at the step 2201 are changed to generate the summary at the step 2202.

To illustrate the operation of the text reconstruction unit 144 more concretely, consider a simple exemplary case of handling the following three sentences.

(1) In order to build a nice building, nice materials are necessary.

(2) However, nice tools are also necessary.

(3) In other words, the materials alone are not sufficient.

In this case, the text structure of these three sentences can be expressed as follows.

(1<NEGATIVE RELATION> (2<REPHRASE>3)

Now, suppose the sentences (1) and (3) are selected as the key sentences by the key sentence judgement unit 143.

Then, if the sentences (1) and (3) are simply connected, the following sentences which are logically different from the original sentences would be generated.

"In order to build a nice building, nice materials are necessary.

In other words, the materials alone are not sufficient."

In order to avoid such an erroneous generation of an inaccurate summary, at the step 2202 described above, the connective expression between the sentences is replaced by that which corresponds to the most superior relationship among the selected key sentences. Namely, in a case of the sentences (1) and (3) above, the most superior relationship between these sentences (1) and (3) is that of "negative relation" according to the text structure described above, so that the connective expression "In other words" in the sentences generated above is replaced by the connective expression "However" corresponding to this "negative relation" relationship, so as to obtain the following sentences, which can be considered as the summary of the original sentences (1) to (3).

"In order to build a nice building, nice materials are necessary.

However, the materials alone are not sufficient."

In this manner, the text re-construction unit 144 can generate the summary which is logically consistent with the original sentences. In addition, by changing the value of the threshold P2 used at the step 2201 described above, the size of the summary to be generated can be controlled. Consequently, by allowing the user to change this threshold P2 freely, it becomes possible to obtain and display the summary of the desired size.

In this first embodiment, the individual data storage unit 16 stores the correspondences between the summaries and the original sentences in a form of a summary sentence memory shown in FIG. 23. In this case, each summary sentence memory data includes an original sentence pointer, a summary pointer, and a summary sentence number, which are stored in a continuous memory region to indicate their correspondences. The summary sentence number indicates the sentence numbers of the sentences forming the summary.

The detection control unit 18 also determines the display priority order among the detected documents by using the detection result obtained from the detection key and the syntactic and semantic analyses results for the input sentences which are obtained by the detection processing unit 13 and stored in the individual data storage unit 16, and the summary data obtained by the summary generation unit 14 and stored in the individual data storage unit 16 as follows. Namely, the display priority order is determined according to the prescribed priority order conditions provided as a display priority rule dictionary in the detection control unit 18, as shown in FIG. 24. The detection control unit 18 then controls the detection result output unit 17 to display the titles of the detected documents in the determined display priority order as the detection result.

As a concrete example, FIG. 25 shows an exemplary data content of the individual data storage unit 16, and FIG. 26 shows an exemplary display priority order determined for the exemplary data content of FIG. 25.

Here, the detection processing unit 13 counts a number of times each document has been detected as the detection result and stores this number of detections for each document in the document storage unit 15. Then, in a case the detection result includes more than one documents with the same display priority order, the document with the greater number of detections is displayed before the document with the lesser number of detections, as indicated in FIG. 26.

As a concrete example, FIG. 27 shows an exemplary data content for the detection result stored in the individual data storage unit 16, and FIG. 28 shows an exemplary screen display of the detection result according to the exemplary data content of FIG. 27.

Now, various variations of the above described first embodiment of a document detection system according to the present invention will be described.

First, the first variation concerning the ambiguity in the analysis results of the morphological, syntactic, and semantic analyses will be described. Namely, in the first embodiment described above, it has been assumed that there is no ambiguity in the analysis results of the morphological, syntactic, and semantic analyses. In contrast, in this first variation, a case of dealing with the ambiguity in the analysis results of the morphological, syntactic, and semantic analyses will be described.

In this case, the detection control unit 18 possesses an analysis result learning dictionary for storing the analysis results for the input character string selected by the user in the past detection operations, in a form shown in FIG. 29. In addition, the semantic structure index memory in the document storage unit 15 stores all the analysis results obtained by syntactic and semantic analyses of the sentences in each document in the document database in correspondences, whenever a plurality of analysis results are obtained. The other features are substantially identical to those in the first embodiment described above.

Figure 30:
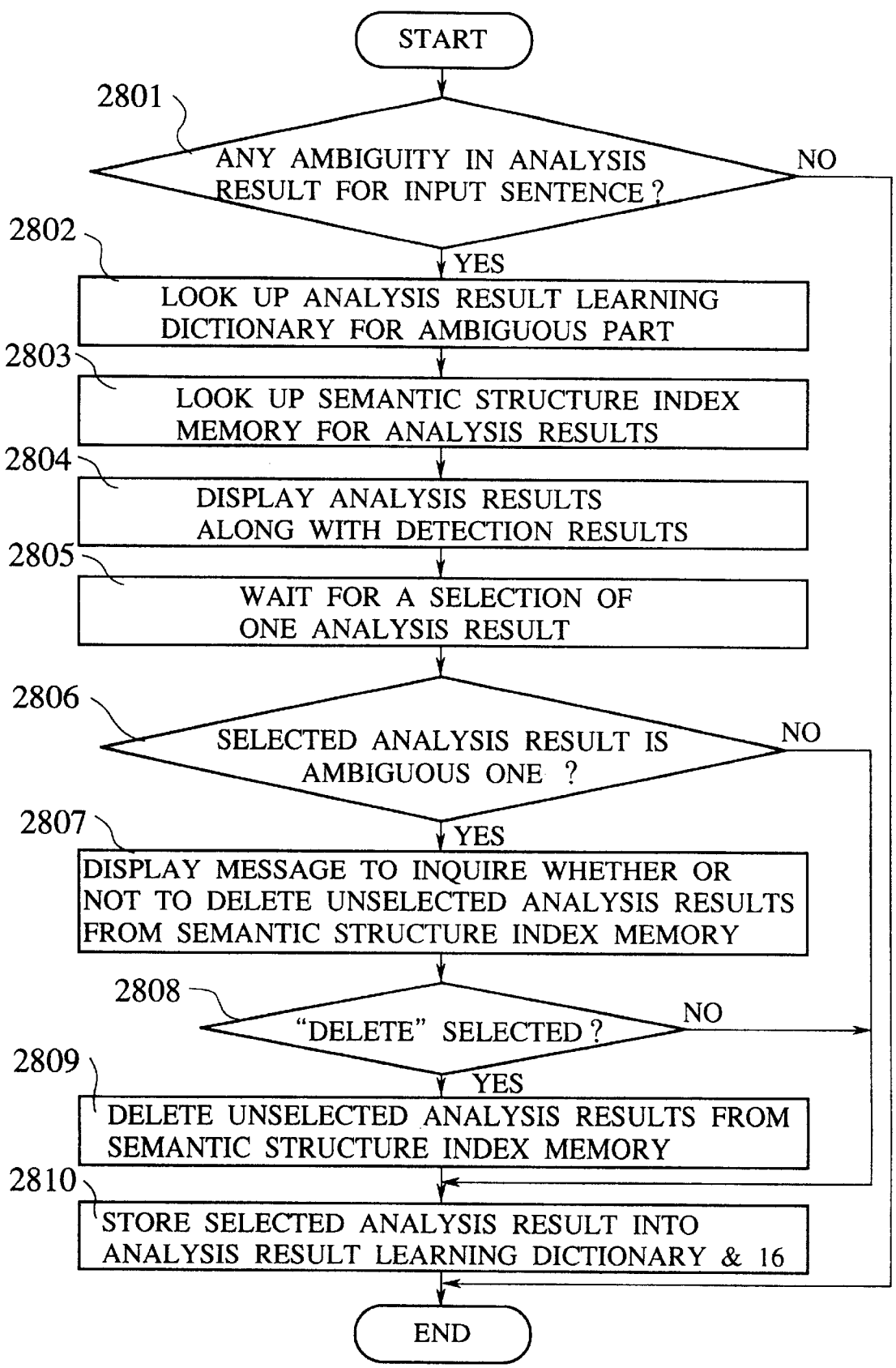
FIG. 30 is a flow chart for an operation of the system according to a first variation of the first embodiment.

In this first variation, the ambiguity in the analysis result is handled by the following operation according to the flow chart of FIG. 30.

Namely, in a case the input analysis unit 12 obtained the analysis results for the input sentence as shown in FIG. 31 which includes an ambiguity at the step 2801, the input analysis unit 12 stores the obtained plurality of analysis results into the individual data storage unit 16, and transmits a signal indicating an occurrence of the ambiguity to the detection control unit 18.

In response, the detection control unit 18 takes out an ambiguous part of the input character string corresponding to the plurality of analysis results stored in the individual data storage unit 16, and looks up the analysis result learning dictionary for the ambiguous part at the step 2802, and then looks up the semantic structure index memory for each one of the syntactic and semantic analysis results looked up from the analysis result learning dictionary at the step 2803.

Then, at the step 2804, the detection result output unit 17 displays the detection results obtained at the step 2803 along with the plurality of analysis results and appropriate messages. Here, in a case the character string coinciding with the ambiguous part of the input character string is detected in the analysis result learning dictionary at the step 2802, the appropriate message which notifies the fact that this analysis result had been selected in the past is attached to the analysis result corresponding to the coinciding character string. On the other hand, in a case the coinciding semantic structure is detected in the semantic structure index memory at the step 2803, the appropriate message which notifies the fact that the document containing this semantic structure is present in the document storage unit 15 is attached to the detected coinciding semantic structure.

Next, at the step 2805, a completion of the selection of an appropriate analysis result from the displayed plurality of analysis results to be made by the user is awaited.

Then, whether the selected analysis result is that which has an ambiguity or not is determined at the step 2806. If the selected analysis result is an unambiguous one, the operation proceeds to the step 2810 described below, whereas otherwise next at the step 2807, a message for inquiring whether or not to delete the unselected analysis results from the semantic structure index memory to the user is displayed. Then, whether the user selected "delete" as an answer to the above inquiry is determined at the step 2808, and only when the "delete" is selected, the unselected analysis results are deleted from the semantic structure index memory at the step 2809.

Finally, at the step 2810, the selected analysis result is stored into the analysis result learning dictionary as well as the individual data storage unit 16.

Thus, in this first variation, the semantic structure index memory in a state shown in FIG. 32A in which a plurality of analysis results causing the ambiguity are present can be turned into a state shown in FIG. 32B in which the ambiguity is resolved as only the semantic structure of "COMPUTER-object→DESIGN" is remaining according to the selection made by the user.

Figure 33:
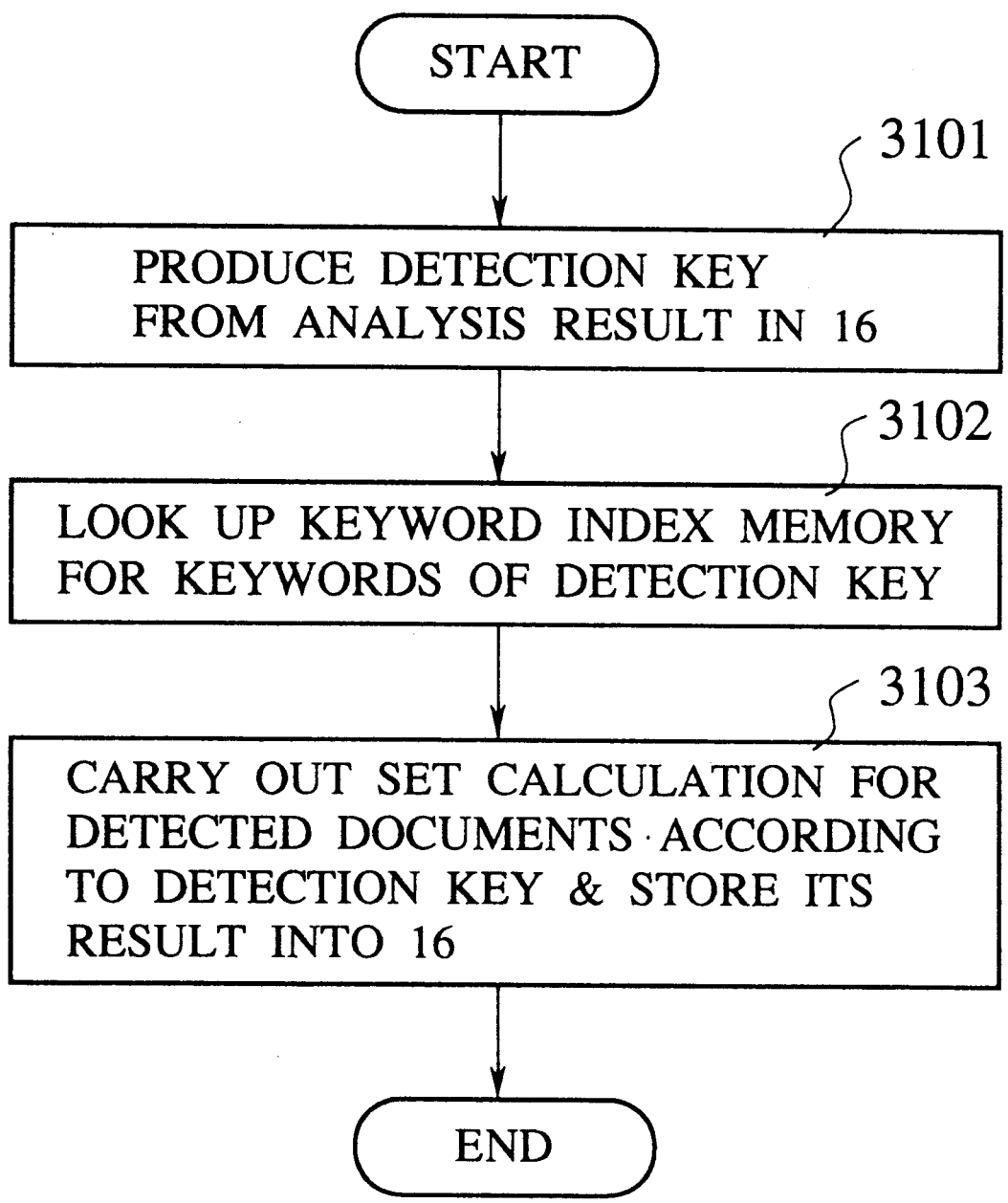
FIG. 33 is a flow chart for an operation of the detection control unit shown in FIG. 2 in the first variation of the first embodiment.

After the above described ambiguity resolving operation of FIG. 30, the detection control unit 18 operates according to the flow chart of FIG. 33 as follows.

Namely, after the selected analysis result is stored into the analysis result learning dictionary and the individual data storage unit 16, the detection control unit 18 transmits a signal indicating a completion of the ambiguity resolving operation to the input analysis unit 12.

In response, the input analysis unit 12 produces the detection key from the syntactic and semantic analysis results stored in the individual data storage unit 16 at the step 3101 which are the syntactic and semantic analysis results detected from the semantic structure index memory.

Then, the keyword index memory is looked up for the keywords in the detection key at the step 3102, and the set calculation for the detected documents according to the detection key and its result is stored in the individual data storage unit 16 at the step 3103.

Next, the second variation concerning the input sentence using the logic operators will be described. Namely, in the first embodiment described above, it has been assumed that the input sentence is given in the natural language. In contrast, in this second variation, a case of dealing with the input sentence using the logic operators in conjunction with the natural language will be described.

In this case, the input analysis unit 12 is going to carry out the logic operator interpretation processing for the input sentence containing the logic operators.

For example, FIG. 34 shows an exemplary case of the input sentence using the logic operator "+", in which the logic operator interpretation processing interprets the meaning of this logic operator "+" to yield four semantic structures. The final detection result will then be obtained as a sum set of all the document sets obtained by the detection processing using each of these four semantic structures. In FIG. 34, "niyoru" indicates a Japanese expression meaning "by".

As another example, FIG. 35 shows an exemplary case of the word "something" in the input sentence is converted into a symbol "?", which will be regarded as matching with arbitrary word in the detection processing. In FIG. 35, a symbol "goal" indicates the objective case relationship.

Next, the third variation concerning the detection processing using the bibliographical matters in the input sentence. Namely, in the first embodiment described above, the detection processing has been carried out for all the documents without utilizing their bibliographical matters at all. In contrast, in this third variation, a case of utilizing the bibliographical matters of the desired document such as the title, the author, and the issue date that can be specified in the input sentence will be described.

For example, FIG. 36 shows an exemplary case of the input sentence specifying the bibliographical matters of the desired document as those written by "M. Tanaka" and issued "since 1980". In response, the detection processing unit 13 carries out the detection processing for only those documents which have "M. Tanaka" as the author and the issue year not less than "1980", according to the bibliographical matter analysis rules shown in FIG. 37 which are provided in the detection processing unit 13. In this case, the detection processing is carried out by looking up the keyword index memory for the keyword "machine translation" obtained as the analysis result as indicated in FIG. 36. Here, the word "papers" is not used as a keyword because of the application of the unnecessary expression extraction rule as shown in FIG. 38. The procedure for carrying out the detection processing is substantially similar to that in the first embodiment described above.

Next, the fourth variation concerning the display priority order setting will be described. Namely, in the first embodiment described above, the display priority order is determined by weighting the detected documents in accordance with their summaries. In contrast, in this fourth variation, the detected documents are weighted according to the display priority scores determined in accordance with the document structure analysis result such as the title, table of content, index, and references of each document.

For example, the display priority scores can be assigned as indicated in FIG. 39. In this case, the highest score for which each document qualify under the conditions concerning the keyword and the highest score for which each document qualify under the conditions concerning the semantic structure are added together as the score of each document, and the detected documents are displayed in a descending order of the assigned score.

Next, the fifth variation concerning the detection result display will be described. Namely, in the first embodiment described above, the detection result displayed by the detection result output unit 17 only contained the titles, etc. In contrast, in this fifth variation, a case of enabling the user to request the display of various data concerning the detected documents will be described.

In this case, in response to the command from the user entered through the input unit 11, the detection processing unit 13 controls the detection result output unit 17 to display a list containing each set of two keywords in the detection key which are coinciding with the target word and the source word in the semantic structure index memory along with a relation symbol registered between these two keywords.

For example, when the semantic structure index memory is in a state as shown in FIG. 40 which indicates the presence of the documents having different relationships between two keywords "computer" and "design", according to the command from the user entered through the input unit 11, the detection processing unit 13 controls the detection result output unit 17 to display a list for these two semantic structures, whenever one keyword in the detection key coincides with either the target word or the source word for these two semantic structures in the semantic structure index memory.

On the other hand, when the semantic structure index memory is in a state as shown in FIG. 41, the relationships between the keyword "example" and the other keywords can be displayed whenever the keyword "example" in the detection key is detected in the semantic structure index memory, such that the user can immediately recognize the semantic structures contained In the documents stored in the document storage unit 15.

In this case, after the keyword detection operation using the detection key is carried out, according to the command from the user entered through the input unit 11, the detection processing unit 13 looks up the semantic structure index memory for the file name of each document obtained by the keyword detection operation, and controls the detection result output unit 17 to display the document name of each document along with all the semantic structures contained in each document in a format of the target word, the relation symbol, and the source word. At this point, a list display of all the documents containing each semantic structure can be provided for each semantic structure separately along with a display of the semantic structures, such that the user can Immediately recognize the semantic structures contained in the documents obtained by the keyword detection operation.

Similarly, after the semantic structure detection operation using the syntactic and semantic analysis results for the input character string is carried out, according to the command from the user entered through the input unit 11, the detection processing unit 13 looks up the semantic structure index memory for the file name of each document obtained by the semantic structure detection operation, and controls the detection result output unit 17 to display the document name of each document along with all the semantic structures contained in the document in a format of the target word, the relation symbol, and the source word. At this point, a list display of all the documents containing each semantic structure can be provided for each semantic structure separately along with a display of the semantic structures, such that the user may even imagine the text contents of the detected documents.

In addition, after the summary generation operation by the summary generation unit 14 is carried out, the detection control unit 18 can control the detection result output unit 17 to display the summaries of the detected documents as well as the correspondences between the summaries and the semantic structures, such that the user can actually know the text contents of the detected documents.

Next, the sixth variation concerning the use of more than one input sentences will be described. Namely, in the first embodiment described above, only one input sentence has been used. In contrast, in this sixth variation, a case of using more than one input sentences in the detection processing will be described.

In this case, it is possible for the user to enter more than one input sentences or a text. It is also possible to analyze the relationships among more than two keywords for the purpose of the detection processing by the input analysis.

As an example, FIG. 42 shows an exemplary semantic structure index memory in this sixth variation in which one semantic structure is specified by the relationship among three keywords.

In addition, in this sixth variation, the input sentence may be given in a form of a character string such as a file name of a particular document rather than the natural language sentence aimed for commanding the desired detection processing as in the first embodiment described above, such that the detection of the documents similar to the particular document specified by the input character string can be carried out as follows.

In this case, the morphological, syntactic, and semantic analyses are applied to all the sentences in the particular document specified by the input character string and then the appropriate detection keys are produced from the obtained analysis result. Then, the detection processing operation is carried out by using the semantic structures and the detection keys obtained from that particular document, to detect the other documents having the similar semantic structures and keywords as that particular document.

Here, each semantic structure may be associated with a count indicating a number of times at which each semantic structure appears in that particular document, and the detected documents similar to that particular document may be displayed in an order starting from those detected documents containing the semantic structure associated with the larger count.

Next, the seventh variation concerning the procedure for the input analysis and the detection processing will be described. Namely, in the first embodiment described above, the detection processing including the keyword detection operation and the semantic structure detection operation is carried out only after the input analysis including the morphological, syntactic, and semantic analyses of the input character string is completed. In contrast, in this seventh variation, a case of carrying out the keyword detection operation immediately after the morphological analysis of the input character string, which is followed by the syntactic and semantic analyses of the input character string and the semantic structure detection operation, will be described.

In this case, the input analysis unit 12 possesses a keyword extraction rule dictionary for specifying rules for extracting the content words, which has an exemplary form as shown in FIG. 43. Here, the user can freely modify, delete, and add the rules to this keyword extraction rule dictionary.

In this seventh variation, the input analysis and the detection processing are carried out according to the flow chart of FIG. 44 as follows.

First at the step 4401, the input analysis unit 12 carries out the morphological analysis for the input character string, and stores its result into the individual data storage unit 16.

Then, the input analysis unit 12 extracts the content words from the input character string as the detection target keywords according to the morphological analysis result by using the keyword extraction rule dictionary and the unnecessary word dictionary. Here, according to the keyword extraction rule dictionary shown in FIG. 43, the word whose part of speech is noun or verb is extracted as a content word at the step 4402, and the unnecessary word dictionary is looked up for each extracted content word, and those content words not coinciding with the words registered in the unnecessary word dictionary are set as the detection target keywords at the step 4403.

Then, at the step 4404, the input analysis unit 12 produces the detection key by using the obtained keywords and the appropriate logic operators, and store the produced detection key in the individual data storage unit 16. Also, at the step 4405, the related word dictionary is looked up for the keywords, and the detection keys in which the keywords are replaced by the looked up related words are also produced by the input analysis unit 12.

Next, the detection processing unit 13 looks up the keyword index memory for the keywords in the detection key at the step 4406, and then carries out the set calculation for the detected documents according to the detection key and stores its result into the individual data storage unit 16 at the step 4407.

Then, whether there is at least one document is stored in the individual data storage unit 16 and there is a sentence containing more than one keywords in said at least one document, or not is judged at the step 4408.

Only when there is at least one document is stored in the individual data storage unit 16 and there is a sentence containing more than one keywords in said at least one document at the step 4408, the input analysis unit 12 takes out the morphological analysis result stored in the individual data storage unit 16 and carries out the syntactic analysis and the semantic analysis at the steps 4409 and 4410, respectively. Then, at the step 4411, the structure coinciding with that registered in the unnecessary expression extraction rule is deleted.

Then, whether the semantic structure is obtained or not is judged at the step 4412, and only when the semantic structure is obtained, the detection processing unit 13 looks up the semantic structure index memory for the obtained semantic structure at the step 4413, and stores the result obtained at the step 4413 into the individual data storage unit 16 at the step 4414.

Next, the eighth variation concerning the procedure or the treatment of the documents stored in the document storage unit 15 will be described. Namely, in the first embodiment described above, the morphological, syntactic, and semantic analyses are carried out on all the documents stored in the document storage unit 15 in advance to prepare the semantic structure index memory. In contrast, in this eighth variation, a case of not carrying out the morphological, syntactic, and semantic analyses on the documents stored in the document storage unit 15 in advance will be described.

In this case, the detection processing unit 13 carries out the keyword detection operation according to the detection key produced by the input analysis unit 12 and stored in the individual data storage unit 16. Then, when more than one documents are obtained by this keyword detection operation, whether there is a document having at least one sentence containing more than one keywords or not is judged according to the file name of each obtained document and the sentence numbers of the sentences containing the keywords in the obtained document. Then, when such a document exists, the morphological, syntactic, and semantic analyses are carried out for the sentences contained in such a document, and the analysis results are stored in the individual data storage unit 16.

On the other hand, the Input analysis unit 12 takes out the morphological analysis result for the input character string stored in the individual data storage unit 16, and carries out the syntactic and semantic analyses for the input character string. Then, in a case the syntactic and semantic analysis results are obtained, the obtained syntactic and semantic analysis results are matched with the syntactic and semantic analysis results for the documents stored in the individual data storage unit 16, and the matching result is stored in the individual data storage unit 16 as the detection result.

Here, the detection result contains those which are not completely matching, and those which are not completely matching are accompanied by information indicating this fact in the individual data storage unit 16. This information can be used at a time of setting the display priority orders, such that the document without this information is displayed before the document with this information among the documents in the same display priority order.

For example, when the semantic structure obtained from the input sentence is as indicated in (a) of FIG. 45, and there is a document containing an expression "design automation system using computer" which has the semantic structure as indicated in (b) of FIG. 45, such a document will be included in the detection result even though this semantic structure of (b) of FIG. 45 does not match the semantic structure of (a) of FIG. 45 completely, because this semantic structure of (b) of FIG. 45 contains all of the keyword "computer", the relation "instrument", and the keyword "design"0 relevant to the semantic structure of (a) of FIG. 45.

Next, the ninth variation concerning the procedure for the detection processing and the summary generation will be described. Namely, in the first embodiment described above, the detection processing including the keyword detection operation and the semantic structure detection operation and the summary generation are carried out continuously. In contrast, in this ninth variation, the user is allowed to specify the order for carrying out the keyword detection operation, the semantic structure detection operation, and the summary generation operation, and to command whether or not to continue the subsequent processing after each of the keyword detection operation, the semantic structure detection operation, and the summary generation operation is completed.

In this case, the user can specify the order of executions of the operations by various modules, and command whether or not to continue the subsequent processing, according to the selected document storage unit or the particular detection target document.

Next, the tenth variation concerning the display of the summary will be described. Namely, in the first embodiment described above, the summary generation unit 14 does not provide any information concerning the manner in which the summary had been produced. In contrast, in this tenth variation, the reliability of the summary is indicated by displaying a number or a rate of the rhetorical expressions used as clues for producing the summary.

In this case, the display of the detection result or the summary includes a number of rhetorical expressions such as "for example", "as a background", etc., or a rate of these rhetorical expressions with respect to a total number of clauses in the entire document, or the rate of a number of characters in these rhetorical expressions with respect to a total number of words in the entire document.

For example, FIG. 46 shows an exemplary screen display of the detection result containing the summary reliability given by a percentage indicating the rate of a number of characters in the rhetorical expressions with respect to a total number of words in the entire document.

Next, the eleventh variation concerning the treatment of data used in the detection processing will be described. Namely, in the first embodiment described above, the keywords and/or the semantic structures used in the detection processing are not retained after the detection processing is completed. In contrast, in this eleventh variation, a case of retaining the keywords and/or the semantic structures used in the already completed detection processing will be described.

In this case, the detection control unit 18 stores the keywords and/or the semantic structures contained in the summary generated by the summary generation unit 14, in relation to the document from which the summary has been generated, in the document storage unit 15. Then, in a case the keywords and/or the semantic structures stored in relation to the document exist, the detection processing unit 13 carries out the keyword detection operation and/or the semantic structure detection operation by using these stored keywords and/or semantic structures.

Here, instead of storing the keywords and/or semantic structures in relation to the document, the summary keyword index memory and/or the summary semantic structure index memory may be produced and utilized in the detection processing.

Next, the twelfth variation concerning the use of the summary will be described. Namely, in the first embodiment described above, the summary is generated only after the detection processing is completed. In contrast, in this twelfth variation, the summaries are generated for all the documents stored in the document storage unit 15 in advance, and the keyword index memory and the semantic structure index memory used in the detection processing are formed by only those keywords and semantic structures which are contained in the generated summaries.

In this case, the detection processing unit 13 carries out the keyword detection operation and the semantic structure detection operation for only those keywords and semantic structures which are contained in the generated summaries.

Next, the thirteenth variation concerning the expression of the semantic structure will be described. Namely, in the first embodiment described above, the semantic structure is expressed by using words. In contrast, in this thirteenth variation, a case of expressing the semantic structure by using the symbols or the numbers assigned to the meanings of words will be described.

In this case, the input analysis unit 12 possesses an analysis word dictionary for storing the description of the meaning of each word and a symbol or a number assigned to it. Here, in a case the word used in the input character string is a multivocal word, the user is allowed to select a desired meaning from a plurality of meanings displayed by the detection result output unit 17. Also, the input analysis unit 12 stores the symbol or the number corresponding to the selected meaning along with the word in the analysis result memory and the individual data storage unit 16.

In this case, the detection processing by the detection processing unit 13 and the summary generation operation by the summary generation unit 14 are also carried out in terms of the symbols or the numbers instead of the words.

Next, the fourteenth variation concerning the manner of displaying the detection result will be described.

In this fourteenth variation, the display means 4 in the overall configuration of FIG. 1 uses a bit map display in which the display screen can be divided such that a list of identifiers of the detected documents can be displayed simultaneously along the text content of the original document and the summary for a selected one of the detected documents. The user enters the input for selecting the desired one of the detected documents as well as command input for controlling the manner of detection result display, through the input means 6. Here, the detection processing unit 13 stores either the detected documents themselves or their identifiers as the detection result obtained by the detection processing operation in the individual data storage unit 16.

Also, in the first embodiment described above, the input from the user is given in a natural language and the morphological, syntactic, and semantic analyses are applied to the input given in a natural language, but in this fourteenth variation, the keywords or the detection keys may be entered directly. When the input is given by the keywords or the detection keys directly, the operation at the input analysis unit 12 can be skipped and the detection processing unit 13 can be activated immediately.

Also, in the first embodiment described above, all the detected documents obtained by the detection processing operation by the detection processing unit 13 are stored in the individual data storage unit 16. However, in this fourteenth variation, all the detected documents are stored in the individual data storage unit 16 only when a number of detected documents is relatively small, and when a number of detected documents is relatively large, only the identifiers of the detected documents are stored as the detection result in the individual data storage unit 16, and the summary generation unit 14 and the detection result output unit 17 obtains the detected documents themselves from the document storage unit 15 according to the identifiers stored in the individual data storage unit 16. It is also possible for the individual data storage unit 16 to utilize an externally connected disk memory to store the detected documents temporarily in a case a number of detected documents is large.

Also, in this fourteenth variation, the summary generated by the summary generation unit 14 contains various information such as a correspondence relationship between the original document and the summary, the title, author, chapter and section headers, etc. of the document, as well as the abstract of each chapter of the document.

After the operation by the summary generation unit 14 is completed, the detection control unit 18 controls the detection result output unit 17 to display a list of the identifiers of the detected documents in a prescribed display priority order, while simultaneously displaying the summary and the text content of the original document for the detected document with the highest display priority order on the divided display screen.

When the user enters the input for selecting the document identifier for the document other than the document with the highest display priority order, the display of the summary and the original document are changed to those for the selected document identifier. When the user enters the input for requesting the change of the displayed content of either one of the summary and the original document, the displayed content of the requested one of the summary and the original document is changed accordingly, and the displayed content of the other one of the summary and the original document is also changed in correspondence.

Here, it is also possible for the summary generation unit 14 to generate the summary only for the document with the highest display priority order at first, and whenever the request to change the displayed document is entered by the user, the summary generation unit 14 is activated to generate the summary for the requested new document to be displayed.

Figure 47:
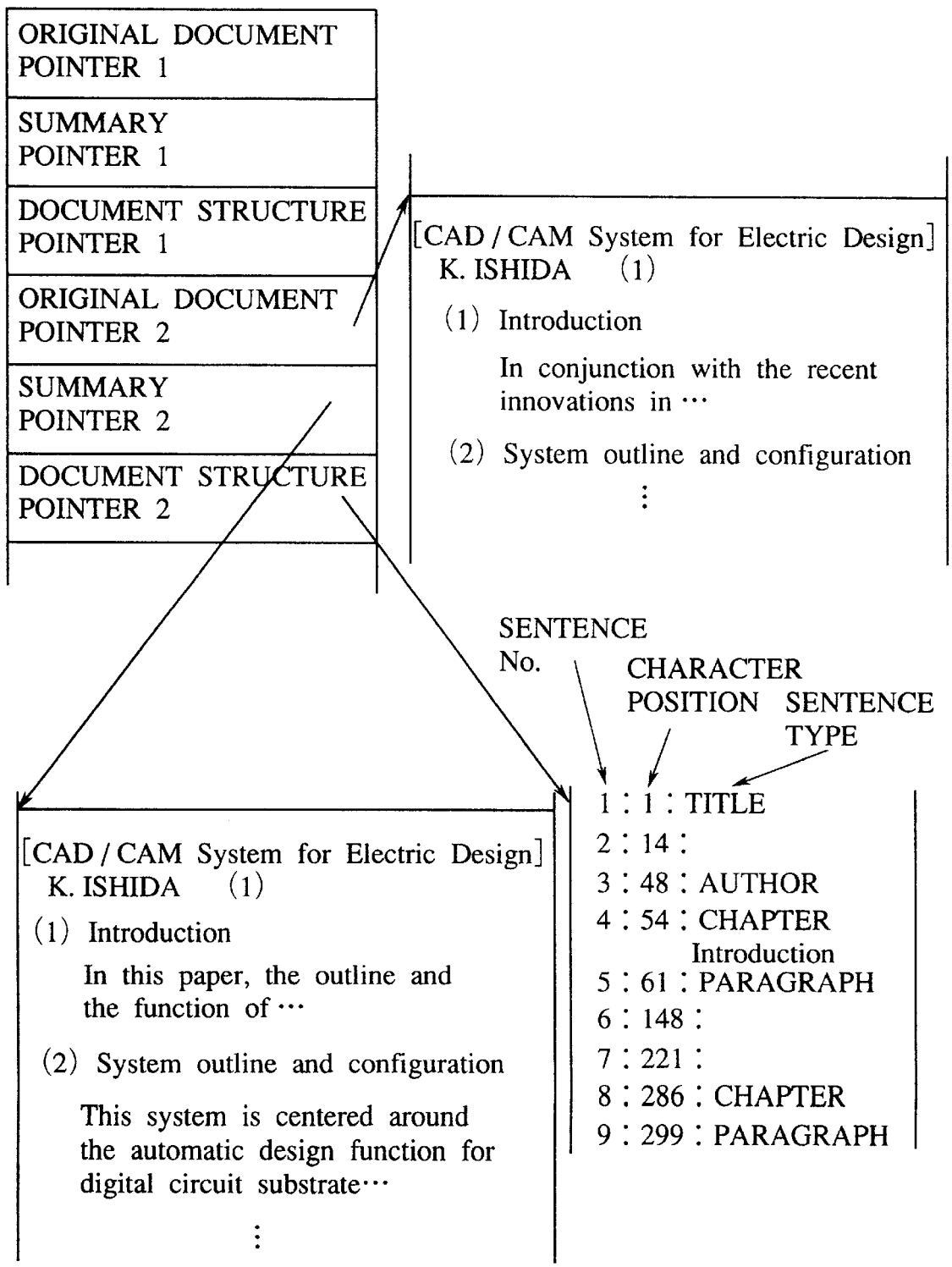
FIG. 47 is a diagrammatic illustration of an exemplary summary information memory in the individual data storage shown in FIG. 2 in the fourteenth variation of the first embodiment.

In this fourteenth variation, the individual data storage unit 16 stores the correspondences between the summaries and the original documents in a form of a summary information memory shown in FIG. 47. In this case, each summary information memory data includes an original document pointer, a summary pointer, and a document structure pointer to the document structure of the original document, which are stored in a continuous memory region to indicate their correspondences. Here, the document structure of the original document contains various information such as the sentence numbers and the sentence positions in the original document, the sentence title, author, chapter and section headers, etc. corresponding to the sentence numbers. Also, the summary contains summary sentences as well as the sentence numbers in the original document indicating the correspondences between the summary and the original document.

Here, the detection control unit 18 also determines the display priority order among the detected documents according to the prescribed priority order conditions provided as a display priority rule dictionary in the detection control unit 18, similar to the first embodiment described above. The detection control unit 18 then controls the detection result output unit 17 to display a list of the identifiers of the detected documents in the determined display priority order as the detection result.

As a concrete example, FIG. 48 shows an exemplary detection result display in which the title and the author of the document are used as the document identifier, and in which a plurality of document identifiers are arranged in the display priority order determined by the detection control unit 18. In FIG. 48, a frame enclosing the title of one document indicates the currently selected document. Thus, in the initial detection result display, the frame is located around the title of the first document in the list which has the highest display priority order as shown in FIG. 48. In addition, the detection result display also include the display of the summary as shown in FIG. 49 for the first document in the list shown in FIG. 48 as an example, and the display of the original document as shown in FIG. 50 for the first document in the list shown in FIG. 48 as an example.

Here, Just as in the first embodiment described above, the detection processing unit 13 counts a number of times each document has been detected as the detection result and stores this number of detections for each document in the document storage unit 15. Then, in a case the detection result includes more than one documents with the same display priority order, the document with the greater number of detections is displayed before the document with the lesser number of detections.

Next, the fifteenth variation concerning the detailed manner for changing the displayed content in the detection result display will be described.

Figure 51:
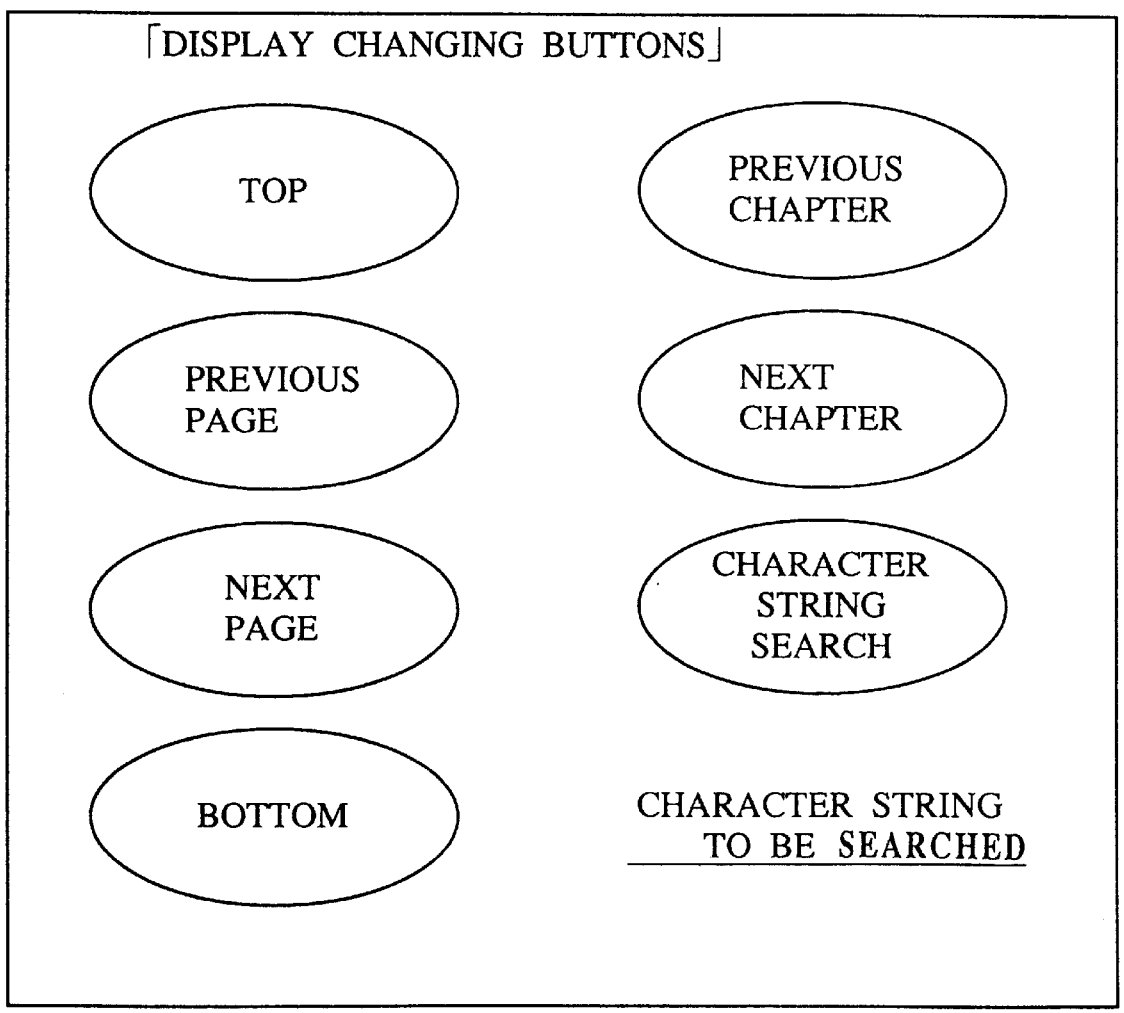
FIG. 51 is an illustration of an exemplary screen display for display change command input used in the fifteenth variation of the first embodiment.

FIG. 51 shows an exemplary screen display for allowing the user to change the displayed content in the detection result display. In this fifteenth variation, the commands for changing the displayed content of the detection result display are entered by selecting appropriate one of the displayed buttons by using the mouse. To this end, in FIG. 51, the display changing buttons are provided for commanding a top, previous page, next page, bottom, previous chapter, next chapter, and character string search. For example, by selecting the next page button, the displayed content of the summary and the original document as shown in FIGS. 49 and 50 can be changed to those shown in FIGS. 52 and 53, for example.

Figure 54A:
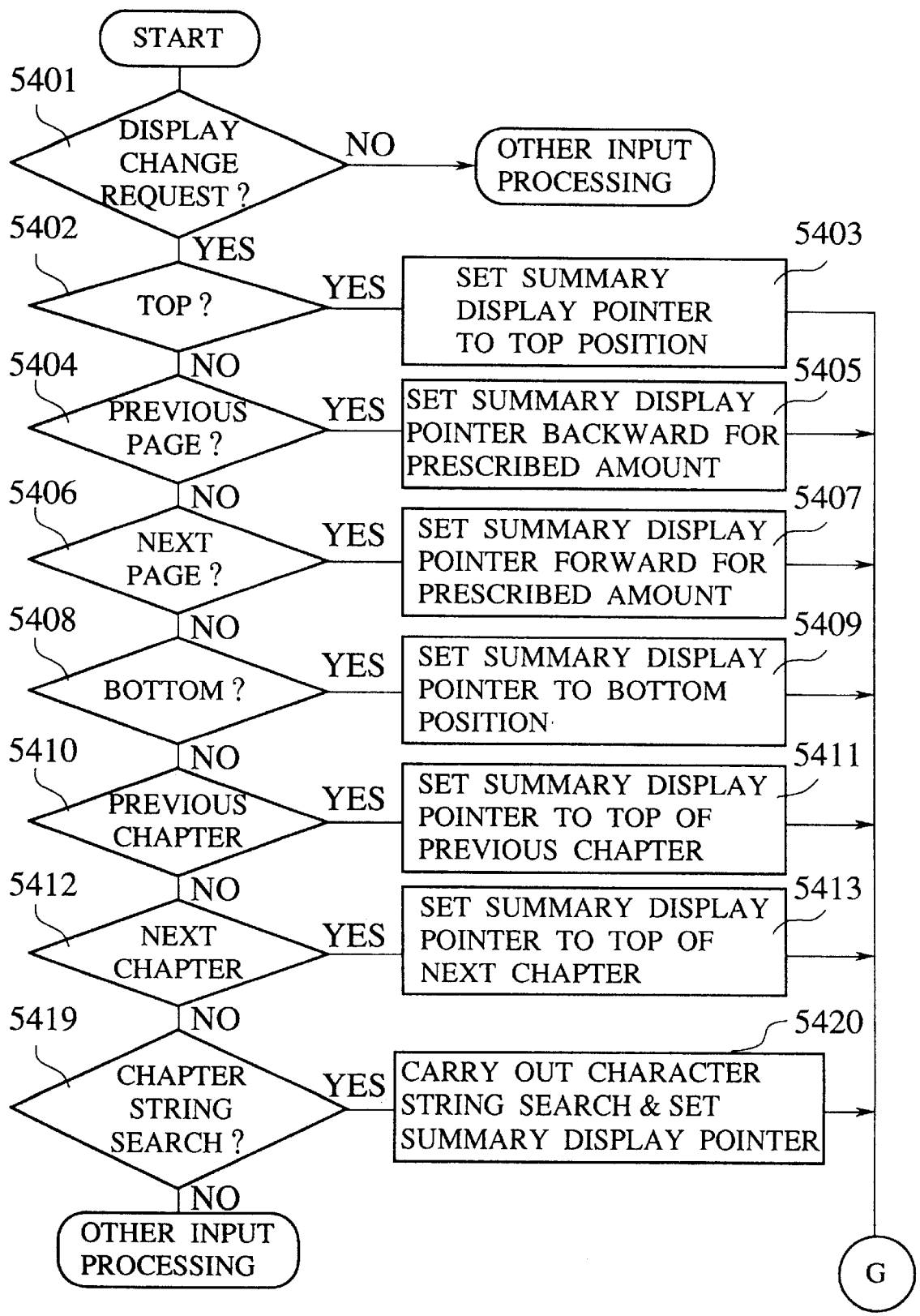
FIGS. 54A and 54B are a flow chart for an operation in the fifteenth variation of the first embodiment.
Figure 54B:
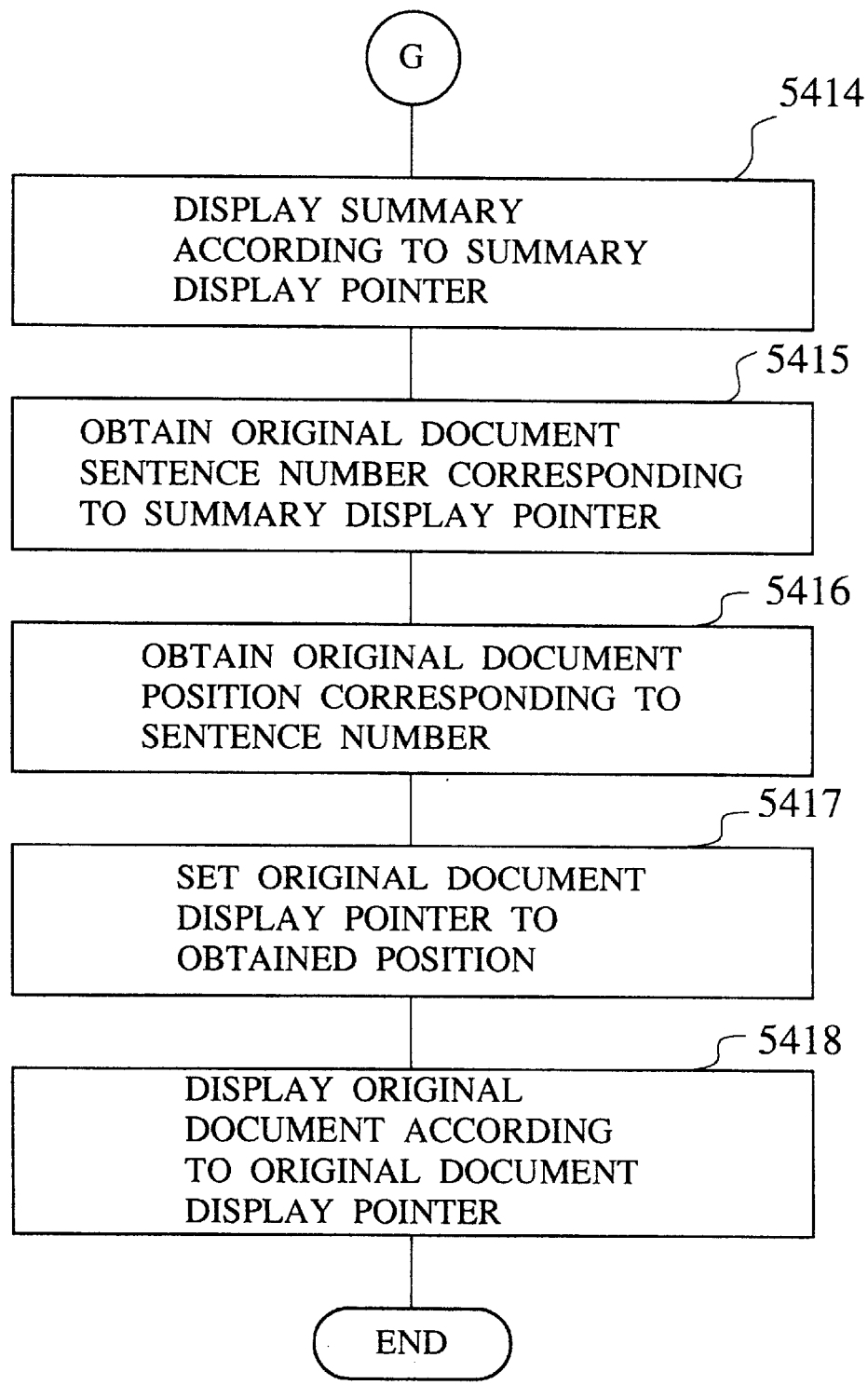

In further detail, the operation to change the displayed content in the detection result display can be carried out according to the flow chart of FIGS. 54A and 54B, as follows.

First, when the display change request from the user is detected at the step 5401, which one of the display changing buttons has been selected by the user is judged by sequentially comparing the requested code with the codes assigned to the top button, the previous page button, the next page button, the bottom button, the previous chapter button, the next chapter button, and the character string search button, at the steps 5402, 5404, 5406, 5408, 5410, 5412, and 5419, respectively.

When it is judged that the top button has been selected at the step 5402, next at the step 5403, the summary display pointer is shifted to the top position. When it is judged that the previous page button has been selected at the step 5404, next at the step 5405, the summary display pointer is shifted backward for a prescribed amount proportional to one screen display size. Here, the summary display pointer is shifted for a prescribed amount proportional to one screen display size such that the user can set up the size of each page freely by changing the size of the summary display. Similarly, when it is judged that the next page button has been selected at the step 5406, next at the step 5407, the summary display pointer is shifted forward for a prescribed amount proportional to one screen display size. When it is judged that the bottom button has been selected at the step 5408, next at the step 5409, the summary display pointer is shifted to the bottom position. When it is judged that the previous chapter button has been selected at the step 5410, next at the step 5411, the summary display pointer is shifted to the top of the previous chapter. When it is judged that the next chapter button has been selected at the step 5412, next at the step 5413, the summary display pointer is shifted to the top of the next chapter. When it is judged that the character string search button has been selected at the step 5419, next at the step 5420, the character string search for the specified character string to be searched is carried out on the summary and the summary display pointer is shifted to a position of the searched out character string.

After the shifting of the summary display pointer is completed at the step 5403, 5405, 5407, 5409, 5411, 5413, or 5420, next at the step 5414, the displayed content of the summary is changed according to the shifted summary display pointer.

Then, the sentence number in the original document registered at a position pointed by the summary display pointer is taken out at the step 5415, and the corresponding position in the original document is determined by sequentially comparing the taken out sentence number with the sentence numbers registered in the document structure of the original document at the step 5416.

Then, at the step 5417, the original document display pointer is shifted to the corresponding position determined at the step 5416, and the displayed content of the original document is changed according to the shifted original document display pointer at the step 5418.

Figure 55:
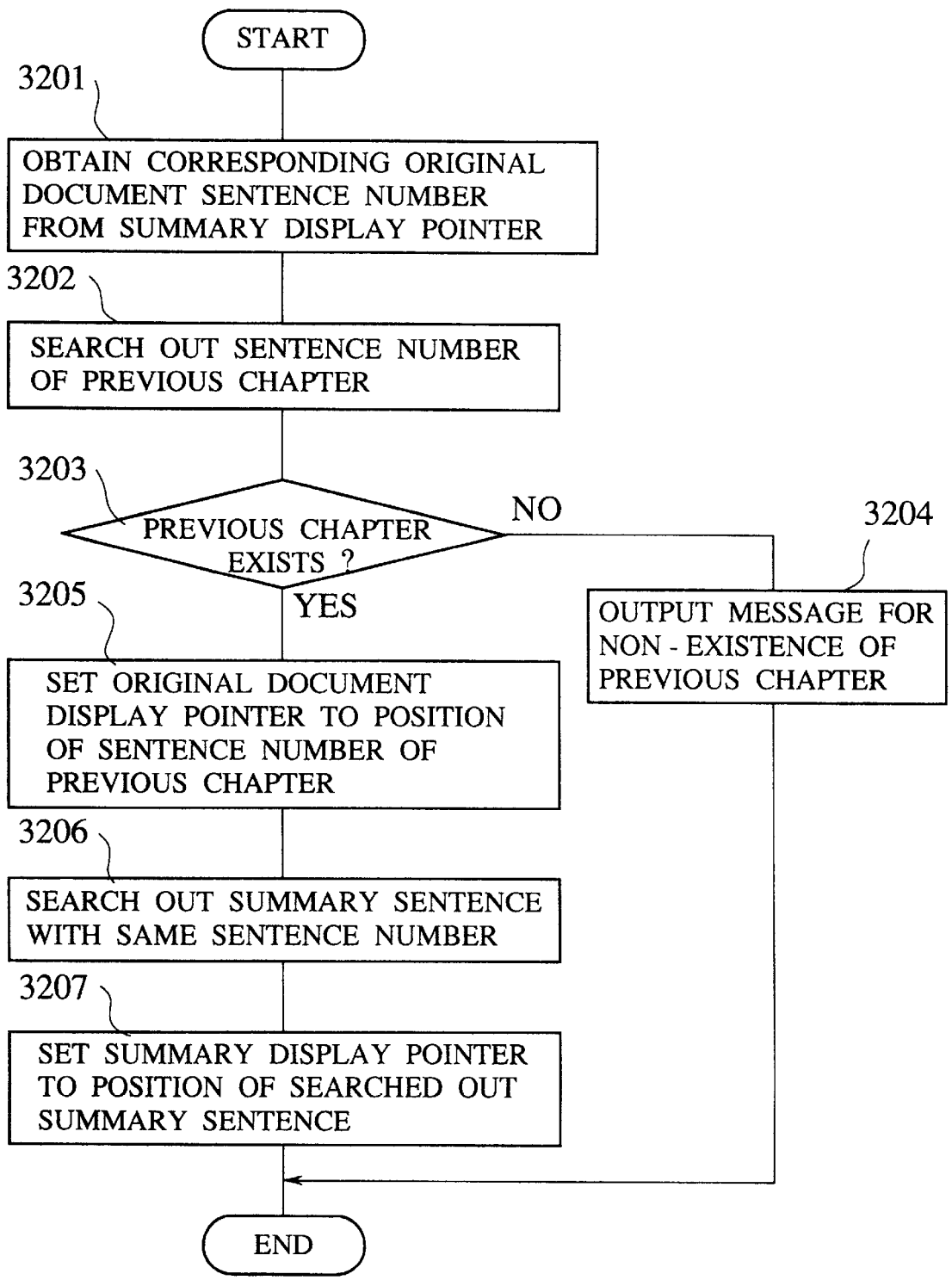
FIG. 55 is a flow chart for a pointer shifting operation in response to a previous page button in the fifteenth variation of the first embodiment.

In the display changing operation described above, in a case the previous chapter button has been selected, the shifting of the summary display pointer and the original document display pointer can be achieved by utilizing the document structure of the original document according to the flow chart of FIG. 55 as follows.

Namely, the sentence number in the original document registered at a present position pointed by the summary display pointer is taken out at the step 3201, and the taken out sentence number is sequentially compared with the sentence numbers registered in the document structure of the original document, to search out the sentence number of the immediately previous chapter at the step 3202. Then, whether the previous chapter actually exists or not is determined at the step 3203. If the previous chapter does not exist, next at the step 3204, the message indicating the non-existence of the previous chapter is displayed as a reply, whereas otherwise, the position of the searched out sentence number of the previous chapter is set to the original document display pointer at the step 3205. Then, the sentence which has the same sentence number as the searched out sentence number of the previous chapter is searched in the summary at the step 3206, and the position of the searched out sentence which has the same sentence number as the searched out sentence number of the previous chapter is set to the summary display pointer at the step 3207.

The similar procedure can also be used in a case the next chapter button has been selected.

In the display changing operation described above, the character string search operation to be carried out at the step 5420 is already well known so that its detail will be omitted. Also, this character string search operation may be carried out with respect to the original document instead of the summary as described above, by simply changing the target of the comparison.

In this fifteenth variation, when the change of the displayed content is requested for the original document, the displayed content of the summary is changed in correspondence. As a concrete example, by selecting the next page button for the original document, the displayed content of the summary and the original document as shown in FIGS. 52 and 53 can be changed to those shown in FIGS. 56 and 57, for example.

Also, when the user enters the input for selecting the document identifier for the document other than the document with the highest display priority order, the display of the summary and the original document are changed to those for the selected document identifier. As a concrete example, FIG. 58 shows an exemplary detection result display in which the third document on the list is selected. In this case, the displayed contents of the summary and the original document are changed accordingly from those shown in FIGS. 56 and 57 to those shown in FIGS. 59 and 60, for example. Here, the correspondence between the selected identifier and the summary and the original document corresponding to the selected identifier can be recognized easily by utilizing the fact that the summary information memory contains the pointer to the original document, the pointer to the summary, and the pointer to the document structure for each document in a continuous memory region.

Next, the sixteenth variation concerning the manner for controlling an amount of summary sentences in each summary to be displayed on the detection result display will be described.

In this sixteenth variation, there is provided a screen display shown in FIG. 61 for indicating and changing the items to be contained in the summary display. In FIG. 61, those items with markings entered in accompanying boxes are the currently selected items to be contained in the summary display, so that the title, the chapter header, the abstracts of the chapters are currently contained in the displayed summary. However, as for the abstracts of the chapters, only the chapters "Introduction" and "Conclusion" are marked, so that the abstracts of only these two chapters are included.

As a concrete example, when the settings of the items for the summary display is as indicated in FIG. 61, an exemplary summary display appears as shown in FIG. 62, for the original document shown in FIG. 60. Here, the items to be contained in the summary display can be judged according to the document structure of document registered in the summary information memory.

Figure 63:
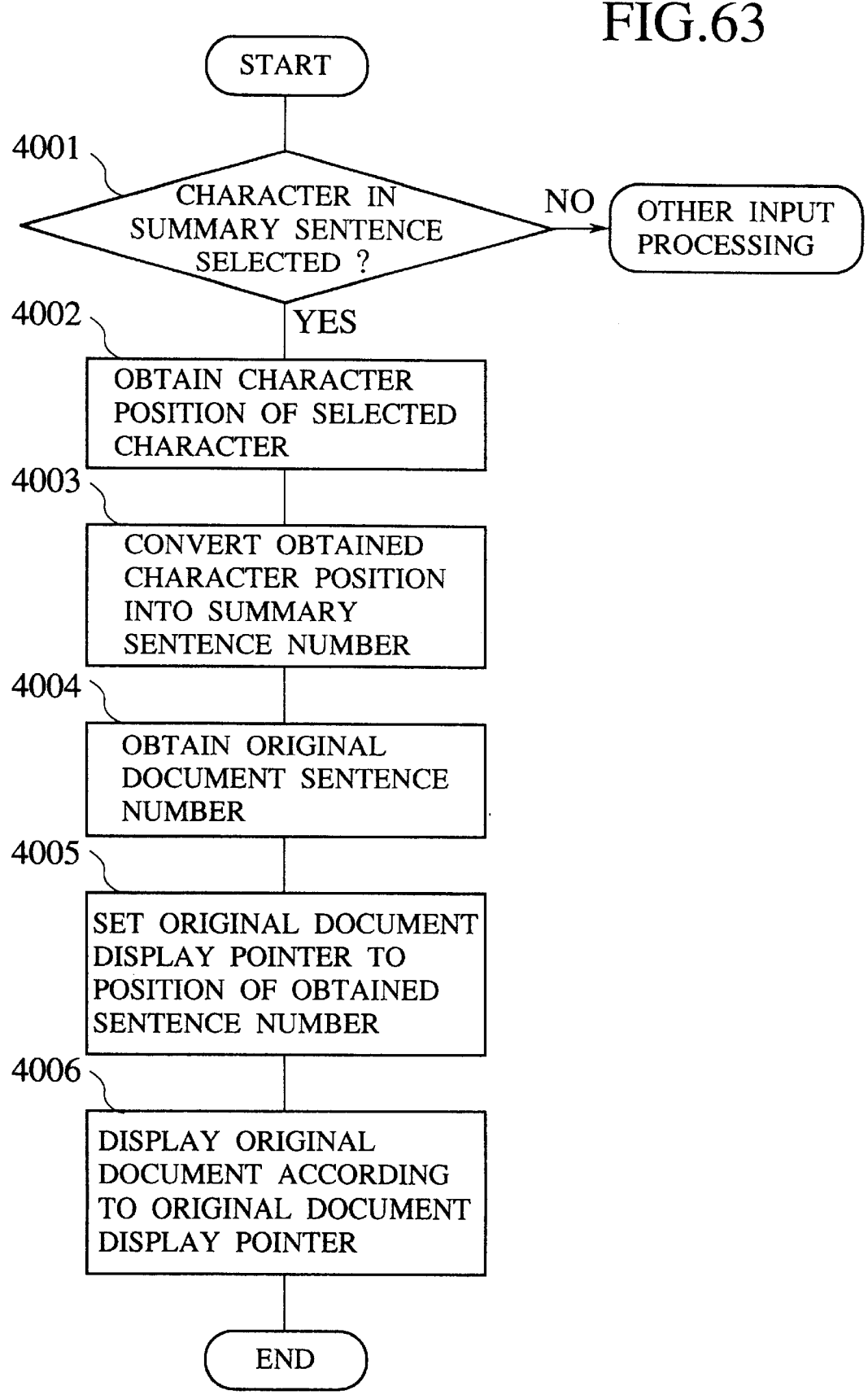
FIG. 63 is a flow chart for an operation in the sixteenth variation of the first embodiment.

In this sixteenth variation, the display of the desired portion of the original document can be obtained by specifying a corresponding portion in the summary by using the mouse, according to the flow chart of FIG. 63 as follows. Here, for the sake of explanation, a specific case of obtaining the display of a portion in the original document corresponding to "3. System function" in the summary shown in FIG. 62 will be described.

In this case, the user moves the mouse to any character within "3. System function" portion of the summary display and clicks the mouse button.

Then, at the step 4001, whether the character in the summary sentence has been selected or not is checked in order to distinguish this operation from the other input processing. When the character on the summary document is selected, next at the step 4002, the character position of the selected character is obtained. In this example, the character position is specified by a number of characters from the first character in the summary display to the selected character.

Next, at the step 4003, the obtained character position is converted into the summary sentence number. This conversion can be carried out by using a summary sentence table shown in FIG. 64, in which the corresponding character positions and the sentence number in the original document are enlisted for each displayed summary sentence number. Thus, the summary sentence number can be obtained by sequentially comparing the obtained character position with the character position ranges in this summary sentence table to find out the character position range containing the obtained character position. Then, at the step 4004, the corresponding original document sentence number is obtained from this summary sentence table. In a case the character in "3. System function" is selected, the character position is within the range of 95 to 102, so that the summary sentence number can be determined as "5", and the corresponding original document sentence number can be determined as "16" according to the summary sentence table of FIG. 64.

Then, at the step 4005, the position of the obtained original document sentence number is determined, and set to the original document display pointer. Here, the position of the obtained original document sentence number can be determined by sequentially comparing the obtained original document sentence number with the sentence numbers registered in the logical structure of the original document to find out the corresponding position.

Finally, at the step 4006, the original document is displayed according to the original document display pointer set at the step 4005.

As a concrete example, FIG. 65 shows the original document display for the original document corresponding to the summary shown in FIG. 62, when "3. System function" is selected.

It is to be noted here that, apart from the various variations described above, it is also possible to modify the first embodiment described above such that, at a time of generating the summaries at the summary generation unit 14, the generated summaries may be stored in the document storage unit 15 in order to construct the system with spare memory capacity. It is also possible to modify the first embodiment described above such that, instead of storing the generated summaries as the text data, only the document structure and the text structure obtained by the document structure analysis unit 141 and the text structure analysis unit 142 in a process of the summary generation are stored, and the summary is reproduced whenever necessary by the key sentence Judgement unit 143 and the text re-construction unit 144 from the stored document structure and text structure.

As described in detail above, according to the first embodiment and its variations, the desired documents can be detected according to the detection key produced from the natural language input sentence, and the detection result for those documents containing the identical syntactic and semantic structures as the natural language input sentence in the text contents or the summaries can be presented to the user, so that those documents which are likely to be desired by the user can be displayed at the higher priority from a large number of documents in the document database, and consequently it becomes possible for the user to obtain the desired document easily, accurately, and efficiently.

Now, the second embodiment of a document detection system according to the present invention will be described in detail. In the following, those elements which are substantially equivalent to the corresponding elements in the first embodiment described above will be given the same reference numerals in the drawings, and their detailed descriptions are omitted. Also, those elements which are similar but not identical to the corresponding elements in the first embodiment described above will be given the same reference numerals with apostrophe attached in the drawings.

In this second embodiment, the document detection system has an overall configuration similar to that shown in FIG. 1 for the first embodiment described above.

Figure 66:
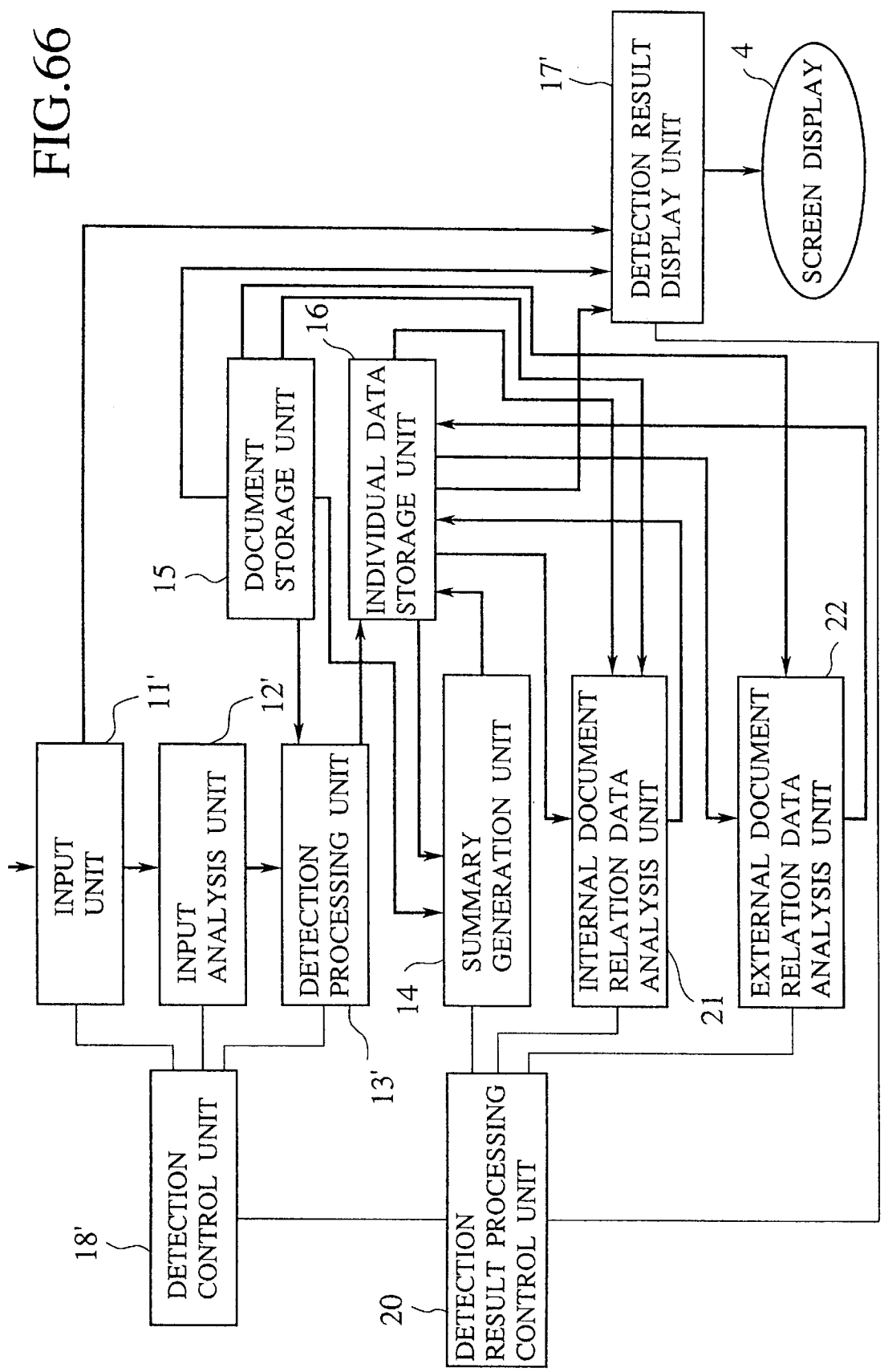
FIG. 66 is a block diagram for a functional configuration of a main part of the document detection system according to the second embodiment of the present invention.

Here, however, in further detail, a main portion of the document detection system of this second embodiment has a functional configuration as shown in FIG. 66, which comprises: an input unit 11' for entering an input sentence containing keywords and natural language sentences for a detection command from the user; an input analysis unit 12' for analyzing the input sentence entered at the input unit 11' and converting it into the detection command; a detection processing unit 13' for carrying out the detection processing for detecting documents according to the detection command; a summary generation unit 14 for producing a summary of each detected document; an internal document relation data analysis unit 21 for analyzing internal relations within each document; an external document relation data analysis unit 22 for analyzing external relations of each document with external documents; a detection result output unit 17' for outputting various results obtained by the detection processing unit 13', the summary generation unit 14, the internal document relation data analysis unit 21, and the external document relation data analysis unit 22, while managing user interactions; a document storage unit 15, connected with the detection processing unit 13', the summary generation unit 14, the internal document relation data analysis unit 21, the external document relation data analysis unit 22, and the detection result output unit 17', for storing the document database; an individual data storage unit 16, connected with the detection processing unit 13', the summary generation unit 14, the internal document relation data analysis unit 21, the external document relation data analysis unit 22, and the detection result output unit 17', for storing individual data including the detected documents and the generated summaries; a detection control unit 18' for controlling the operations of the detection processing operation by the input unit 11', the input analysis unit 12', and the detection processing unit 13'; and a detection result processing control unit 20 connected with the detection control unit 18' for controlling detection result processing operation by the summary generation unit 14, the internal document relation data analysis unit 21, the external document relation data analysis unit 22, and the detection result output unit 17'.

In this FIG. 66, the document storage unit 15 and the individual data storage unit 16 belong to the memory means 2 in the overall configuration of FIG. 1, while the input unit 11', the input analysis unit 12', the detection processing unit 13', the summary generation unit 14, the detection result output unit 17', the internal document relation data analysis unit 21, the external document relation data analysis unit 22, the detection control unit 18', and the detection result processing control unit 20 belong to the central processing means 1 in the overall configuration of FIG. 1. Also, in this FIG. 66, the thick arrows indicate data lines while thin lines indicate control lines.

In this functional configuration of FIG. 66, the detection control unit 18' controls each processing module to realize the following detection processing operation sequence.

Namely, the input sentence entered at the input unit 11' is transferred to the input analysis unit 12' at which a list of keywords in the input sentence is constructed as the detection command to be handed over to the detection processing unit 13'.

The detection processing unit 13' then detects a set of relevant documents according to the detection commands from the document data stored in the document storage unit 15, and stores a set of detected documents into the individual data storage unit 16.

After this detection processing operation sequence is completed, the detection control unit 18' transmits an activation signal to the detection result processing control unit 20 to hand over the control.

In response, the detection result processing control unit 20 takes out the original documents stored in the document storage unit 15 according to the detected documents stored in the individual data storage unit 16, and controls the detection result processing operations of the summary generation unit 14, the internal document relation data analysis unit 21, and the external document relation data analysis unit 22, for each detected document, as follows.

The summary generation unit 14 generates a summary for each detected document from the original document, and stores the generated summary along with a correspondence data indicating a correspondence to the original document into the individual data storage unit 16.

The internal document relation data analysis unit 21 and the external document relation data analysis unit 22 carry out appropriate analyses to obtain the external and internal document relation data and store them into the individual data storage unit 16.

After these detection result processing operations are completed, the detection result processing control unit 20 activates the detection result output unit 17' to display or change the detection results, the summaries, and the external and internal document relation data stored in the individual data storage unit 16, according to the command input entered from the user through the input unit 11'.

Then, the detection result processing control unit 20 transmits the activation signal to the detection control unit 18' to return the control.

Now, the detailed operation of each processing module in this second embodiment will be described in detail.

Figure 67:
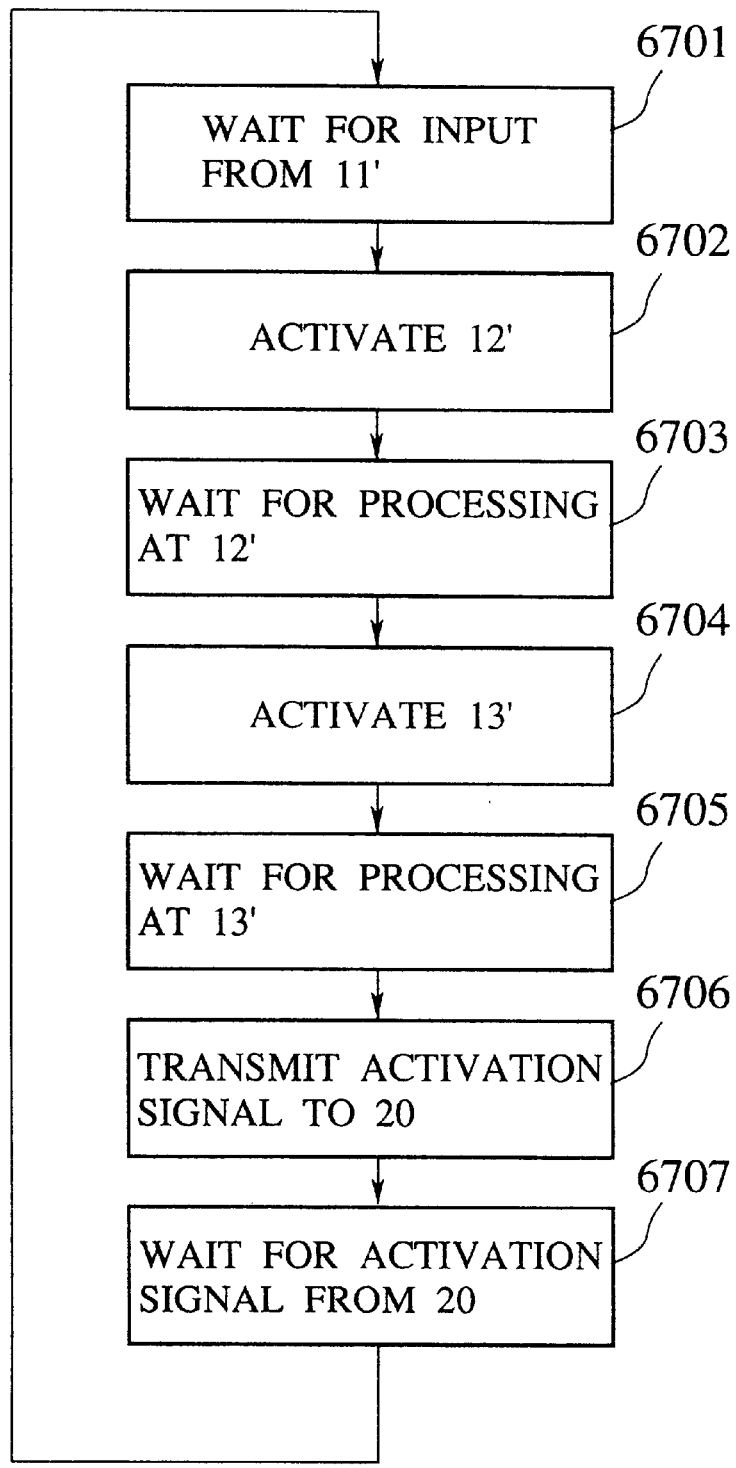
FIG. 67 is a flow chart for an operation of a detection control unit in the main part shown in FIG. 66.

First, the detection control unit 18' operates according to the flow chart of FIG. 67, as follows.

At first, the detection control unit 18' awaits for the input at the input unit 11' at the step 6701. Then, when the input at the input unit 11' is detected, the input analysis unit 12' is activated at the step 6702. Next, the detection control unit 18' awaits for the end of the processing at the input analysis unit 12' at the step 6703. Then, when the end of the processing at the input analysis unit 12' is detected, the detection processing unit 13' is activated at the step 6704. Next, the detection control unit 18' awaits for the end of the processing at the detection processing unit 13' at the step 6705. Then, when the end of the processing at the detection processing unit 13' is detected, the activation signal is transmitted to the detection result processing control unit 20 so as to hand over the control at the step 6706. Next, the detection control unit 18' awaits for the transmission of the activation signal from the detection result processing control unit 20 at the step 6707. Then, when the activation signal is received from the detection result processing control unit 20, the detection control unit 18' recovers the control and the operation returns to the step 6701 to repeat the process of the steps 6701 to 6707 for the next input.

Figure 68:
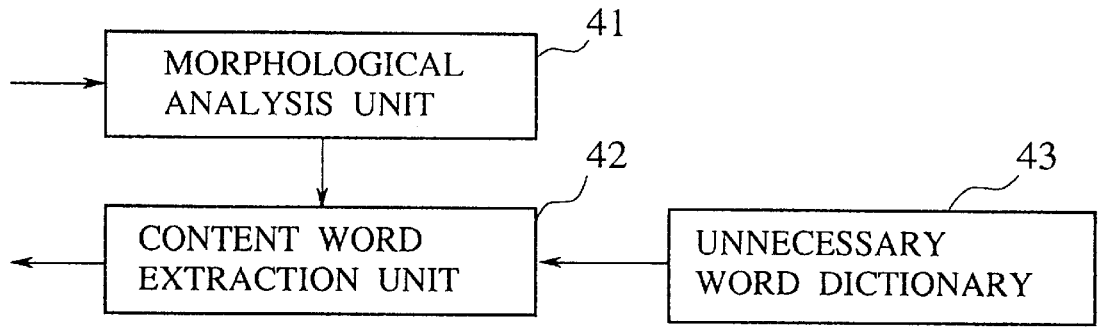
FIG. 68 is a detailed block diagram for a functional configuration of an input analysis unit in the main part shown in FIG. 66.

Next, the input analysis unit 12' has a detailed functional configuration as shown in FIG. 68, which comprises: a morphological analysis unit 41, a content word extraction unit 42, and an unnecessary word dictionary 43 utilized by the content word extraction unit 42.

Figure 69:
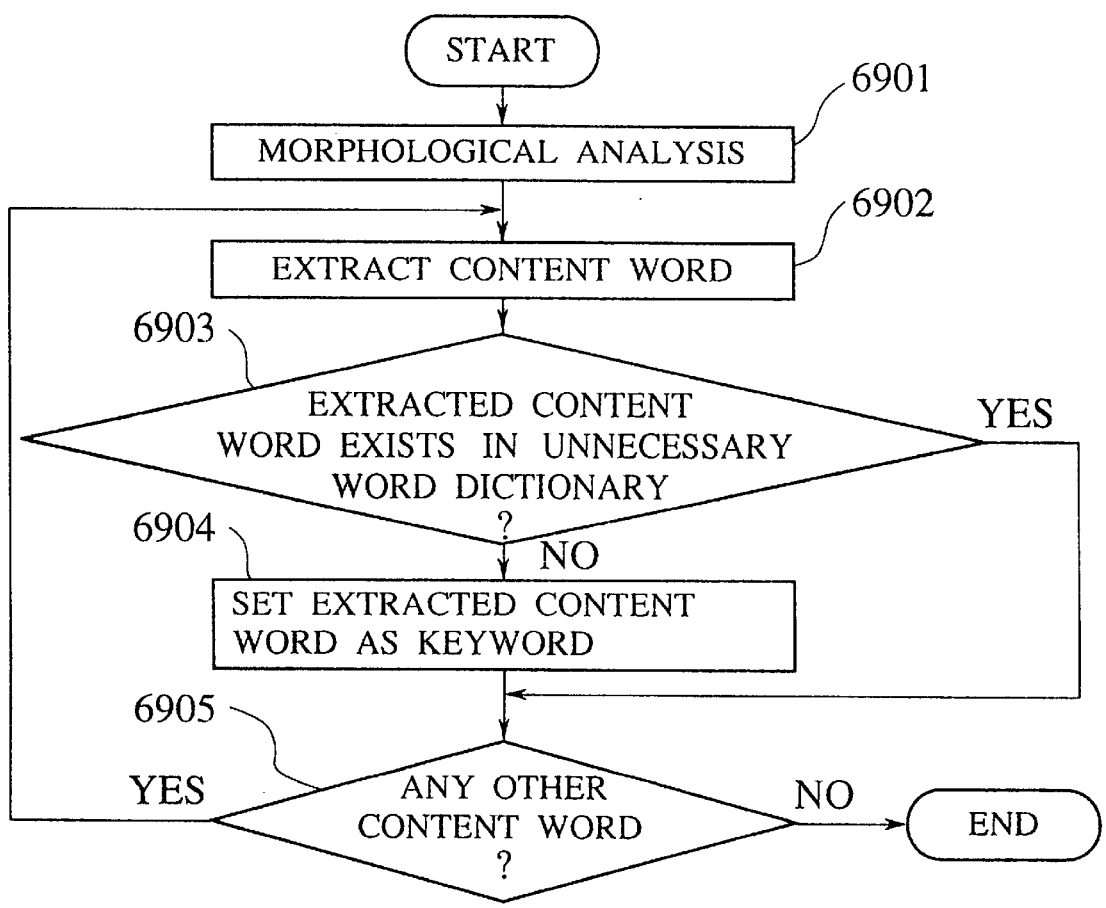
FIG. 69 is a flow chart for an operation of the input analysis unit of FIG. 68.

With this functional configuration of FIG. 68, the input analysis unit 12' operates according to the flow chart of FIG. 69, as follows.

First, at the step 6901, the morphological analysis is carried out on the input sentence at the morphological analysis unit 41 to divide the input sentence into words. Here, the details of the morphological analysis to be carried out at this step 6901 is not essential to the present invention, and any known schemes can be adopted.

Next, at the step 6902, the content word is extracted from the input sentence at the content word extraction unit 42 according to the morphological analysis result. Then, at the step 6903, whether the content word extracted at the step 6902 exists in the unnecessary word dictionary 43 or not is determined, and only when the extracted content word is not in the unnecessary word dictionary 43, the extracted content word is set as the detection target keyword at the step 6904, whereas otherwise the step 6904 is skipped.

Then, whether there is any other content word in the input sentence or not is determined at the step 6905, and only when there is another content word in the input sentence, the operation returns to the step 6902 above to repeat the steps 6902 to 6904 for the next content word in the input sentence, until all the content words in the input are extracted.

Figures 70, 71:
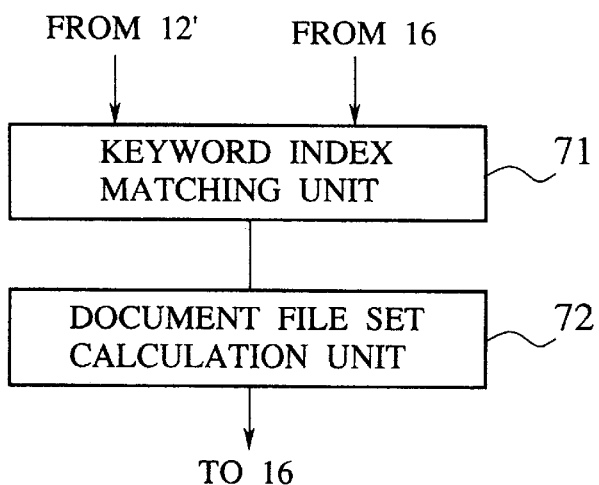
FIG. 70 is a table of exemplary results obtained at various stages in the flow chart of FIG. 69.
FIG. 71 is a detailed block diagram for a functional configuration of a detection processing unit in the main part shown in FIG. 66.

As a concrete example of the result of the operation by this input analysis unit 12', FIG. 70 shows an exemplary input sentence, and various results obtained at various stages in the operation of this input analysis unit 12'. More specifically, for the input sentence indicated in (a) of FIG. 70, the morphological analysis result appears as indicated in (b) of FIG. 70 in which the input sentence is divided into words.

Then, the content word extraction result appears as indicated in (c) of FIG. 70 in which the content words "topics", "translation", and "examples" are extracted from the morphological analysis result.

Finally, the detection target keywords to be handed over to the detection processing unit 13' appear as indicated in (d) of FIG. 70 in which only "translation" and "examples" are set as the keywords, assuming that "topics" is on the unnecessary word dictionary 43.

Next, the detection processing unit 13' has a detailed functional configuration as shown in FIG. 71, which comprises: a keyword index matching unit 71 connected with the input analysis unit 12' and the individual data storage unit 16, and a document file set calculation unit 72 connected with the keyword index matching unit 71.

The keyword index matching unit 71 carries out the detection operation for each keyword entered from the input analysis unit 12' on the document data in the document storage unit 15 to obtain a set of documents containing the same keyword. The document file set calculation unit 72 then carries out a logical set calculation for the documents obtained by the keyword index matching unit 71 for all the keywords to obtain the final document file set for the detected documents. Here, the dictionary storage unit 15 possesses the keyword index memory similar to that shown in FIG. 12 for the first embodiment described above, and this operation of the detection processing unit 13' can be carried out by the same procedure as that shown in FIGS. 14A and 14B for the first embodiment described above.

Here, it is to be noted that this second embodiment will be described for a case in which each document in the document database has its own keywords specified in advance, although it is also possible to apply this second embodiment to the document database in which the keywords are not specified for each document in advance, by utilizing the known technique of the entire document detection scheme.

Figure 72:
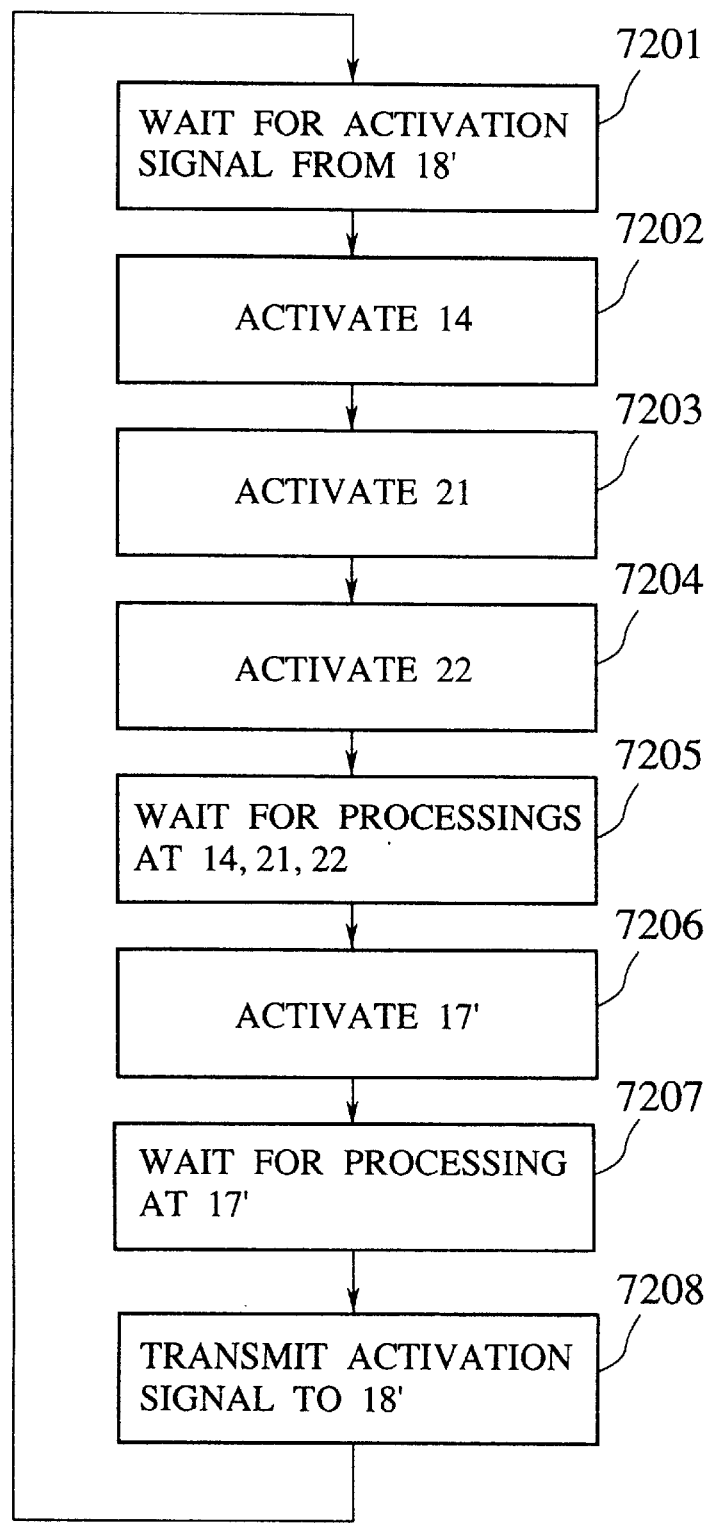
FIG. 72 is a flow chart for an operation of a detection result processing control unit in the main part shown in FIG. 66.

Next, the detection result processing control unit 20 operates according to the flow chart of FIG. 72, as follows.

At first, the detection result processing control unit 20 awaits for the transmission of the activation signal from the detection control unit 18' at the step 7201. Then, when the activation signal is received from the detection control unit 18', the summary generation unit 14, the internal document relation data analysis unit 21, and the external document relation data analysis unit 22 are activated at the steps 7202, 7203, and 7204, respectively. Next, the detection result processing control unit 20 awaits for the ends of the processings at the summary generation unit 14, the internal document relation data analysis unit 21 and the external document relation data analysis unit 22 at the step 7205. Then, when the ends of the processings at the summary generation unit 14, the internal document relation data analysis unit 21 and the external document relation data analysis unit 22 are detected, the detection result output unit 17' is activated at the step 7206. Next, the detection result processing control unit 20 awaits for the end of the processing at the detection result output unit 17' at the step 7207. Then, when the end of the processing at the detection result output unit 17' is detected, the detection result processing control unit 20 transmits the activation signal to the detection control unit 18' to return the control at the step 7208, and the operation returns to the step 7201 to repeat the process of the steps 7201 to 7208 for the next detection result.

Figure 21:
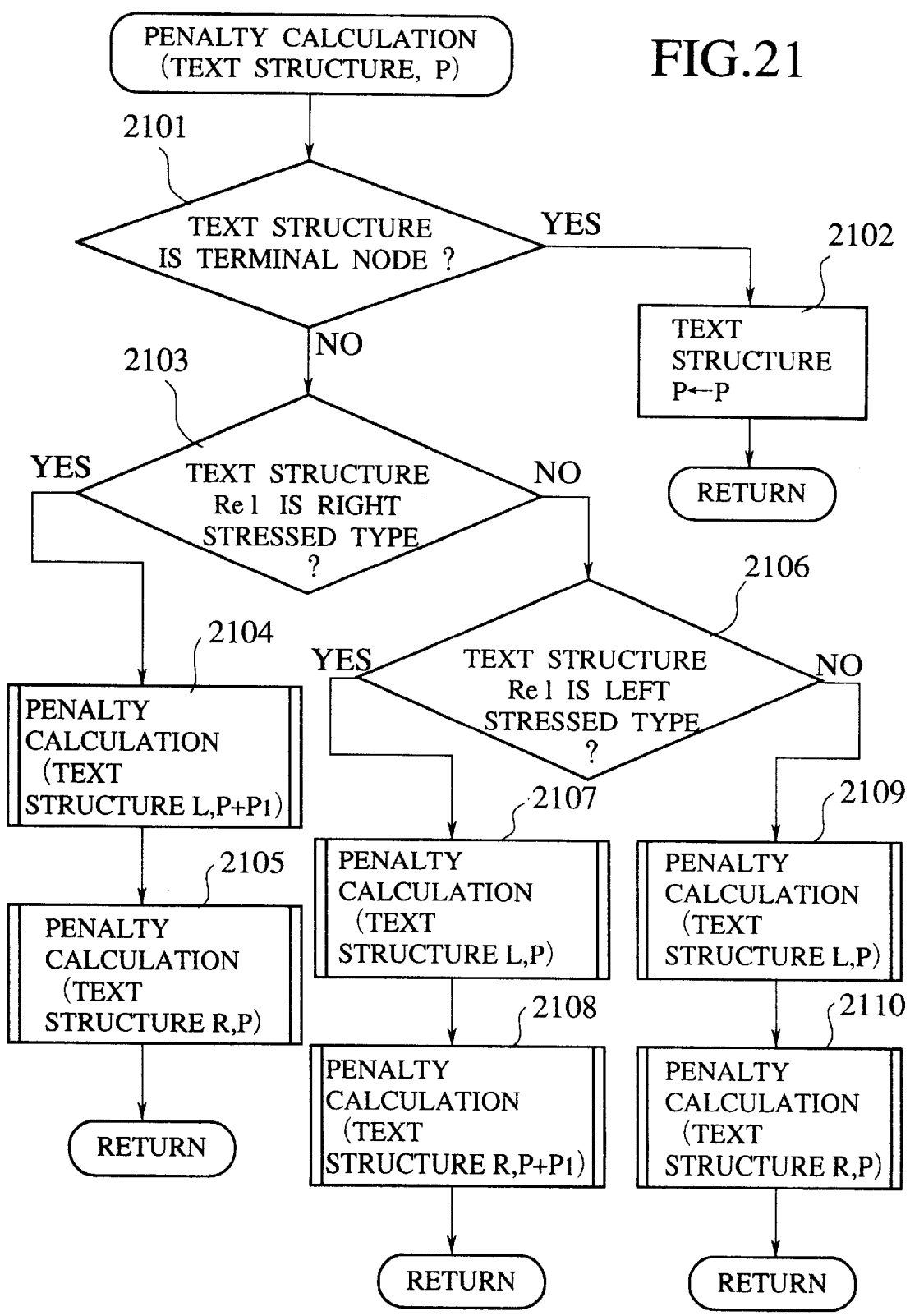
FIG. 21 is a detailed flow chart for a penalty calculation to be carried out by a key sentence Judgement unit in the summary generation unit of FIG. 17.
Figure 22:
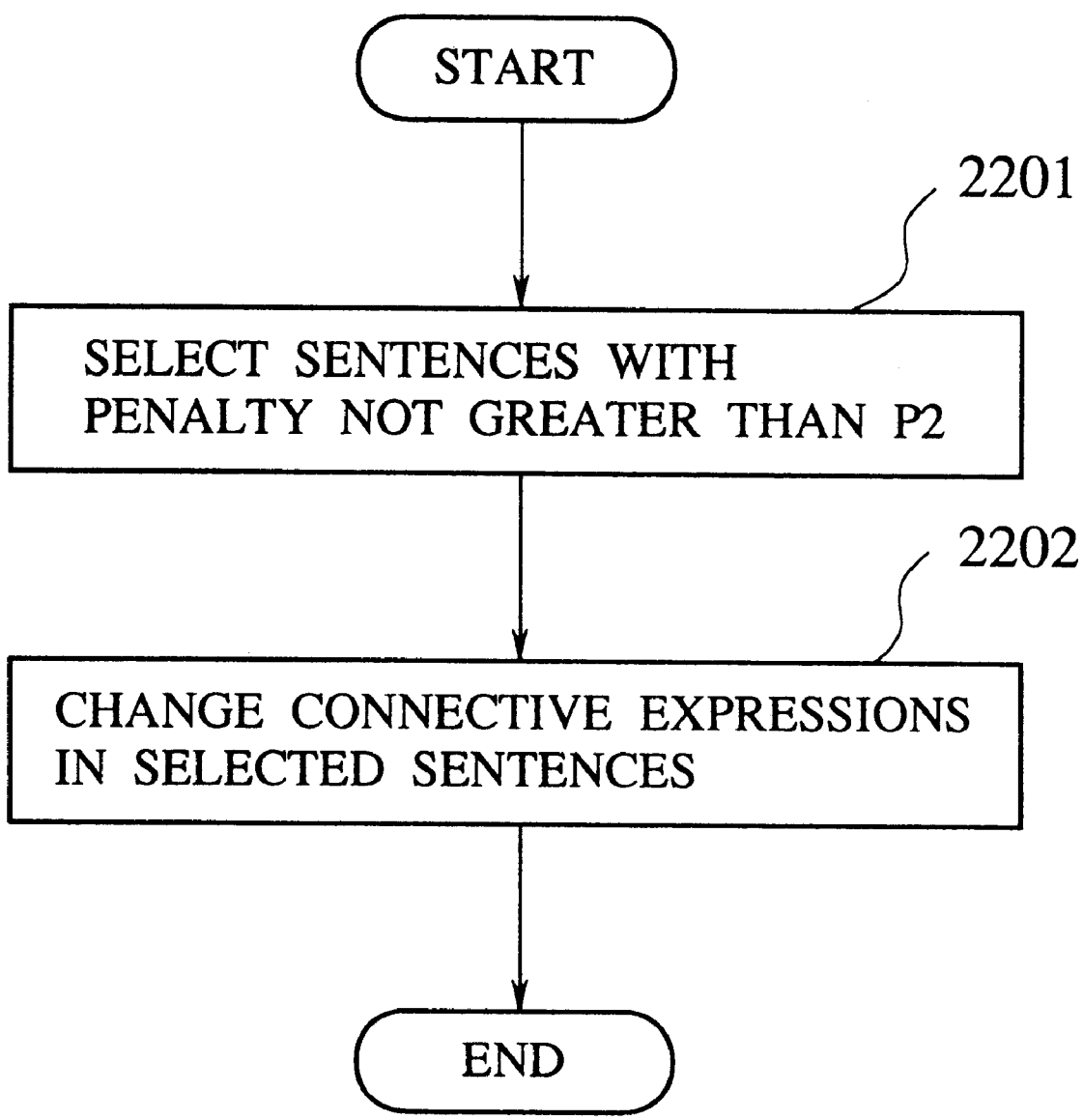
FIG. 22 is a flow chart for a text re-construction unit in the summary generation unit of FIG. 17.

In this second embodiment, the summary generation has a functional configuration identical to that shown in FIG. 17 for the first embodiment described above, in which the text structure is expressed by the data structure identical to that shown in FIG. 19 described for the first embodiment above, and the key sentence judgement unit and the text re-construction unit 144 operates according to the flow charts of FIGS. 20 to 22 as described for the first embodiment above.

Next, the internal document relation data analysis unit 21 carries out the following operation.

Namely, the document data may contain the technical terms of a particular field or special words defined within the document itself. In this regard, since the summary is generated by the summary generation unit 14 by selecting key sentences alone from the document, there is a possibility for the selected key sentences to contain such technical terms or special words without their definitions, as their definitions are given in the other non-selected earlier part of the documents, such that the user reading the summary can be unable to understand the meaning of such technical terms or special words. In order to remedy this situation, the internal document relation data analysis unit 21 extracts the definitions of the technical terms or special words from the document and relate them to the technical terms or special words used in the summary.

For example, in a case of the exemplary document shown in FIG. 73, the sentence 2 contains an abbreviated word "ACRDM" without its definition within this sentence, because this word is defined in the sentence 1, such that the user reading only this sentence 2 will be unable to understand what this word "ACRDM" means without the prior knowledge of what this technical term means.

Figure 74:
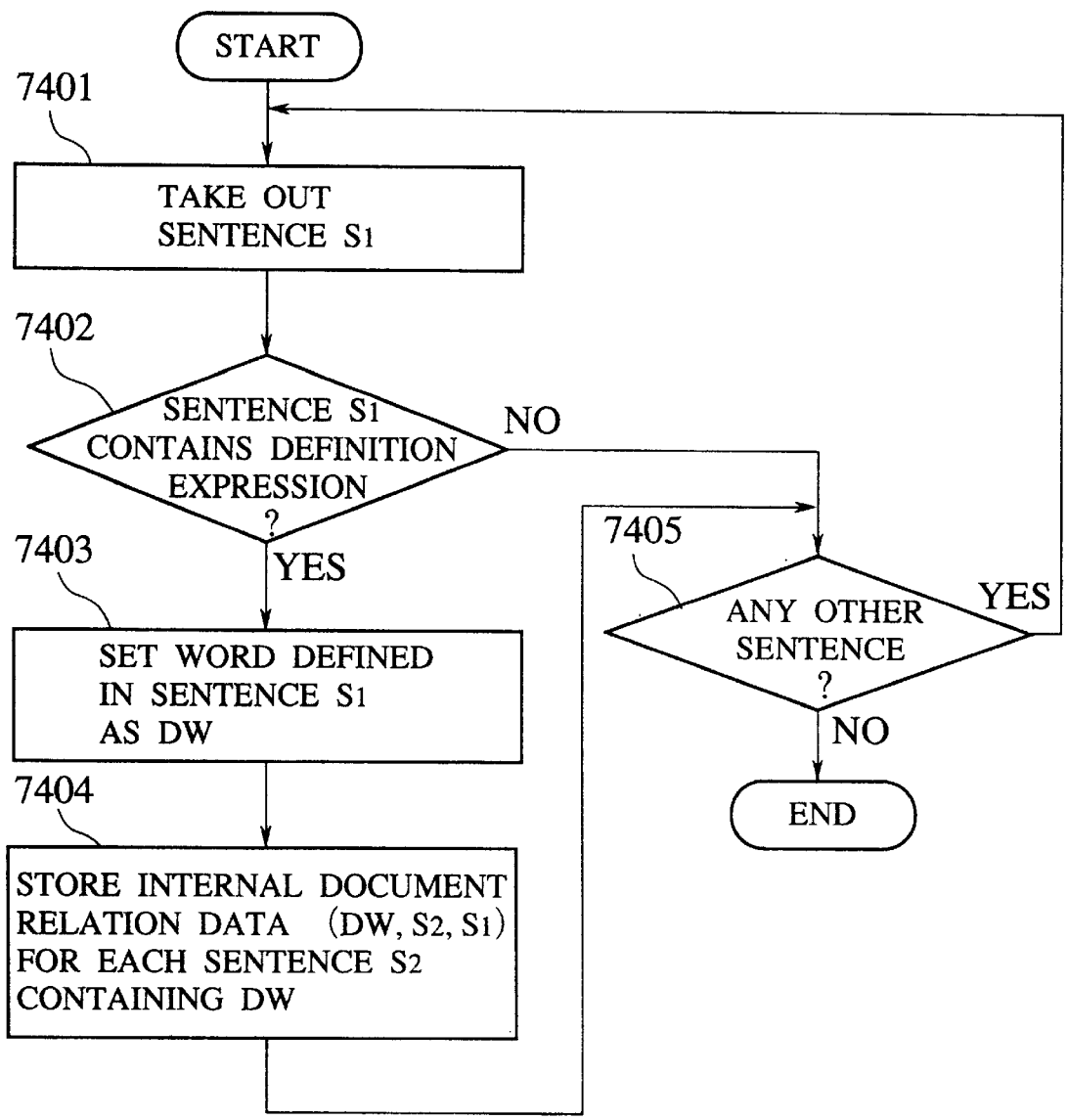
FIG. 74 is a flow chart for an operation of an internal document relation data analysis unit in the main part shown in FIG. 66.

In such a case, the internal document relation data analysis unit 21 is operated according to the flow chart of FIG. 74, as follows.

Namely, each sentence S1 of each document is taken out at the step 7401, and whether this sentence S1 contains the definition expression for the target word or not is judged at the step 7402.

In a case the sentence S1 does not contains the definition expression for the target word, the operation proceeds to the step 7405 described below. Otherwise, the target word defined in this sentence S1 is set as the word DW at the step 7403, and data in a form (DW, S2, S1) for the target word DW, a sentence S2 containing the target word DW, and the defining sentence S1 of the target word is stored as the internal document relation data at the step 7404.

These steps 7401 to 7404 are repeated for all the sentences of each document by the step 7405.

In this operation, the definition expression can be detected at the step 7402 as follows.

First, whether each noun in each sentence is contained in any preceding sentence of that each sentence is judged, starting from the top sentence of the document to the immediately preceding sentence of that each sentence sequentially. Then, when the preceding sentence containing each noun in each sentence is found, the morphological and syntactic analyses are applied to that preceding sentence to obtain the syntactic structure of that preceding sentence. Here, the syntactic structure contains the relationships of relating and related among clauses, as well as the syntactic categories for the clauses.

Next, the obtained syntactic structure of that preceding sentence is compared with the prescribed definition expression patterns provided in table format to determine whether that that preceding sentence is the defining sentence or not. For example, the definition expression patterns can be specified as follows.

(1) $(noun phrase) ($(noun phrase))

(2) $(noun phrase) is called $(noun phrase)

Here, "$" in the expression pattern indicates the syntactic category, so that the comparison is made for the syntactic category obtained in the syntactic structure.

In the above examples, the pattern (1) indicates the appearance of the noun phrase in parentheses immediately after another noun phrase, which corresponds to a type of definition expression in which the abbreviated expression is juxtaposed with the full expression. For example, in the above example of FIG. 73, "an advanced control rod drive mechanism (ACRDM) . . . " corresponds to this pattern (1).

On the other hand, the pattern (2) indicates a form of the definition expression such as "In this paper, the logical structure of the sentence defined by the rhetorical expressions such as a connective will be called text structure", for example.

When that preceding sentence matches with any of the prescribed definition expression patterns, that preceding sentence can be judged as the defining sentence of the noun which is found to be contained in that preceding sentence, for which the internal document relation data can be produced as described above. Then, when the defining sentence for a certain word is found out, the other sentences containing that certain word are searched out, and the internal document relation data are produced for the other sentences containing that certain word as well.

Next, the external document relation data analysis unit 22 carries out the following operation.

Namely, the external document relation data analysis unit 22 analyzes the relationships among the documents concerning a part in each document at which each reference document is referred. For example, in a case a certain reference document is referred at a background section in one document, that certain reference document has a relationship of the background with respect to that one document. Similarly, in a case a certain reference document is referred at a section describing the definition in another document, that certain reference document has a relationship of the definition with respect to that another document.

Figure 75:
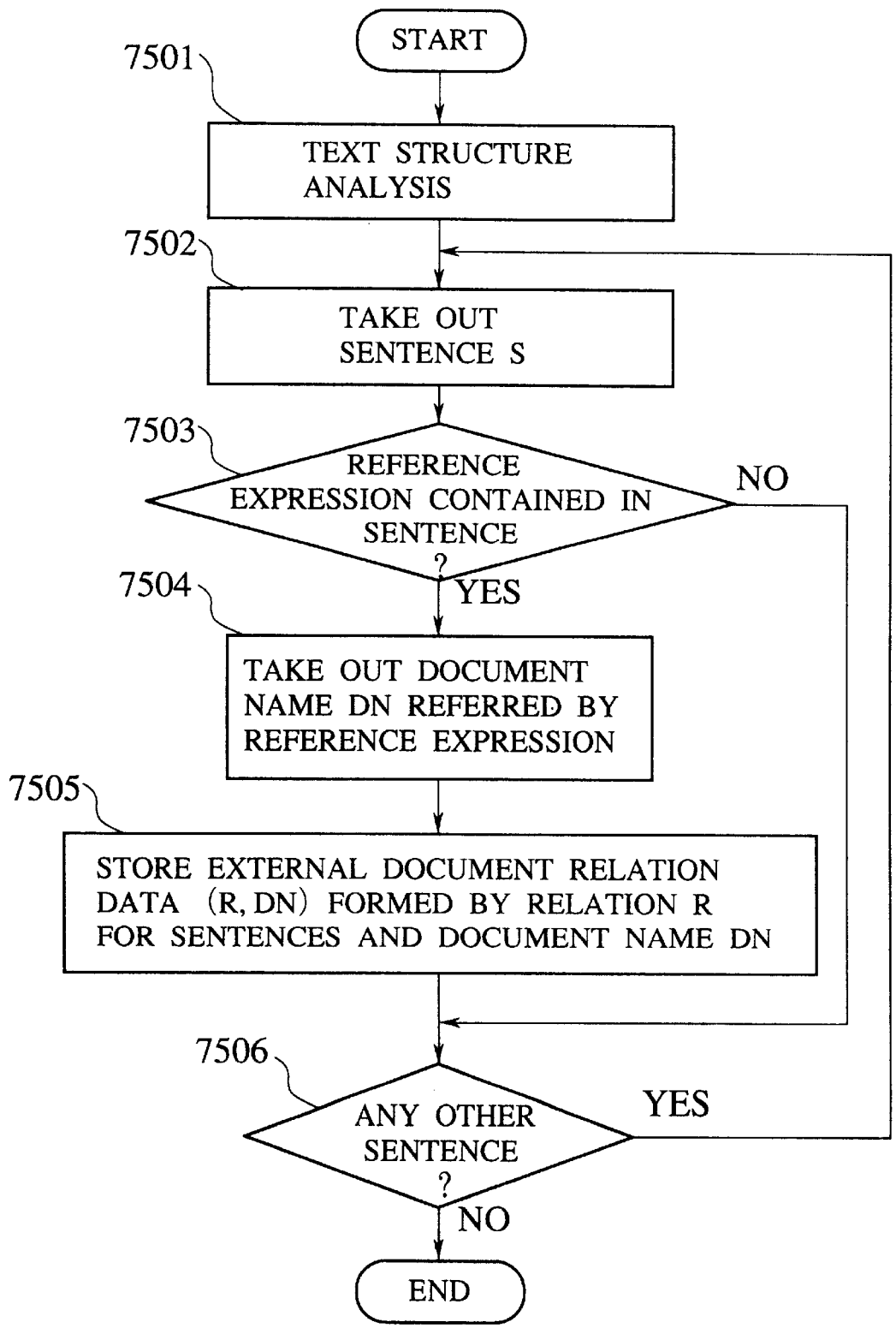
FIG. 75 is a flow chart for an operation of an external document relation data analysis unit in the main part shown in FIG. 66.

In order to analyze such relationships among the documents, the external document relation data analysis unit 22 is operated according to the flow chart of FIG. 75, as follows.

First, at the step 7501, the text structure analysis is carried out for all the documents in the system. Here, the text structure analysis to be carried out is essentially the same as that utilized in the summary generation operation at the summary generation unit 14, so that the text structure analysis results obtained by the summary generation unit 14 may be utilized directly in this external document relation data analysis unit 22.

Next, each sentence S of each document is taken out at the step 7502, and whether the reference expression is contained in this sentence S or not is judged at the step 7503.

In a case the reference expression is not contained in this sentence S, the operation proceeds to the step 7506 described below. Otherwise, the document name DN of the reference document referred by the reference expression in this sentence S is taken out at the step 7504, and a pair (R, DN) of the relation R obtained for the sentence S by the text structure analysis and the document name DN referred by the reference expression is store as the external document relation data.

These steps 7502 to 7505 are repeated for all the sentences of each document by the step 7506.

In this operation, the reference expression can be detected at the step 7503 by matching each sentence S with the prescribed reference expression patterns provided in table format. For example, the reference expression patterns can be specified as follows.

(1) <superscript start control code>($(number)) <superscript end control code>

(2) [$(proper noun) $(number)]

Here, the pattern (1) corresponds to a type of the reference expression in which the reference number is indicated as superscript at a pertinent portion, while the pattern (2) corresponds to another type of the reference expression in which the reference document is indicated in an abbreviated key formed by the author's last name and a number such as [Sato 91].

Figure 76:
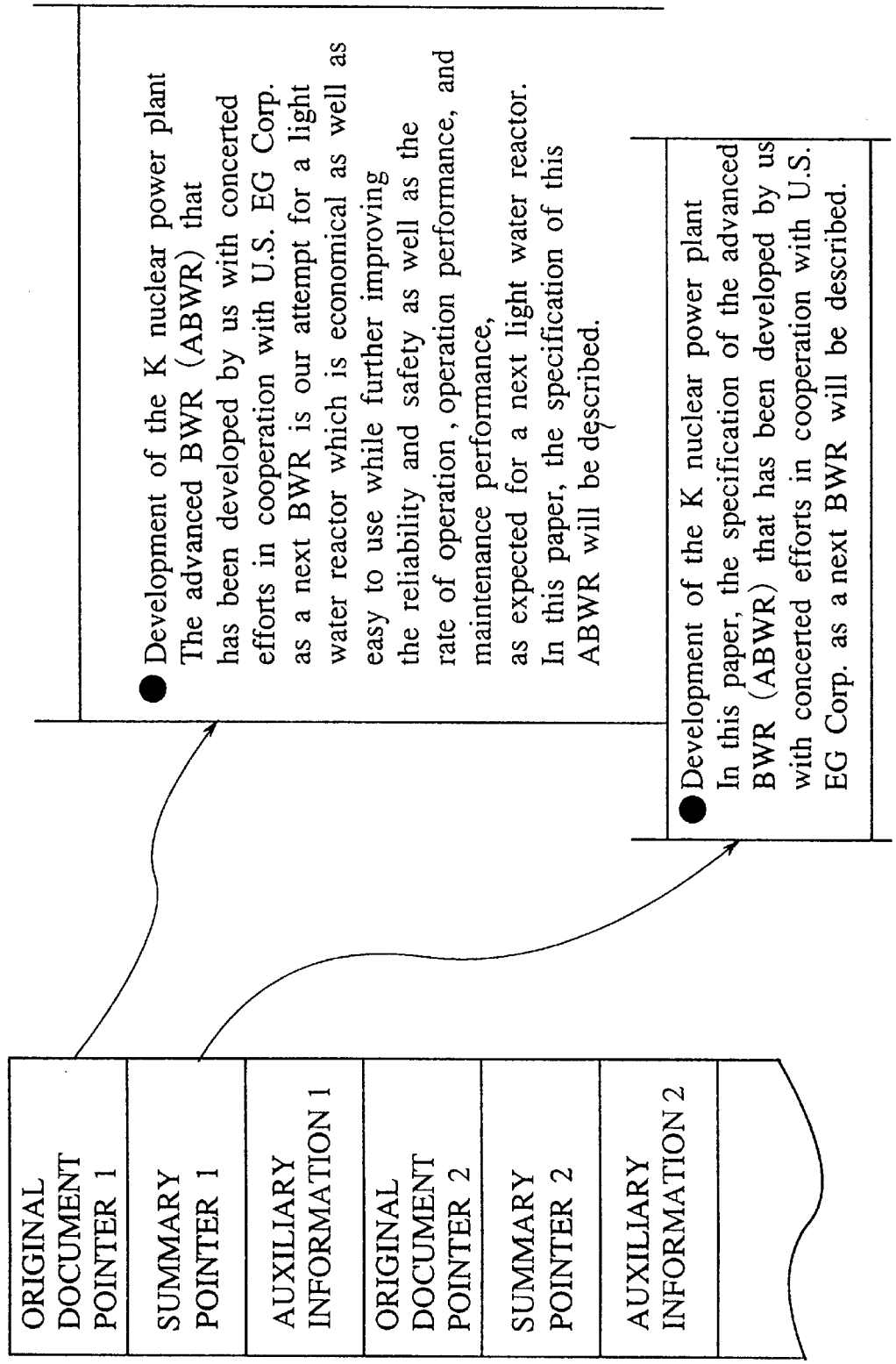
FIG. 76 is a diagrammatic illustration of an exemplary summary information memory in the individual data storage shown in FIG. 66.

Now, in this second embodiment, the individual data storage unit 16 stores the correspondences between the summaries and the original sentences in a form of a summary information memory shown in FIG. 76. In this case, each summary information memory data includes a pointer to the original document, a pointer to the summary, and an auxiliary information, which are stored in a continuous memory region to indicate their correspondences. The auxiliary information includes a pointer to a stored address of the internal document relation data, a pointer to a stored address of the document structure and the text structure, and a pointer to a stored address of the external document relation data, for the original document pointed by the original document pointer.

Also, in this second embodiment, the internal document relation data is stored in a form shown in FIG. 77, in which a word defined by a defining sentence, a pointer to each sentence using this word, and a pointer to the defining sentence are stored in correspondence, for each detected document specified by the document ID, as obtained by the internal document relation data analysis unit 21.

On the other hand, the external document relation data is stored in a form shown in FIG. 78, in which a relation name, a position of referring sentence, and a reference document name are stored in correspondence, for each detected document specified by the document ID, as obtained by the external document relation data analysis unit 22.

Figure 79:
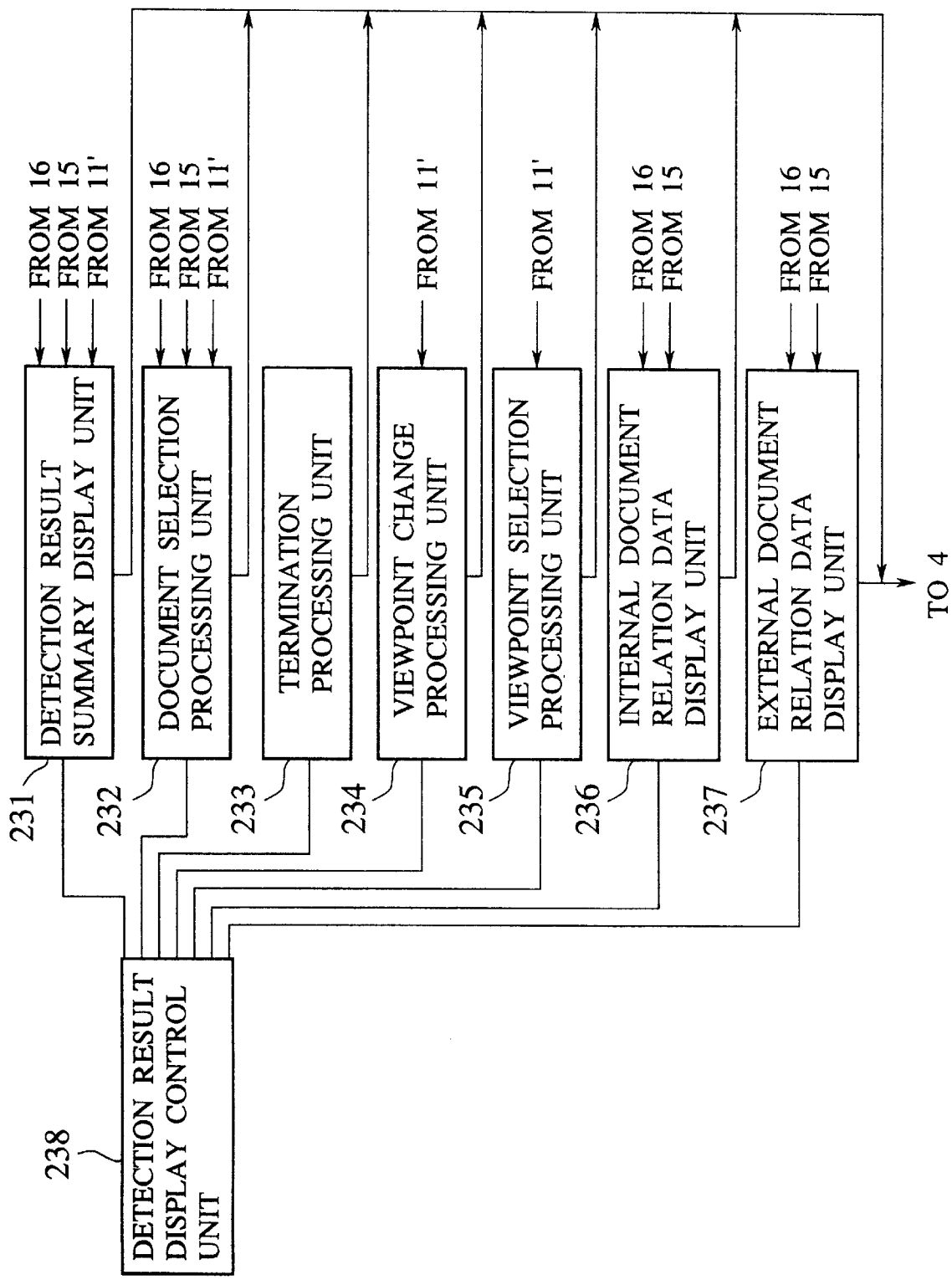
FIG. 79 is a detailed block diagram for a functional configuration of a detection result output unit In the main part shown in FIG. 66.

Next, the detection result output unit 17' has a detailed functional configuration as shown in FIG. 79, which comprises: a detection result summary display unit 231, a document selection processing unit 232, a termination processing unit 233, a viewpoint change processing unit 234, a viewpoint selection processing unit 235, an internal document relation data display unit 236, an external document relation data display unit 237, and a detection result display control unit 238 for controlling operations of the above unit modules 231 to 237.

The detection result summary display unit 231 displays a list of the titles of the detected documents and the summary of the detected document with the highest display priority order as the initial screen display of the detection result.

The document selection processing unit 232 activates the viewpoint change processing unit 234 or the termination processing unit 233 according to a selection of one detected document made by the user through the input unit 11'.

The viewpoint change processing unit 234 activates one of the viewpoint selection processing unit 235, the internal document relation data display unit 236, the external document relation data display unit 237, and the termination processing unit 233, according to the command code entered with respect to the selected document by the user through the input unit 11'.

The viewpoint selection processing unit 235 displays a viewpoint selection menu, and activates the viewpoint change processing unit 234 or the termination processing unit 233 according to the command code entered by the user according to the displayed viewpoint selection menu.

The internal document relation data display unit 236 displays the internal document relation data for the selected document when it is activated, while the external document relation data display unit 237 displays the external document relation data for the selected document when it is activated.

In further detail, these unit modules of the detection result output unit 14 operate according to the flow charts of FIGS. 80A, 80B, 80C, 80D, 80E, 80F, and 80G while displaying the screen displays as shown in FIGS. 81A, 81B, 81C, 81D, 81E, and 81F, as follows.

Figure 80A:
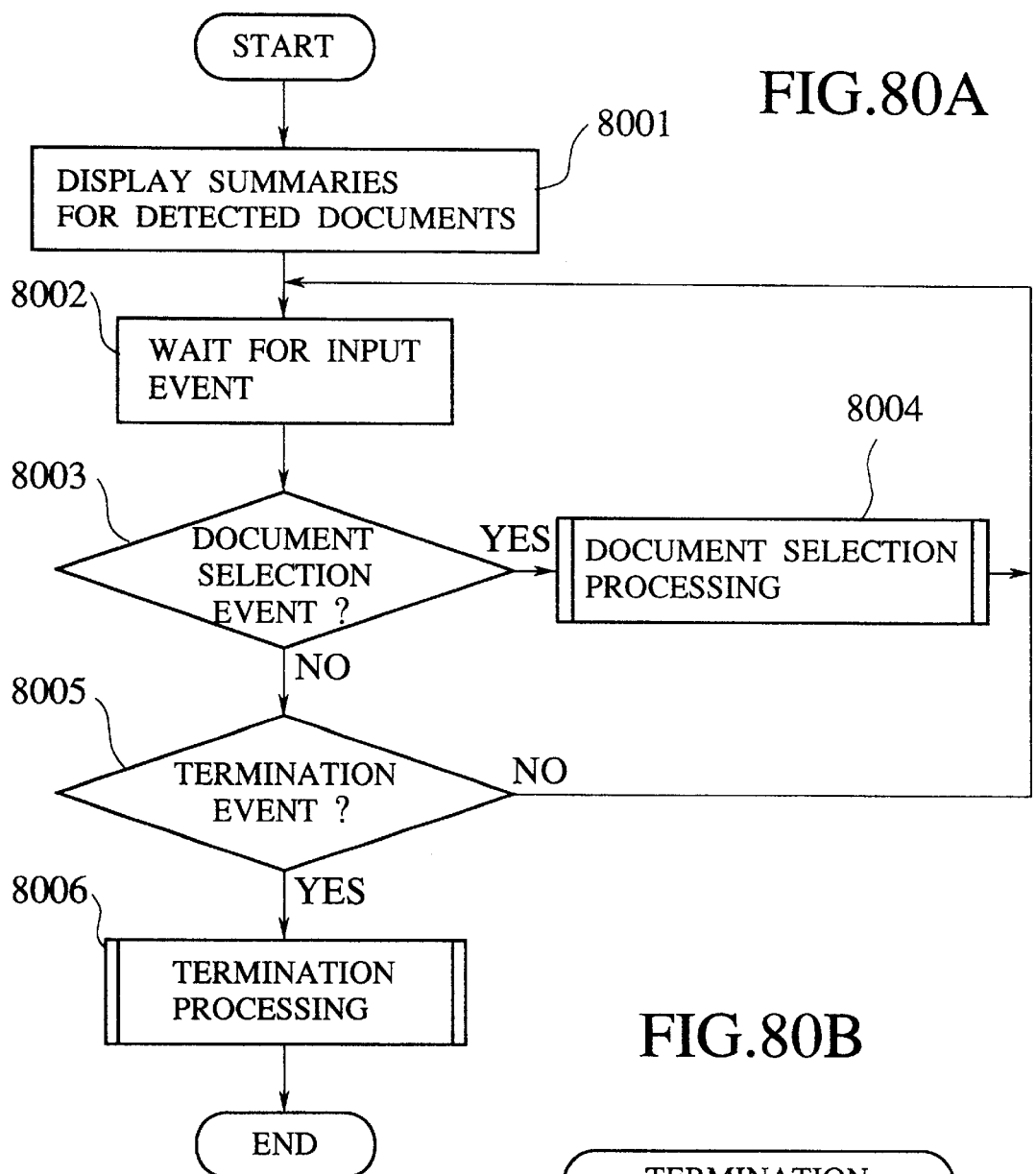
FIGS. 80A, 80B, 80C, 80D, 80E, 80F, and 80G are flow charts for various elements in the detection result output unit of FIG. 71.
Figure 81A:
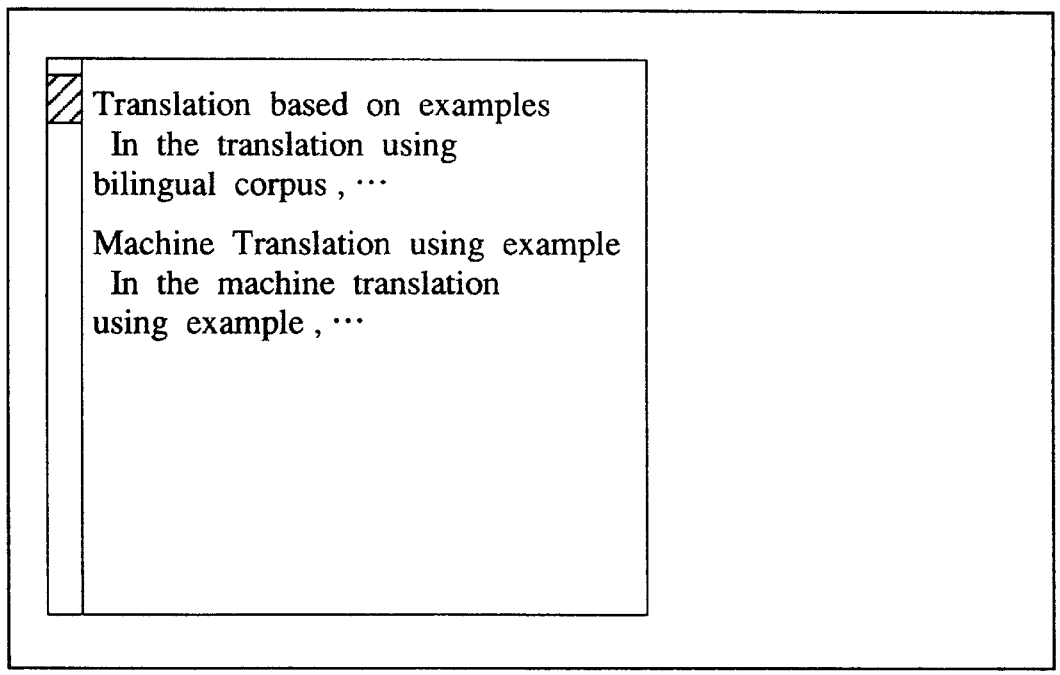
FIGS. 81A, 81B, 81C, 81D, 81E, and 81F are illustration of exemplary detection result screen displays at various stages in the operation of the detection result output unit of FIG. 71.

The detection result summary display unit 231 operates according to the flow chart of FIG. 80A and displays the screen display shown in FIG. 81A.

Here, at a time of the activation of the detection result summary display unit 231, the summaries of the detected documents to be displayed have already been generated by the summary generation unit 14 and stored in the individual data storage unit 16 along with the data indicating the correspondence between the summaries and the original documents. Consequently, the detection result summary display unit 231 takes out the summaries for the detected documents from the individual data storage unit 16 and displays them on the display means 4 at the step 8001.

Then, the detection result output unit 17' awaits for an input event indicated by the clicking of the mouse button by the user at the step 8002. When the entered input event is the document selection event at the step 8003, the document selection processing unit 232 is activated at the step 8004, whereas when the entered input event is the termination event at the step 8005, the termination processing unit 233 is activated at the step 8006.

After the step 8004 as well as when the entered input event is not the termination event at the step 8005, the operation returns to the step 8002.

Figure 80B:
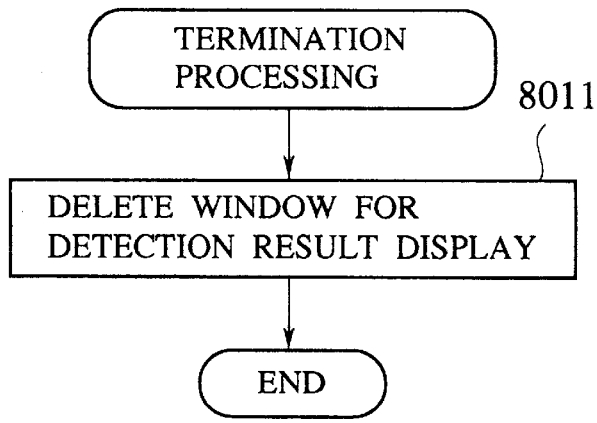

The termination processing unit 233 operates according to the flow chart of FIG. 80B. Namely, the termination processing unit 233 deletes the window generated for the detection result display operation at the step 8011, to terminate the detection result display operation by the detection result output unit 17'.

The document selection processing unit 232 operates according to the flow chart of FIG. 80C as follows.

Figure 81B:
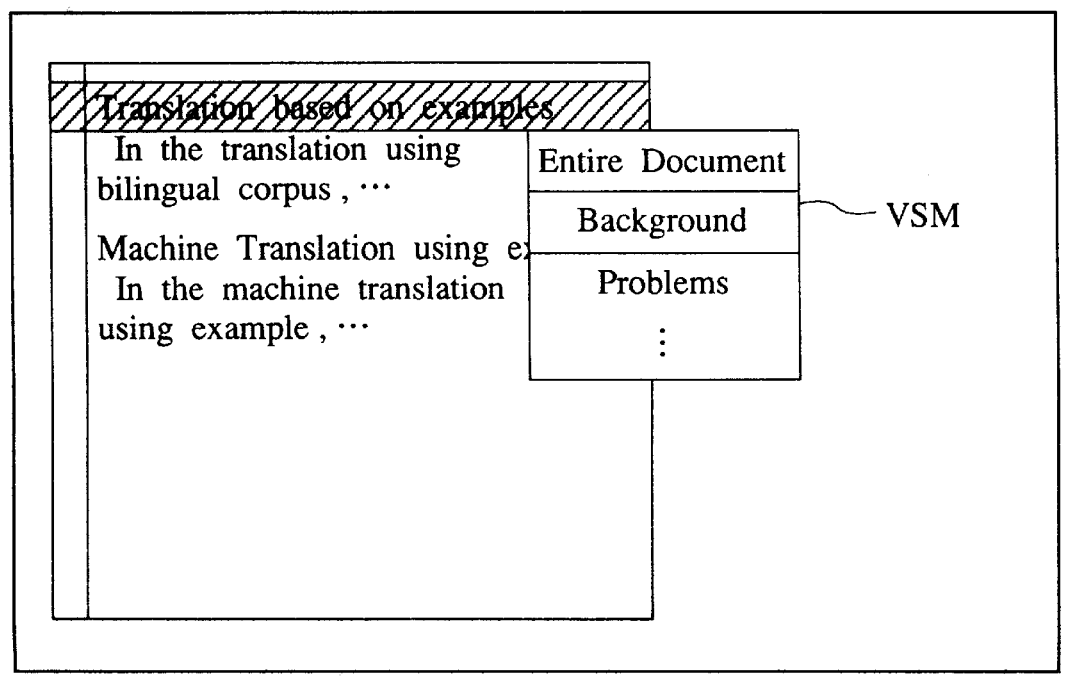

First, the title portion in the summary of the selected document is displayed in reversed color at the step 8021, and a viewpoint selection menu is displayed at the step 8022. Then, the next input event is awaited at the step 8023. At this point, the document selection processing unit 232 displays the screen display containing the viewpoint selection menu VSM as shown in FIG. 81B in which the title portion in the summary of the currently selected document is displayed in reversed color (indicated by shading in FIG. 81B).

Here, the viewpoint selection menu enlists the relations attached to the nodes from the root level to the prescribed level in the text structure of the selected document. Then, when the entered input event is the viewpoint selection event to select one of the displayed relations at the step 8024, the viewpoint change processing unit 234 is activated at the step 8025, whereas when the entered input event is the termination event at the step 8026, the termination processing unit 233 is activated at the step 8027.

After the step 8025 as well as when the entered input event is not the termination event at the step 8026, the operation returns to the step 8023.

The viewpoint change processing unit 234 operates according to the flow chart of FIG. 80D as follows.

Figure 81C:
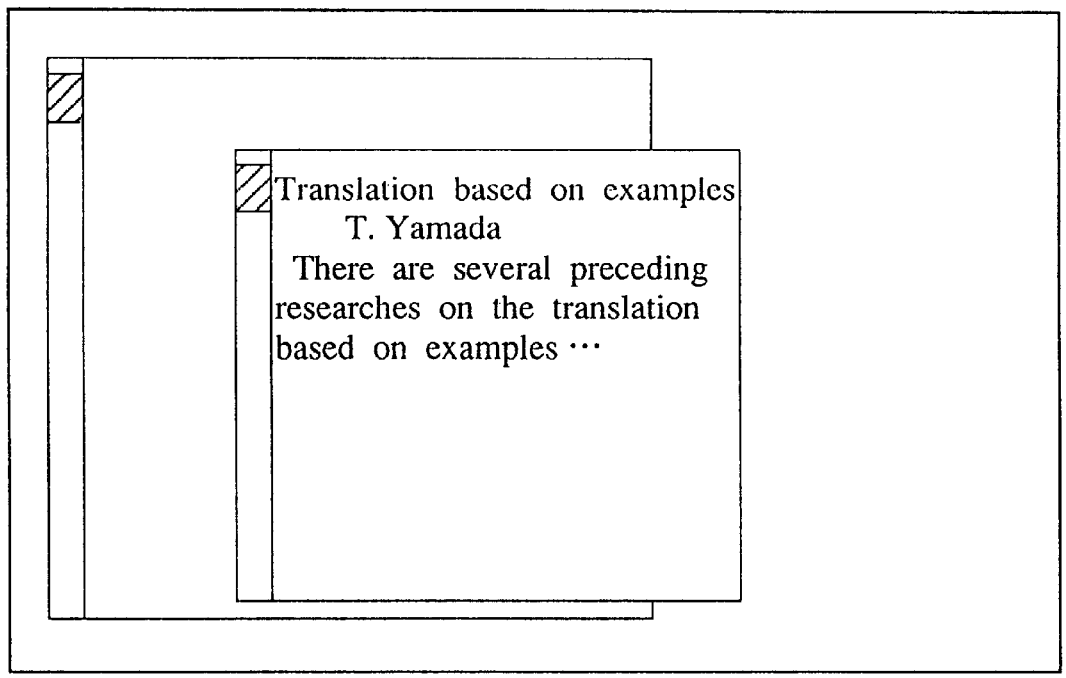

First, at the step 8031, the portion of the selected document having the relation selected by the viewpoint selection event is displayed according to the text structure of the selected document. FIG. 81C shows an exemplary screen display at this point in a case the relation "background" is selected in the viewpoint selection menu VSM shown in FIG. 81B.

Then, the next input event is awaited at the step 8032. When the entered input event is the viewpoint selection event to select one of the displayed relations again at the step 8033, the viewpoint selection processing unit 235 is activated at the step 8034. On the other hand, when the entered input event is the internal document relation data display event at the step 8035, the internal document relation data display unit 236 is activated at the step 8036, and when the entered input event is the external document relation data display event at the step 8037, the external document relation data display unit 237 is activated at the step 8038, whereas when the entered input event is the termination event at the step 8039, the termination processing unit 233 is activated at the step 8040. After the steps 8034, 8036, and 8038, as well as when the entered input event is not the termination event at the step 8039, the operation returns to the step 8032.

The viewpoint selection processing unit 235 operates according to the flow chart of FIG. 80E as follows.

Figure 81D:
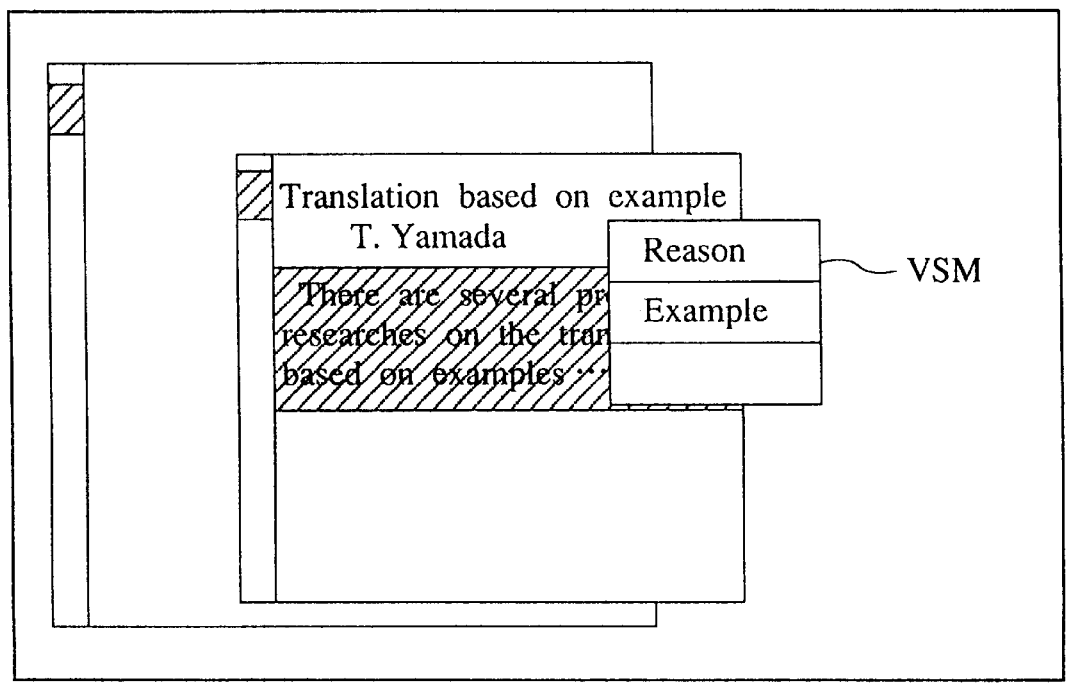

First, the viewpoint selection menu is displayed at the step 8041. At this point, the document selection processing unit 232 displays the screen display containing the viewpoint selection menu VSM as shown in FIG. 81D in which the portion displayed in response to the current selection of the relation is displayed in reversed color (indicated by shading in FIG. 81D).

Then, the next input event is awaited at the step 8042. When the entered input event is the viewpoint selection event to select one of the displayed relations at the step 8043, the viewpoint change processing unit 234 is activated at the step 8044, whereas when the entered input event is the termination event at the step 8045, the termination processing unit 233 is activated at the step 8046.

After the step 8044 as well as when the entered input event is not the termination event at the step 8045, the operation returns to the step 8042.

Figure 81E:
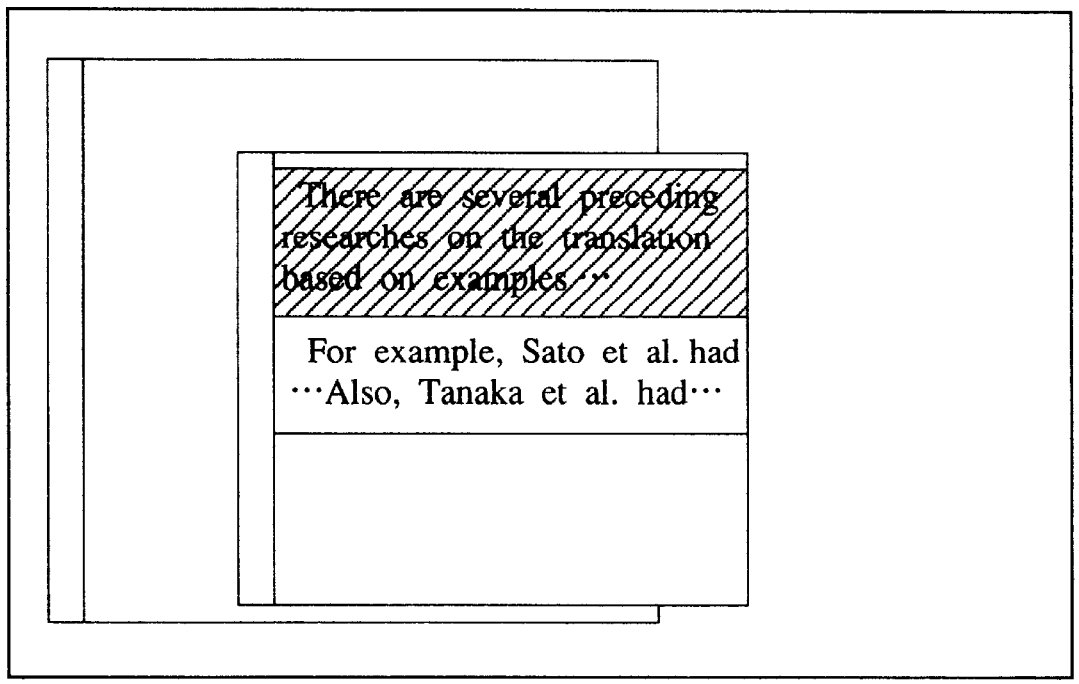

In a case of the viewpoint selection event, the portion of the selected document having the relation selected by the viewpoint selection event is displayed by the viewpoint change processing unit 234 as described above. FIG. 81E shows an exemplary screen display at this point in a case the relation "example" is selected in the viewpoint selection menu VSM shown in FIG. 81D while the portion displayed in response to the current selection of the relation remains to be displayed in reversed color (indicated by shading in FIG. 81E).

Figure 80C:
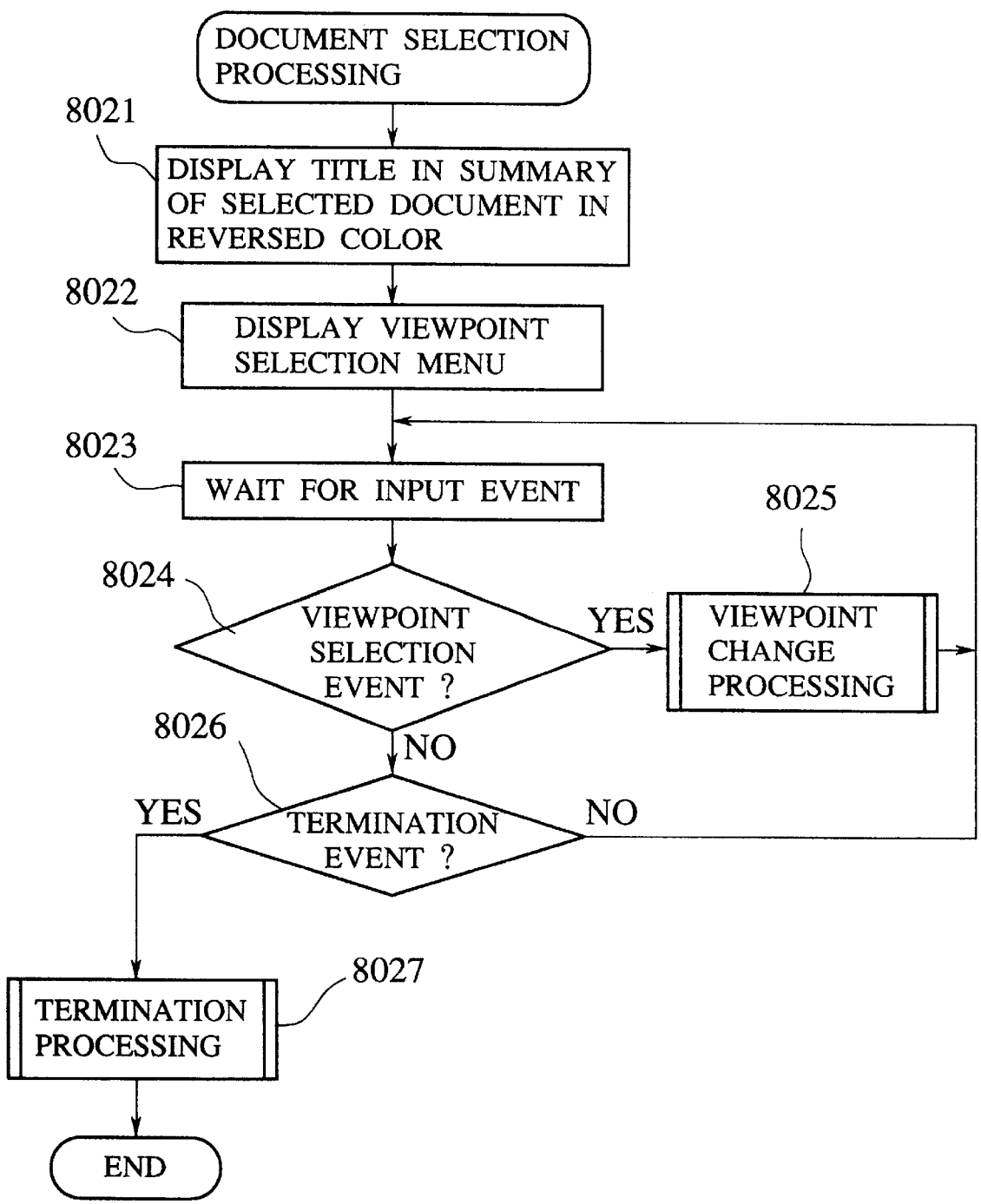
Figure 80D:
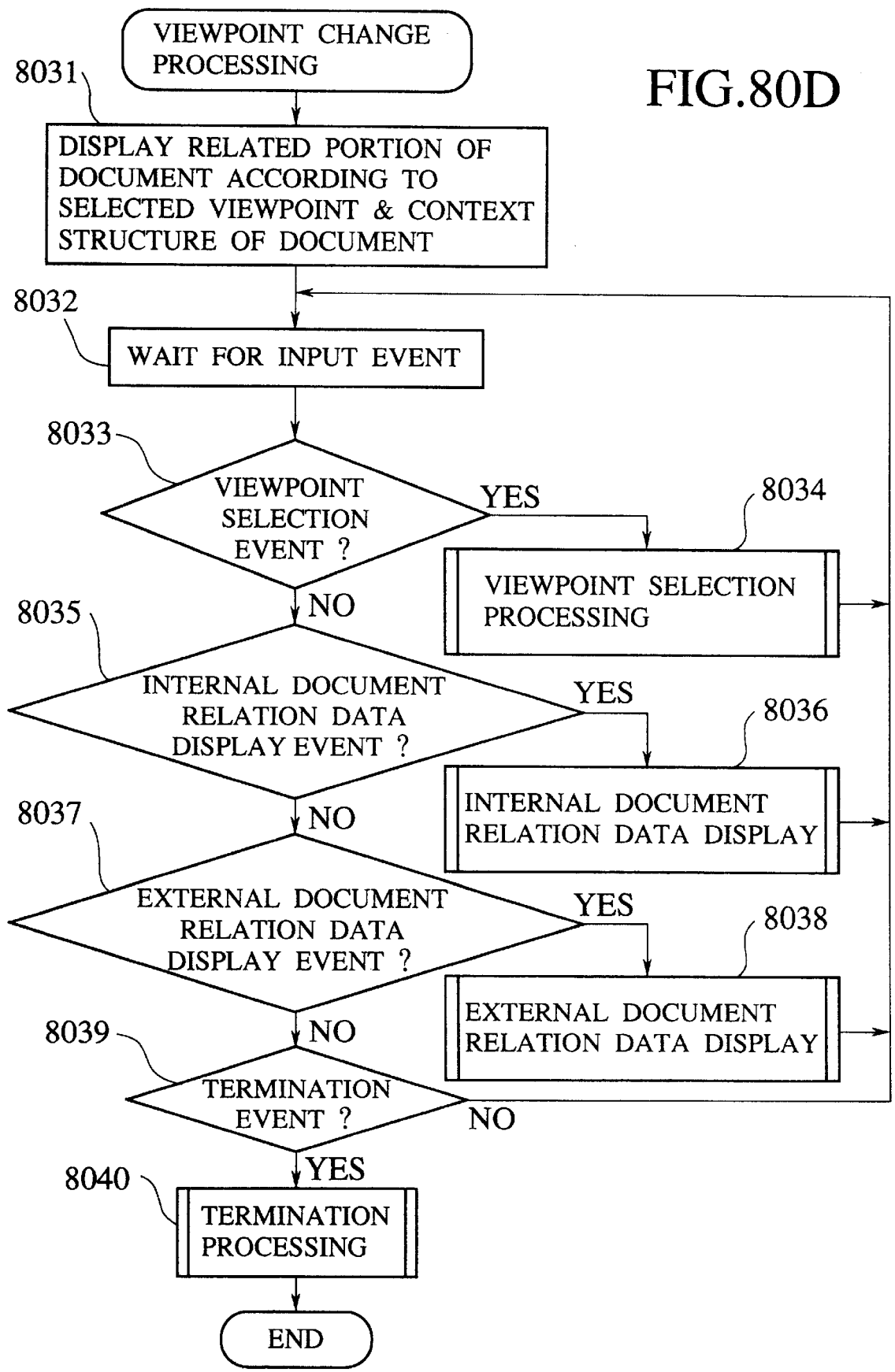
Figure 80E:
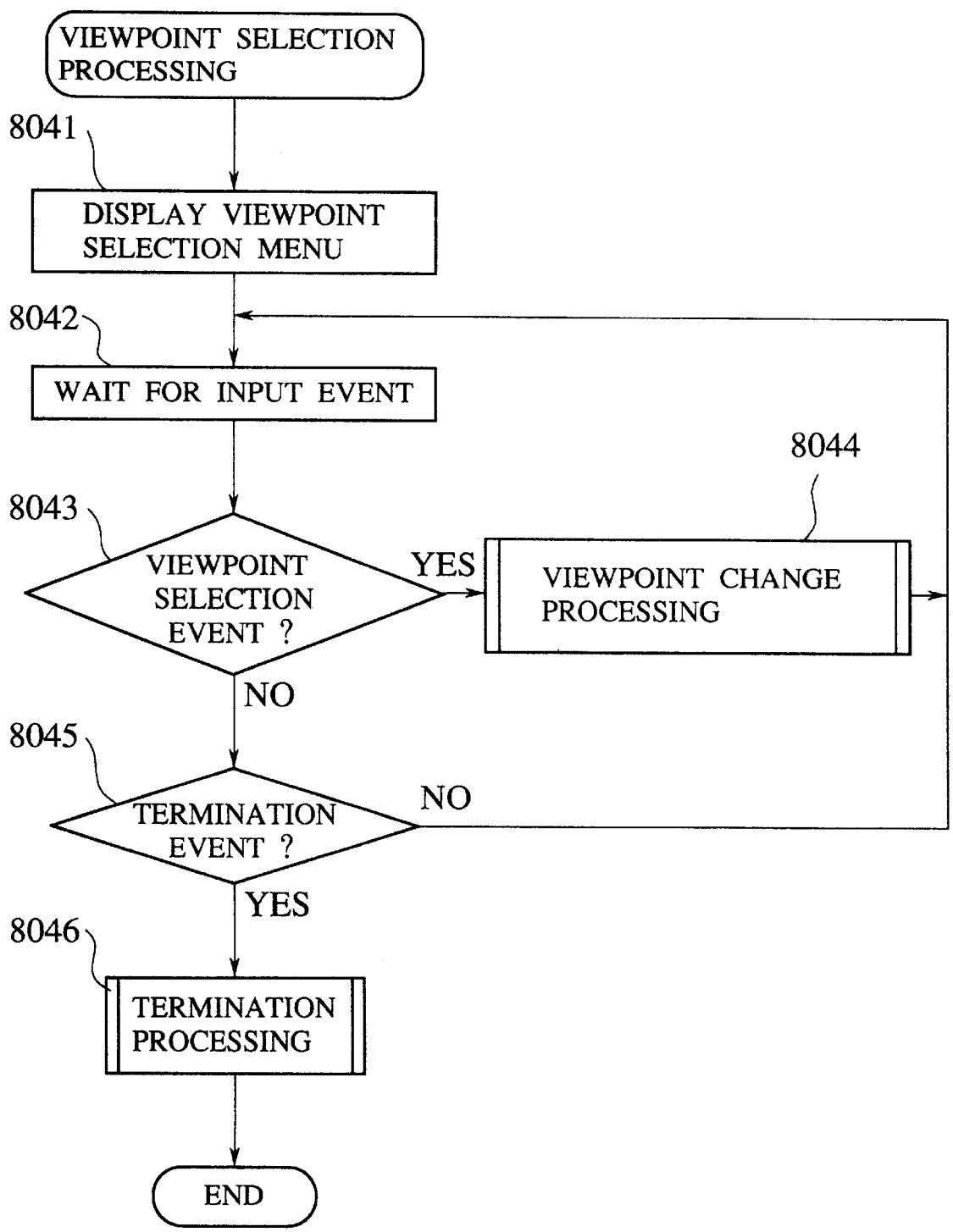
Figure 80F:
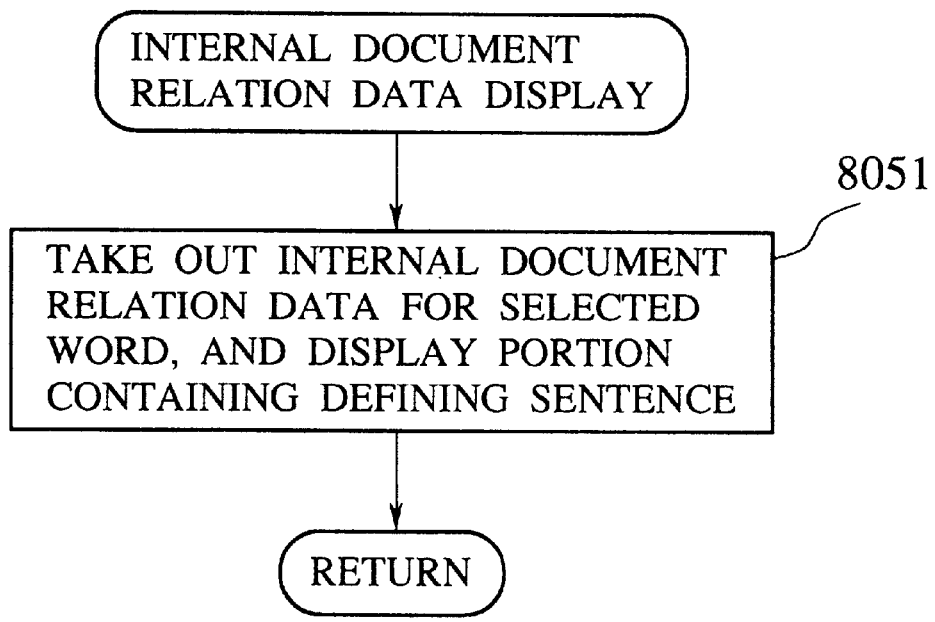

The internal document relation data display unit 236 operates according to the flow chart of FIG. 80F. Namely, the stored internal document relation data corresponding to the selected word is taken out and the portion containing the defining sentence is displayed at the step 8051. Here, the displayed portion contains not just the defining sentence itself alone, but some preceding sentences as well as some following sentences, to assist the user's comprehension of the defining sentence.

Figure 80G:
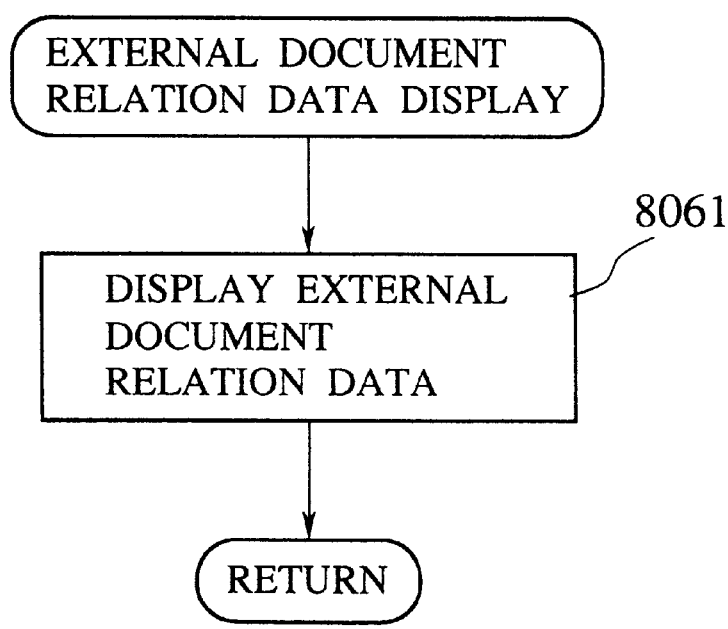
Figure 81F:
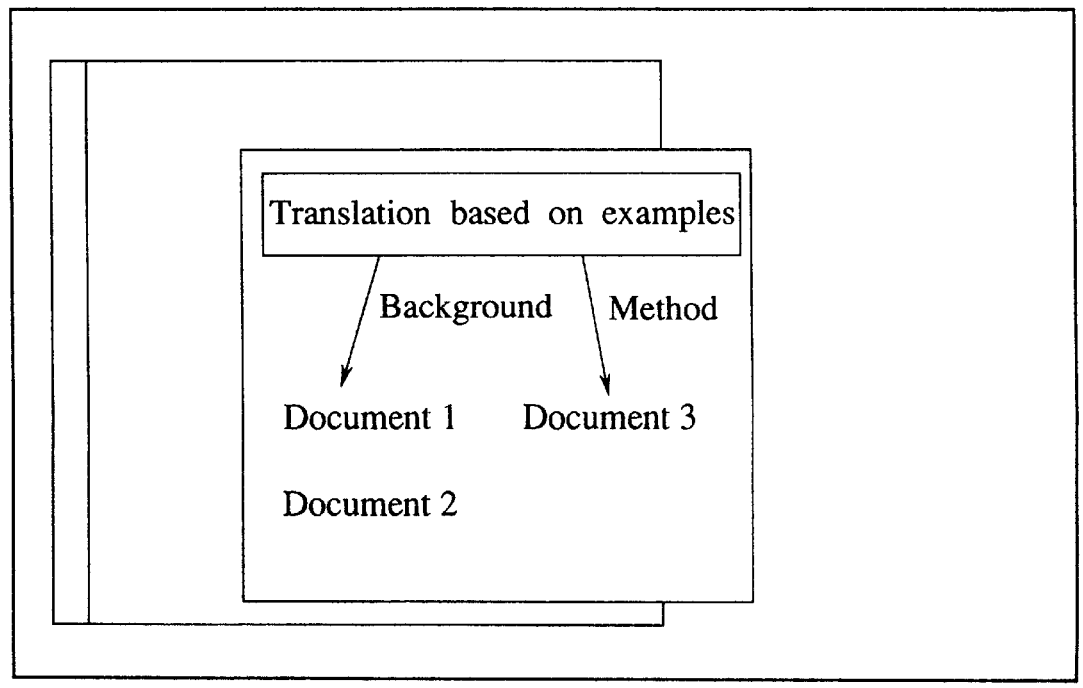

The external document relation data display unit 237 operates according to the flow chart of FIG. 80G. Namely, the stored external document relation data corresponding to the is taken out and displayed at the step 8061. FIG. 81F shows an exemplary screen display at this point.

In this manner, in this second embodiment, the system can provide various functions including the detection of the desired document, the display of the summary of the detected document, the presentation of the viewpoints to display the summary, the display of the related portion in response to the selection of the viewpoint, and the display of the internal and external document relation data, in accordance with the command input made by the user.

It is to be noted that, in the above operation, the detection result summary display unit 231 can be easily modified such that the titles of the detected documents alone is displayed initially, and the summary for the document with the selected title is displayed only in response to the viewpoint selection event entered by the user.

Now, various variations of the above described second embodiment of a document detection system according the present invention will be described.

First, the first variation concerning the full text detection operation will be described. Namely, in the second embodiment described above, it has been assumed that the keywords are set for each document, such that the detection processing can be realized by the keyword detection operation. In contrast, in this first variation, a case of realizing the detection processing at the detection processing unit 13' by the full text detection operation will be described.

Here, the detailed algorithm for the full text detection operation to be carried out by the detection processing unit 13' is not essential to the present invention, and any known schemes can be adopted. For example, the scheme-disclosed in Faloutsos, C.: "Access Methods for Text", Computing Surveys, Vol. 17, No. 1, March 1985, pp. 49–74, can be utilized here.

When the full text detection operation is carried out by the detection processing unit 13', it becomes possible to identify a matching portion of the original document which contains the detection target word. In addition, by utilizing the text structure analysis result obtained by the summary generation unit 14 for the purpose of the summary generation, it also becomes possible to obtain data concerning the relation of each matching portion of the original document with respect to the entire document in view of the text structure.

Consequently, in this first variation, it is possible to rearrange the detected documents obtained at the detection processing unit 13' into a prescribed order determined according to the relations of the various matching portions.

For example, consider a case in which the detection result obtained by the detection processing unit 13' contains a set of detected documents {document 1, document 2, document 3, document 4}, and the relations of the matching portions in the respective detected documents are {serial relation (right), example (right), serial relation (right), serial relation (left)}, where left or right specified in the parentheses accompanying each relation indicates a left or right node of sentence which to which the matched detection target word belongs to in the text structure of the original document. In such a case, these detected documents can be rearranged into an order of {document 1, document 3, document 4, document 2} by grouping the documents with the relation of the serial relation together.

Figures 82, 83:
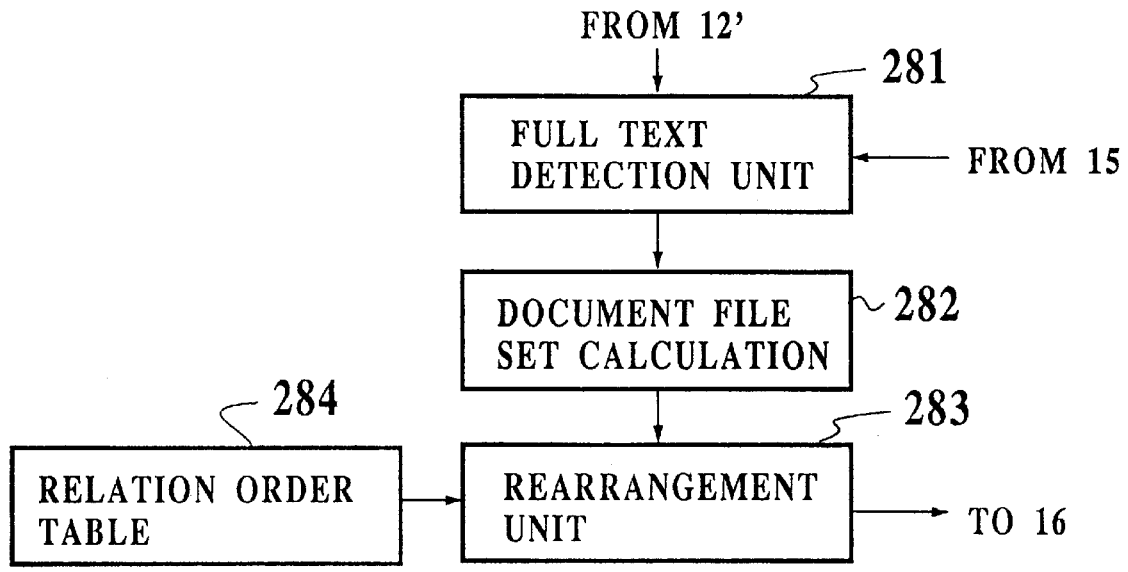
FIG. 82 is a detailed block diagram for a functional configuration of the detection processing unit shown in FIG. 66 for the first variation of the second embodiment.
FIG. 83 is a diagrammatic illustration of a relation order table used in the first variation of the second embodiment.

In this first variation, the detection processing unit 13' has a detailed configuration as shown in FIG. 82, which comprises a full text detection unit 281 connected with the input analysis unit 12' and the document storage unit 15, a document file set calculation unit 282 connected with the full text detection unit 281, a rearrangement unit 283 connected with the document file set calculation unit 282 and the individual data storage unit 16, and a relation order table 284 to be looked up by the rearrangement unit 284.

Figure 14B:
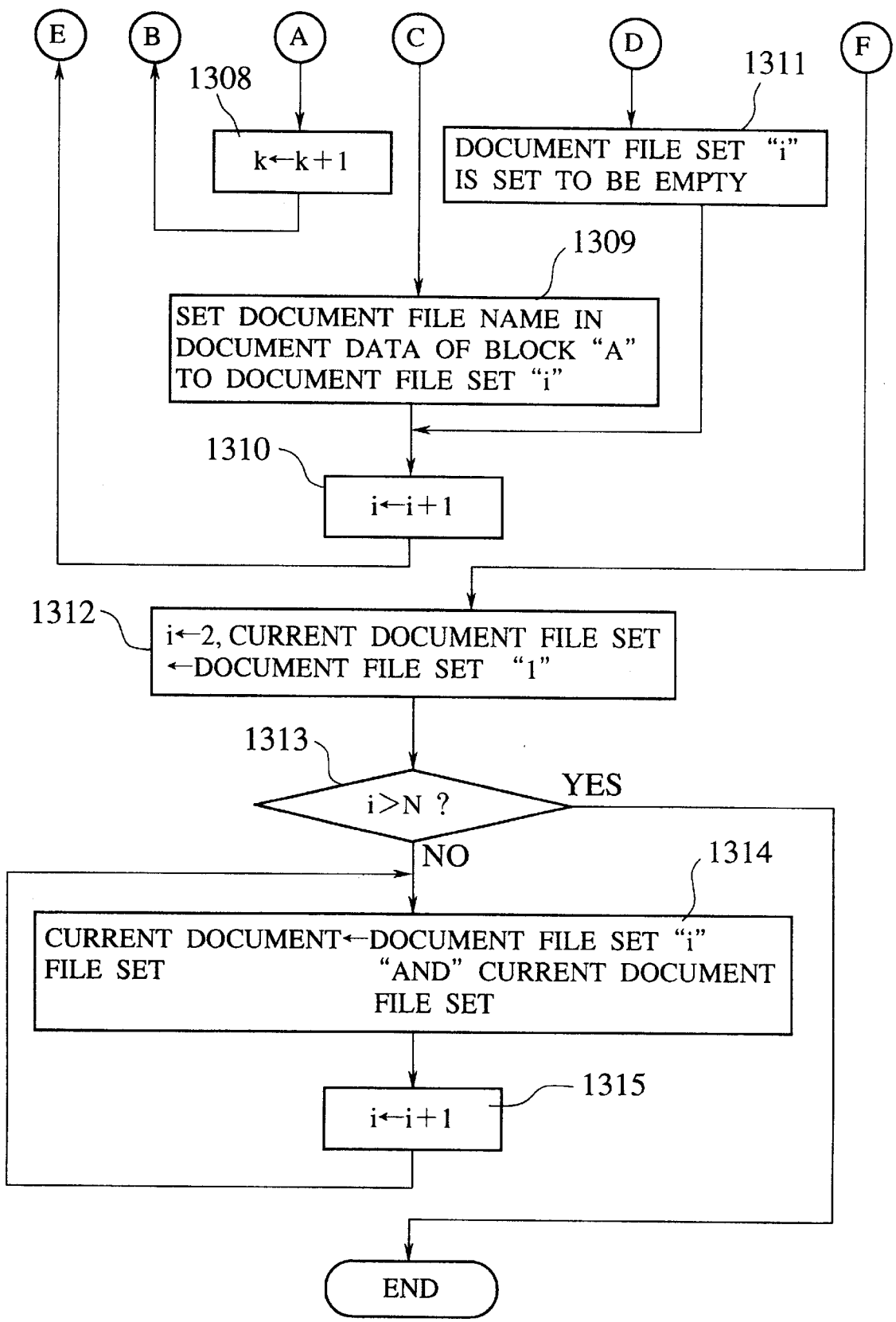

In this configuration of FIG. 82, the full text detection unit 281 carries out the full text detection operation according to the known full text detection algorithm, and the document file set calculation unit 282 carries out the set calculation operation similar to that of the steps 1312 to 1315 in the flow chart of FIG. 14B described above for the first embodiment. Then, the rearrangement unit 283 carries out the rearrangement operation for the detected documents obtained by the document file set calculation unit 282, by obtaining the relations of the matching portions for the detection target words according to the text structure analysis result obtained by the summary generation unit 14 and subsequently stored in the individual data storage unit 16, and then rearranging the order of the detected documents according to the relation order table 284.

The relation order table 284 stores relation order data in a form shown in FIG. 83 in which each data entry comprises a pair of the relation name and the left or right indication to be specified in the parentheses accompanying that relation, and a plurality of such pairs are arranged in the order according to which the detected documents are to be rearranged. According to this relation order table 284 of FIG. 83, for example, the documents with the relation of "serial relation (right)" are to be arranged together first, the documents with the relation of "example (left)" are to be arranged together next, and so on.

In this first variation, the text structure analysis result for each document is expressed in the individual data storage unit 16 by a data structure as shown in FIG. 84, in which a block corresponding to each node has four data entries of "text structure Rel" indicating the relation name, "text structure L" indicating a pointer to a left side branch, "text structure R" indicating a pointer to right side branch, and "text structure Level" indicating a path length from the root node (a number of arcs from the root node), in the tree structure of the document. In other words, in comparison with the data structure of FIG. 19 described above for the first embodiment, this data structure of FIG. 84 includes the "text structure Level" indicating the path length from the root node as an additional information.

Figure 85:
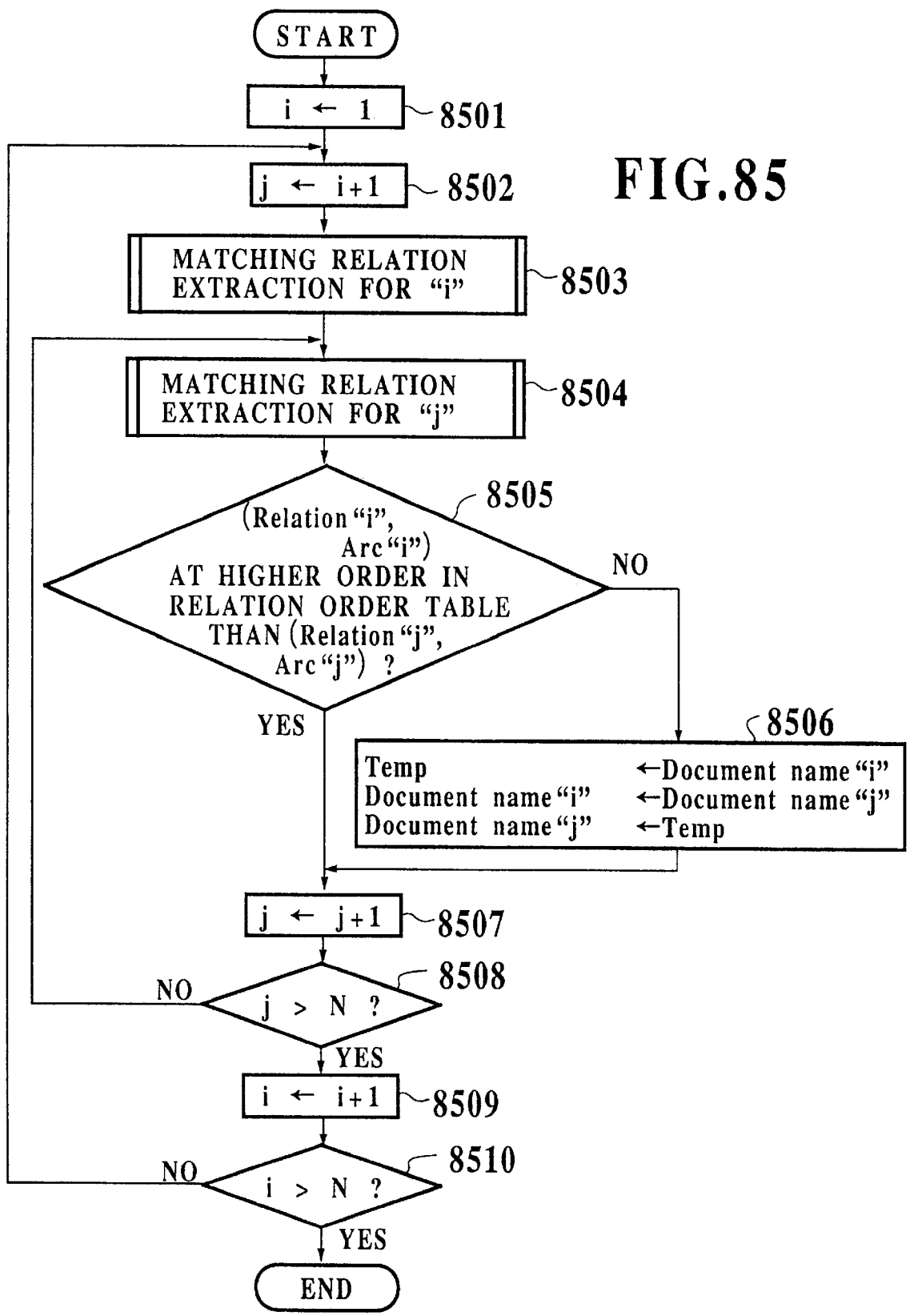
FIG. 85 is a flow chart for an operation of a rearrangement unit in the detection result output unit of FIG. 71.
Figure 86:
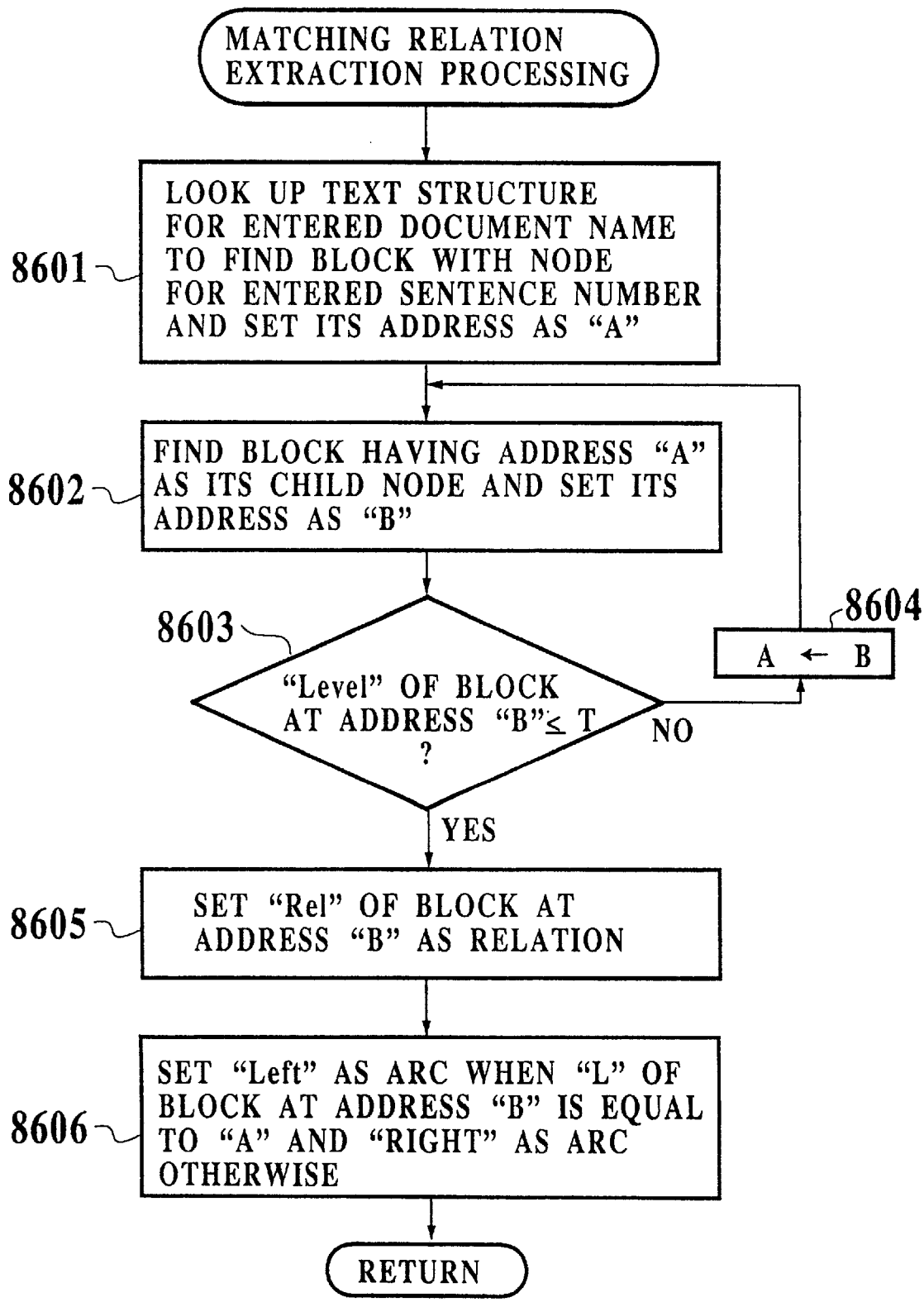
FIG. 86 is a flow chart for a matching relation extraction processing in the operation of FIG. 85.

In further detail, the rearrangement unit 283 operates according to the flow chart of FIGS. 85 and 86, as follows. Here, the rearrangement unit 283 has a set of detected document names as an input.

First, a variable "i" is initially set to 1 at the step 8501, and a variable "j" is initially set to i+1 at the step 8502.

Then, the matching relation extraction processing to 8503 and 8504, to obtain a set (Relation "i", Arc "i") for a document name "i" and a sentence number "i" at the step 8503, and to obtain a set (Relation "j", Arc "j") for a document name "j" and a sentence number "j" at the step 8504. Here, the sentence number "i" or "j" indicates the sentence number of the matching sentence containing the detection target word in the document "i" or "j".

Then, at the step 8505, whether the set (Relation "i", Arc "i") is registered at a higher order in the relation order table 284 than the set (Relation "j", Arc "j") or not is judged.

When the set (Relation "i", Arc "i") is not registered at a higher order than the set (Relation "j", Arc "j") at the step 8505, next at the step 8506, the document name "i" is set as a new value of a variable "Temp", the document name "j" is set as the document name "i", and a current value of a variable "Temp" is set as the document name "j", so as to rearrange the order of the documents.

Otherwise, the variable "j" is incremented by one at the step 8507, and the steps 8504 to 8507 are repeated until the variable "j" becomes greater than a total number N of the detected documents at the step 8508.

When the variable "j" becomes greater than the total number N at the step 8508, the variable "i" is incremented by one at the step 8509, and the steps 8502 to 8509 are repeated until the variable "i" becomes greater than the total number N at the step 8510 and the operation is terminated.

The matching relation extraction processing to be carried out at the steps 8503 and 8504 is a sub-routine for receiving the document name and the sentence number as the input and returning the relation and the arc as the output, which is executed according to the flow chart of FIG. 86 as follows.

First, at the step 8601, the text structure for the entered document name is looked up to find out a block having the node for the entered sentence number. The address of the found out block is then labelled as address "A".

Next, at the step 8602, a block having the address "A" as its child node is found out. The address of the found out block is then labelled as address "B".

Then, at the step 8603, whether the "text structure Level" of the block at the address "B" is not greater than a prescribed threshold T or not is judged.

When the "text structure Level" of the block at the address "B" is greater than the prescribed threshold T at the step 8603, the address "B" is set as the address "A" at the step 8604, and the operation returns to the step 8602 described above, so as to trace back the tree structure toward the root node step by step.

Otherwise, next at the step 8605, the relation registered for the "text structure Rel" for the block at the address "B" is set as the relation to be returned.

Then, at the step 8606, the arc to be returned is set to be "left" when the "text structure L" of the block at the address "B" is equal to the address "A", or to be "right" otherwise, so as to obtain the set (Relation, Arc) to be returned as the output.

After the rearrangement operation by the rearrangement unit 283 of the detection processing unit 13' as described above, the detection result output unit 17' displays the summaries of the detected documents in accordance with the rearranged document names order.

Next, the second variation concerning the control of an amount of summary sentences in each summary to be displayed will be described.

Namely, in the second embodiment described above, the summary sentences are selected to be only those which have the penalty not greater than the prescribed threshold P2 just as in the first embodiment described above, such that the length of the summary can be compressed to a desired level by appropriately adjusting the threshold P2. Thus, when the threshold P2 is set to be relatively low, the summary can be made to be relatively short, whereas when the threshold P2 is set to be relatively high, the summary can be made to be relatively long.

In this regard, this second variation describes a case in which the appropriate threshold P2 is automatically determined according to a number of lines in the window for displaying the detection result, and a number of summaries to be displayed or a number of lines in the summary.

Figure 87:
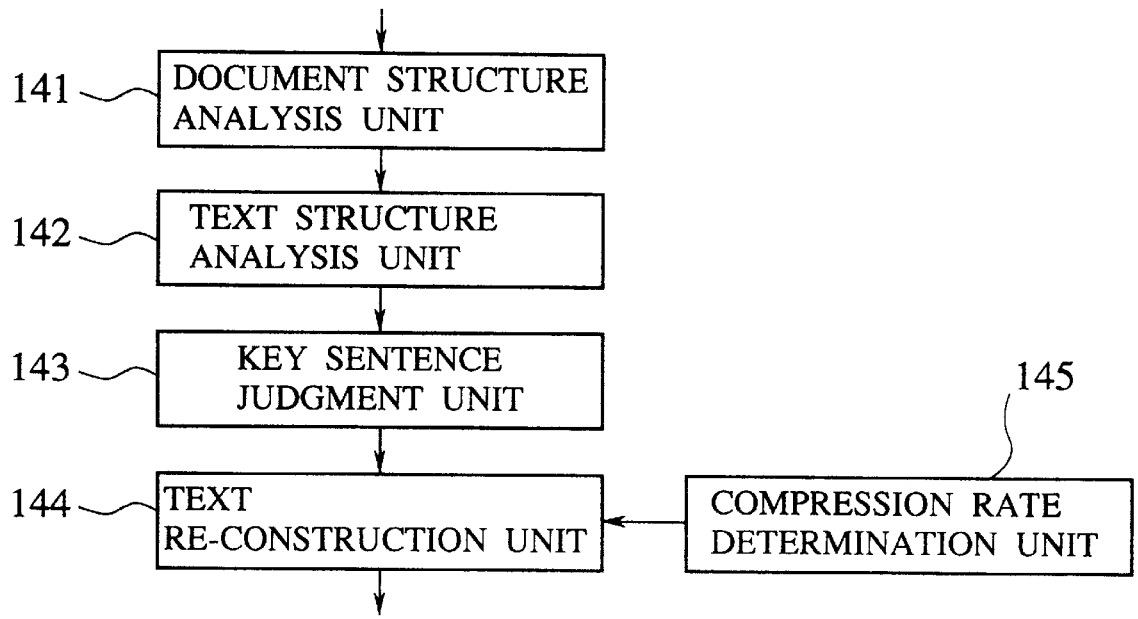
FIG. 87 is a detailed block diagram for a functional configuration of a summary generation unit shown in FIG. 2 in the second variation of the second embodiment.

In this case, the summary generation unit 14 has a detailed configuration as shown in FIG. 87, which includes a compression rate determination unit 145 connected to the text re-construction unit 144, in addition to the configuration of FIG. 17 described above for the first embodiment. This compression rate determination unit 145 determines the appropriate threshold P2 according to the number of lines in the display window and a number of summaries to be displayed together in one screen display, and specifies the determined appropriate threshold P2 to the text re-construction unit 144 such that the text re-construction unit 144 can use the determined appropriate threshold P2 in carrying out the operation according to the flow chart of FIG. 22 described above for the first embodiment.

More specifically, the compression rate determination unit 145 can determine the appropriate threshold P2 according to the following formula (1) for example:

$$P2 = C1 \times LN/SN \tag{1}$$

where C1 is a prescribed constant, LN is a number of lines in the display window, and SN is a number of summaries to be displayed together in one screen display.

Alternatively, the compression rate determination unit 145 can determine the number of lines available for each summary display according to the following formula (2):

$$L = LN/SN \tag{2}$$

and reduce the threshold P2 whenever the number of lines of each summary exceeds the determined L, such that each summary can be contained within the available space.

Next, the third variation concerning the control of an amount of summary sentences in each summary to be displayed will be described.

Here, in contrast to the second variation described above in which the number of summaries to be displayed together in one screen display is fixed in advance, this third variation describes a case in which the threshold P2 can be adjusted according to a variable number of summaries to be displayed together in one screen display which is specified by the user.

Figure 88:
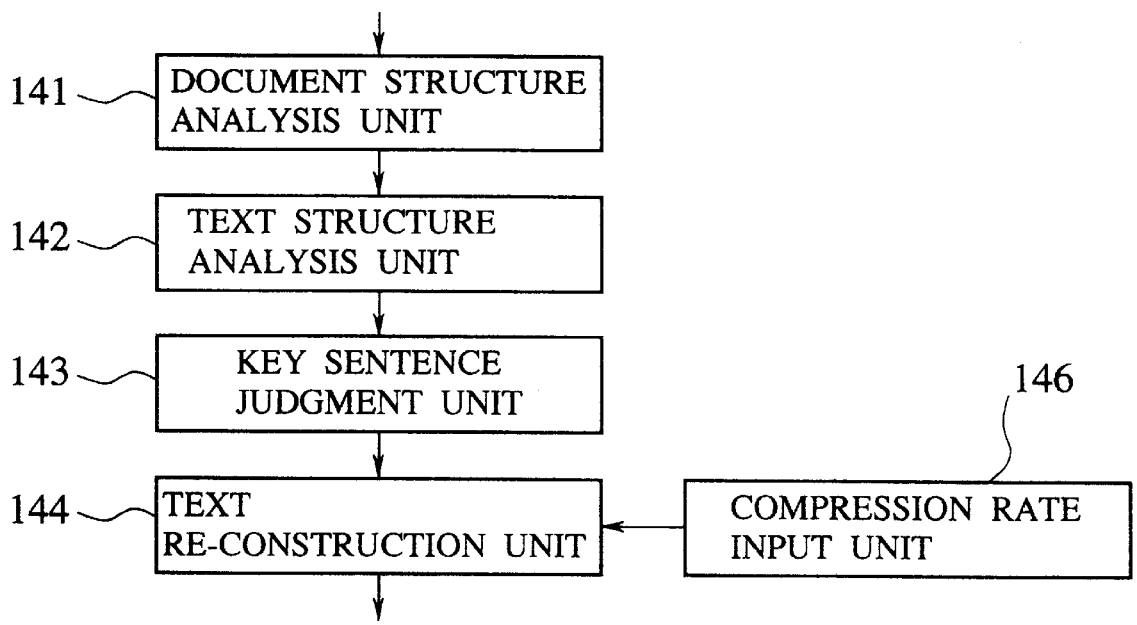
FIG. 88 is a detailed block diagram for a functional configuration of a summary generation unit shown in FIG. 2 in the third variation of the second embodiment.

In this case, the summary generation unit 14 has a detailed configuration as shown in FIG. 88, which includes a compression rate input unit 146 connected to the text re-construction unit 144, in addition to the configuration of FIG. 17 described above for the first embodiment. This compression rate input unit 146 allows the user to specify the desired number of summaries to be displayed together in one screen display and determines the appropriate threshold P2 according to the number of lines in the display window and the specified number of summaries to be displayed together in one screen display, and then specifies the determined appropriate threshold P2 to the text re-construction unit 144 such that the text re-construction unit 144 can use the determined appropriate threshold P2 in carrying out the operation according to the flow chart of FIG. 22 described above for the first embodiment.

Here, similarly to the compression rate determination unit 145 of the second variation described above, the compression rate input unit 146 can determine the appropriate threshold P2 according to the above formula (1).

Alternatively, the compression rate input unit 146 can determine the number of lines available for each summary display according to the above formula (2) and allow the user to specify the desired number of lines for each summary display, and then reduce the threshold P2 whenever the specified number of lines of each summary exceeds the determined L, such that each summary can be contained within the available space.

In this third variation, the input of the number of summaries to be displayed together in one screen display can be facilitated by providing an input area within the display window as indicated in FIG. 89A, or by providing an environment setting menu which includes an item for the number of summaries to be displayed together in one screen display as indicated in FIG. 89B.

Next, the fourth variation concerning the control of an amount of summary sentences in each summary to be displayed will be described.

In this fourth variation, the summary generation unit 14 has a detailed configuration identical to that shown in FIG. 87 for the second variation described above including the compression rate determination unit 145, while the detection result output unit 17' has a detailed configuration as shown in FIG. 90, which includes a summary modification processing unit 239 connected with the detection result display control unit 238 and the display means 4, in addition to the configuration of FIG. 79 described above for the second embodiment.

This summary modification processing unit 239 is activated by the detection result display control unit 238 in response to a pointing action with respect to the displayed summary made by the user by using a pointing device to specify a region starting from a chapter/section header in the displayed summary.

Then, the summary modification processing unit 239 operates according to the flow chart of FIG. 91 as follows.

First, starting and ending positions of the pointed region are determined at the step 9101, and chapter/section numbers of the determined starting and ending positions are determined at the step 9102. Then, at the step 9103, whether the determined chapter/section numbers of the starting and ending positions are different from each other or not is judged. When they are the same, the operation of the summary modification processing unit 239 is terminated.

On the other hand, when they are different, a number of lines "n" from a display pointer position indicating a top line of a next chapter/section for the chapter/section of the starting position to a position of a next line for the ending position is obtained at the step 9104, and the display pointers of those chapters/sections subsequent to the chapter/section of the starting position are increased by the obtained "n" to displace the displayed positions of these chapters/sections downwards for "n" lines at the step 9105.

Next, a number of lines "m" from the starting position to the ending position and a number of characters "w1" displayable in "m" lines are obtained at the step 9106, while a number of characters "w2" and a number of sentences "b2" in the chapter/section of the starting position in the original document are obtained at the step 9107.

Then, a value w1/w2 is displayed to the user to decide whether or not to modify the summary at the step 9108, and whether the modification of the summary is commanded by the user or not is judged at the step 9109. When the user decided not to modify the summary, the operation of the summary modification processing unit 239 is terminated.

On the other hand, when the modification of the summary is commanded, next at the step 9110, the obtained number of lines "m" is supplied to the compression rate determination unit 145 in the summary generation unit 14, such that the modification of the summary for the chapter/section of the starting position is carried out by the text re-construction unit 144 by using the appropriate threshold P2 determined by the compression rate determination unit 145 according to the supplied number of lines "m". Here, the compression rate determination unit 145 determines the appropriate threshold P2 according to the following formula (3):

$$P2 = C1 \times m \qquad (3)$$

where C1 is a prescribed constant.

Then, the number of characters "w3" and a number of sentences "b3" in the chapter/section of the starting position in the modified summary are obtained at the step 9111, and whether the obtained "w3" is greater than "w1" is judged at the step 9112. When "w3" is greater than "w1", next at the step 9113, the number of line "m" to be supplied to the compression rate determination unit 145 is changed to a new value m(NEW) given by the following formula (4):

$$m(\text{NEW}) = C2 \times m(\text{OLD}) \qquad (4)$$

where C2 is a prescribed constant less than one, and the operation returns to the step 9110 to repeat the steps 9110 to 9112 with the new value of "m".

On the other hand, when "w3" is not greater than "w1" at the step 9112, values w3/w2 and b3/b2 are displayed to the user at the step 9114, while the modified summary for the chapter/section of the starting position obtained by the summary generation unit 14 is displayed in a region starting from a next line of the starting position at the step 9115.

As a concrete example, with respect to the display summary as shown in FIG. 92, the user can make the pointing action as indicated in FIG. 93 in which a region shown in a reversed color is a region pointed by the pointing action, which is starting from the section header of the section 2.1 and ending at two lines below the last line of the summary for this section 2.1. In this exemplary case, the modified summary for this section 2.1 appears as indicated in FIG. 94 which is expanded for two lines compared with that shown in FIG. 92 before the modification.

It is to be noted that this operation of FIG. 91 may be modified such that, when "w3" is greater than "w1" at the step 9112, instead of the step 9113 described above, only "w1" characters of the modified summary for the chapter/section of the starting position are displayed. In this case, if the w1-th character is not the period, i.e., the w1-th character is in a middle of a sentence, the display of that sentence may be omitted altogether.

Next, the fifth variation concerning the control of an amount of summary sentences in each summary to be displayed will be described.

In this fifth variation, the summary generation unit 14 has a detailed configuration identical to that shown in FIG. 88 for the third variation described above including the compression rate input unit 146, while the detection result output unit 17' has a detailed configuration identical to that shown in FIG. 90 for the fourth variation described above including the summary modification processing unit 239, but in contrast to the third and fourth variations described above, the change of the compression rate is achieved by presenting candidates for changed compression rates and allowing the user to select a desired one from the presented candidates.

To this end, the document selection processing unit 232 operates according to the flow chart of FIG. 95 as follows.

Figure 95:
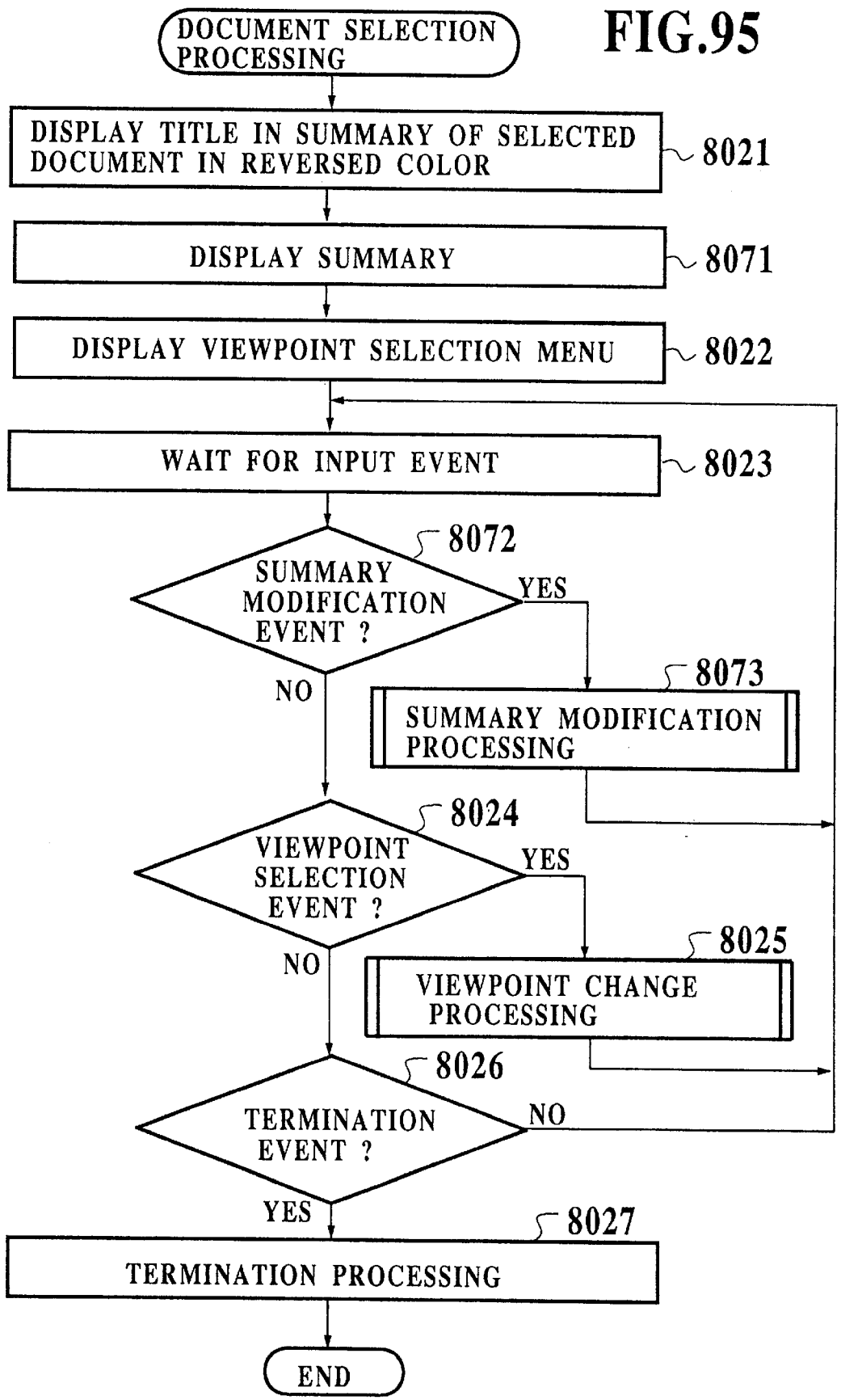
FIG. 95 is a flow chart for an operation of a document selection processing unit in the detection result output unit shown in FIG. 90 in the fifth variation of the second embodiment.

Namely, this flow chart of FIG. 95 differs from that of FIG. 80C for the second embodiment described above in that there are additional steps including the step 8071 for displaying the summary between the steps 8021 and 8022, and the step 8072 for judging whether the input event entered after the step 8023 is the summary modification event or not and the step 8073 for activating the summary modification processing unit 239 between the steps 8023 and 8024.

Also, the operation of the summary modification processing unit 239 in this fifth variation is different from that in the fourth variation and proceeds according to the flow chart of FIG. 96 as follows.

Here, the summary modification processing unit 239 is activated by the detection result display control unit 238 in response to a pointing action with respect to the displayed summary made by the user using a cursor controlled by a pointing device to specify a particular chapter/section in the displayed summary.

First, a chapter/section number specified by a cursor position is determined at the step 9601, and an initial value for a compression rate Q3 is set at the step 9602.

Next, at the step 9603, the compression rate Q3 is supplied to the compression rate input unit 146 in the summary generation unit 14, such that the modification of the summary for the chapter/section of the cursor position is carried out by the text re-construction unit 144 by using the appropriate threshold P2 determined by the compression rate input unit 146 according to the supplied compression rate Q3. Here, the compression rate input unit 146 determines the appropriate threshold P2 according to the following formula (5):

$$P2 = C1 \times Q3 \tag{5}$$

where C1 is a prescribed constant.

Then, a number of summary sentences R in the chapter/section of the cursor position in the modified summary is obtained at the step 9604, a ratio S of the number of the summary sentences R with respect to a total number of sentences in the chapter/section of the cursor position in the original document is obtained at the step 9605, and a set of Q3 used at the step 9603 and R and S obtained at the steps 9604 and 9605 are stored into a buffer provided within detection result display control unit 238.

Then, whether the ratio S obtained at the step 9605 is equal to one or not, i.e., whether the number of summary sentences R is equal to the total number of sentences in the chapter/section of the cursor position or not, is judged at the step 9607.

When the ratio S is not equal to one, next at the step 9608, the compression rate Q3 to be supplied to the compression rate input unit 146 is changed to a new value Q3(NEW) given by the following formula (6):

$$Q3(NEW) = C3 \times Q3(OLD) \tag{6}$$

where C3 is a prescribed constant greater than one, and the operation returns to the step 9603 to repeat the steps 9603 to 9607 with the new value of Q3. In this manner, the pairs of R and S for different values of Q3 are accumulated in the buffer until the ratio S becomes one.

When the ratio S is equal to one at the step 9607, all pairs of R and S stored in the buffer are displayed at the step 9609, and a selection of one of the displayed pairs of R and S to be made by the user is awaited at the step 9610.

Then, when the selection of one pair of R and S is made by the user, next at the step 9611, the compression rate Q3 corresponding to the selected pair of R and S is supplied to the compression rate input unit 146 in the summary generation unit 14, such that the modification of the summary for the chapter/section of the cursor position is carried out by the text re-construction unit 144 by using the appropriate threshold P2 determined by the compression rate input unit 146 according to the supplied compression rate Q3 by using the formula (5) described above.

Then, the modified summary for the chapter/section of the cursor position obtained by the summary generation unit 14 is displayed in a region starting from a next line of the chapter/section header at the step 9612, while the display pointers of those chapters/sections subsequent to the chapter/section of the cursor position are increased to displace the displayed positions of these chapters/sections downwards for the number of lines in the modified summary for the chapter/section of the cursor position at the step 9613.

As a concrete example, with respect to the display summary containing only the chapter/section headers as shown in FIG. 97, the user can make the pointing action by using the cursor indicated as a black triangle specifying the chapter 1 in FIG. 97. Then, from the pairs of the number of summary sentences R and the ratio S displayed on a lower right corner of the displayed summary, the user can make the selection of a desired pair, as indicated in FIG. 98 in which the pair of R=7 and S=54% is selected for example, as indicated by a blackening of a box provided for this pair. In this exemplary case, the modified summary for this chapter 1 appears as indicated in FIG. 99 which contains seven summary sentences as requested by the user.

Figure 96:
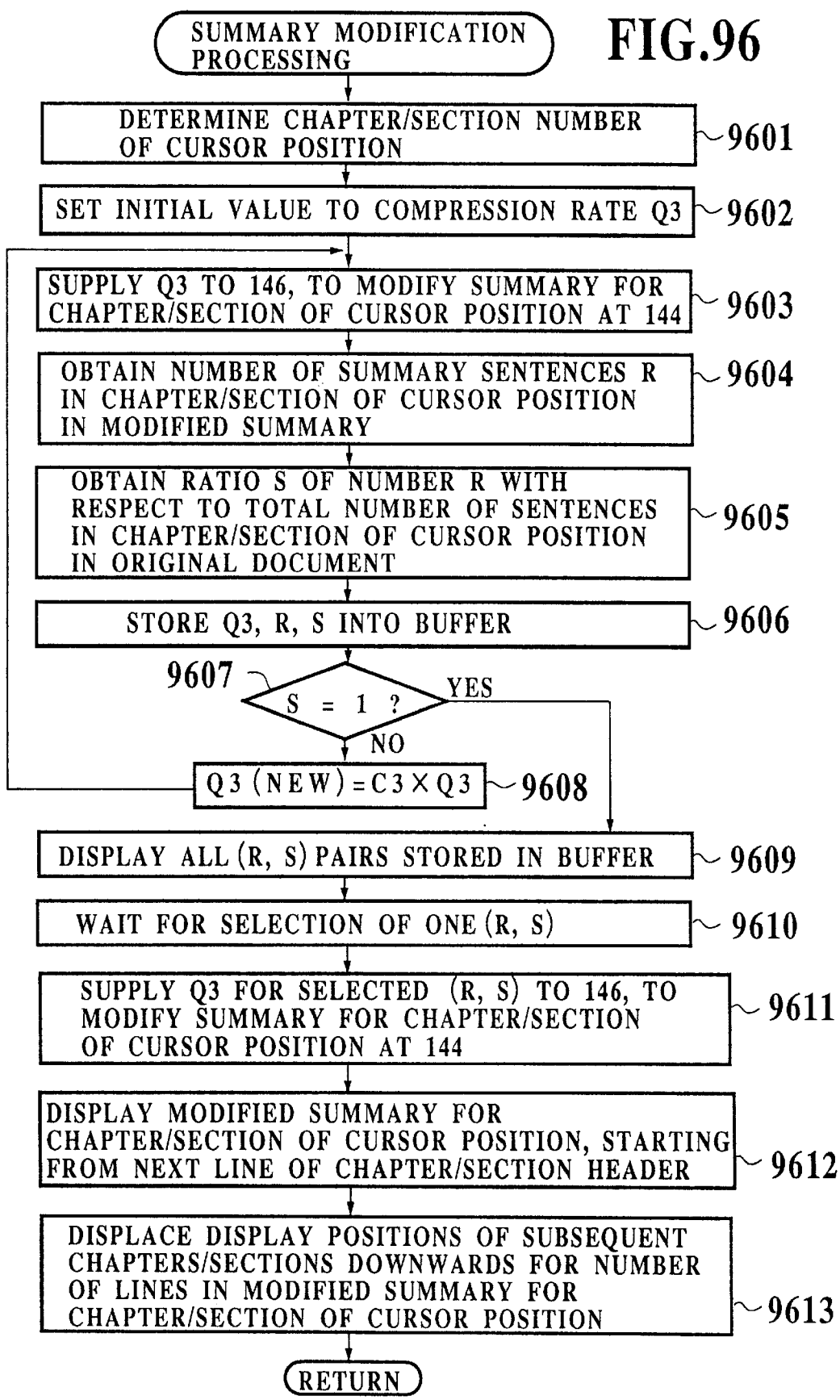
FIG. 96 is a flow chart for an operation of a summary modification processing unit in the detection result output unit of FIG. 90 in the fifth variation of the second embodiment.

It is to be noted here that this operation of FIG. 96 may be modified to replace the ratio S of the number of summary sentences R in the modified summary with respect to the total number of sentences in the original document by a ratio of the number of words in the modified summary with respect to the total number of words in the original document, or by a ratio of the number of characters in the modified summary with respect to the total number of characters in the original document.

It is also to be noted that, in the operation of FIG. 96 described above, in displaying the modified summary obtained by the summary generation unit 14 at the step 9612, the newly generated modified summary is inserted into the same display window as that for displaying the summary before the modification, but it is also possible to generate a new display window for displaying the newly generated modified summary.

It is also to be noted that this operation of FIG. 96 may be modified to store the summaries obtained for different compression rates obtained at the step 9603, and the appropriate one of the stored summaries is selected in response to the selection made at the step 9610, instead of generating the summary for the appropriate compression rate gain at the step 9611, when there is a sufficient amount of memory capacity for storing the summaries or when the number of summaries to be stored is not too numerous.

Next, the sixth variation concerning the control of an amount of summary sentences in each summary to be displayed will be described.

In this sixth variation, the summary generation unit 14 has a detailed configuration identical to that shown in FIG. 88 for the third variation described above including the compression rate input unit 146, while the detection result output unit 17' has a detailed configuration as shown in FIG. 100, which includes a summary detailing processing unit 240, a summary simplification processing unit 241, and an original document display processing unit 242, all of which are connected with the detection result display control unit 238, in addition to the configuration of FIG. 79 described above for the second embodiment. With this configuration, in this sixth variation, in contrast to the third, fourth, and fifth variations described above, the change of the compression rate is achieved in accordance with the commands from the user.

To this end, the document selection processing unit 232 operates according to the flow chart of FIG. 101 as follows.

Figure 101:
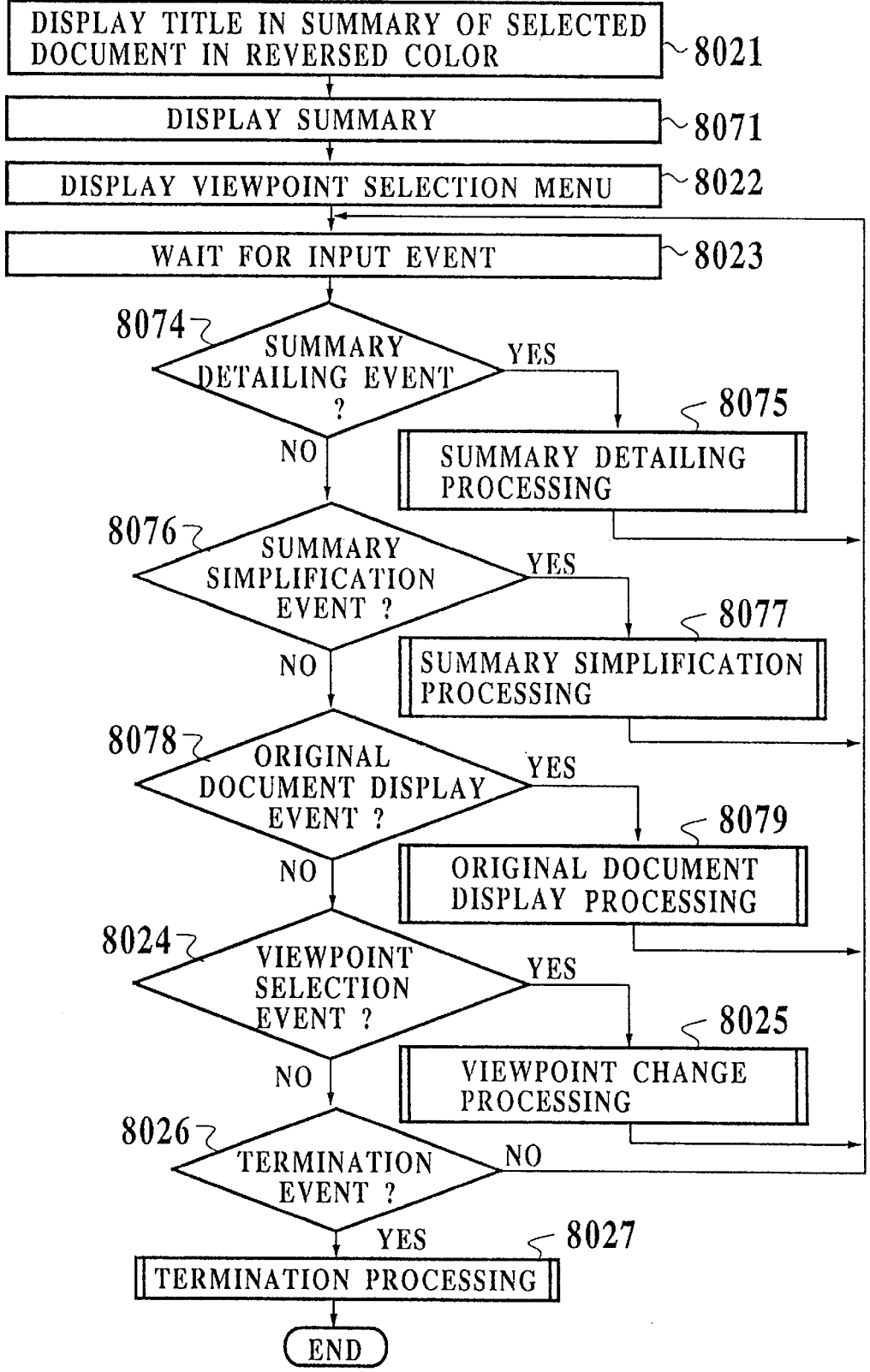
FIG. 101 is a flow chart for an operation of a document selection processing unit in the detection result output unit of FIG. 100.

Namely, this flow chart of FIG. 101 differs from that of FIG. 95 for the fifth variation described above in that the additional steps 8072 and 8073 between the steps 8023 and 8024 are replaced by the step 8074 for judging whether the input event entered after the step 8023 is the summary detailing event or not, the step 8075 for activating the summary detailing processing unit 240, the step 8076 for judging whether the input event entered after the step 8023 is the summary simplification event or not, the step 8077 for activating the summary simplification processing unit 241, the step 8078 for judging whether the input event entered after the step 8023 is the original document display event or not, and the step 8079 for activating the original document display processing unit 242.

In this sixth variation, the user makes a pointing action with respect to the displayed summary by using a pointing device to specify a region starting from a chapter/section header in the displayed summary. In addition, the user selectively operates icon buttons displayed above the displayed summary for activating any one of the summary detailing processing unit 240, the summary simplification processing unit 241, and the original document display processing unit 242, through the detection result display control unit 238.

Also, the detection result display control unit 238 is provided with a buffer for storing a compression rate Q4, a number of summary sentences R4 in the chapter/section of the cursor position in the displayed summary, a ratio S4 of the number of the summary sentences R4 with respect to a total number of sentences in the chapter/section of the cursor position in the original document, and a list L2 of the sentence numbers of the summary sentences in the chapter/section of the cursor position in the displayed summary.

Now, the summary detailing processing unit 240 operates according to the flow chart of FIG. 102 as follows.

Here, the summary detailing processing unit 240 is activated by the detection result display control unit 238 in response to the pressing of a "detail" icon button by the user which is made in conjunction with a pointing action with respect to the displayed summary made by using a cursor controlled by a pointing device to specify a particular chapter/section in the displayed summary.

First, a chapter/section number specified by a cursor position is determined at the step 9701, and the ratio S4 for this chapter/section of the cursor position stored in the buffer is taken out from the detection result display control unit 238 at the step 9702.

Then, whether the ratio S4 obtained at the step 9702 is equal to one or not, i.e., whether the number of summary sentences R4 is equal to the total number of sentences in the chapter/section of the cursor position or not, is judged at the step 9703. When the ratio S4 is equal to one, the operation of the summary detailing processing unit 240 is terminated as there is no further detail that can be incorporated into the current summary.

On the other hand, when the ratio S4 is not equal to one, the compression rate Q4 for the chapter/section of the cursor position stored in the buffer is taken out from the detection result display control unit 238 at the step 9704, and the list L2 of sentence numbers of the summary sentences in the chapter/section of the cursor position stored in the buffer is taken out from the detection result display control unit 238 at the step 9705.

Then, at the step 9706, the compression rate Q4 to be supplied to the compression rate input unit 146 is changed to a new value Q4(NEW) given by the following formula (7):

$$Q4(NEW) = C4 \times Q4(OLD) \qquad (7)$$

where C4 is a prescribed constant greater than one.

Next, at the step 9707, the compression rate Q4(NEW) obtained at the step 9706 is supplied to the compression rate input unit 146 in the summary generation unit 14, such that the detailing of the summary for the chapter/section of the cursor position is carried out by the text re-construction unit 144 by using the appropriate threshold P2 determined by the compression rate input unit 146 according to the supplied compression rate Q4. Here, the compression rate input unit 146 determines the appropriate threshold P2 according to the following formula (8):

$$P2 = C1 \times Q4 \qquad (8)$$

where C1 is a prescribed constant.

Then, the list L2 of sentence numbers of the summary sentences in the chapter/section of the cursor position in the detailed summary is produced at the step 9708, the number of summary sentences R4 in the chapter/section of the cursor position in the detailed summary is obtained at the step 9709, and the ratio S4 of the number of the summary sentences R4 with respect to a total number of sentences in the chapter/section of the cursor position in the original document is obtained at the step 9710.

Next, the number of summary sentences R4 and the ratio S4 for the chapter/section of the cursor position stored in the buffer are displayed at the step 9711, and the detailed summary for the chapter/section of the cursor position obtained by the summary generation unit 14 is displayed in a region starting from a next line of the chapter/section header at the step 9712.

Then, at the step 9713, the emphasis such as shading is added to the display of those sentences whose sentence numbers are contained in the list L2(NEW) produced at the step 9708, but not in the list L2(OLD) taken out at the step 9705.

Finally, the display pointers of those chapters/sections subsequent to the chapter/section of the cursor position are increased to displace the displayed positions of these chapters/sections downwards for the number of lines in the detailed summary for the chapter/section of the cursor position at the step 9714, and the compression rate Q4, the list L2, the number of summary sentences R4, and the ratio S4 for the chapter/section of the cursor position obtained at the steps 9706, 9708, 9709, and 9710, respectively, are stored into the buffer at the step 9715.

On the other hand, the summary simplification processing unit 241 operates according to the flow chart of FIG. 103 as follows.

Here, the summary simplification processing unit 241 is activated by the detection result display control unit 238 in response to the pressing of a "simple" icon button by the user which is made in conjunction with a pointing action with respect to the displayed summary made by using a cursor controlled by a pointing device to specify a particular chapter/section in the displayed summary.

First, a chapter/section number specified by a cursor position is determined at the step 9801, and the ratio S4 for this chapter/section of the cursor position stored in the buffer is taken out from the detection result display control unit 238 at the step 9802.

Then, whether the ratio S4 obtained at the step 9802 is equal to zero or not, i.e., whether the number of summary sentences R4 is equal to zero or not, is judged at the step 9803. When the ratio S4 is equal to zero, the operation of the summary simplification processing unit 241 is terminated as there is no further detail that can be simplified from the current summary.

On the other hand, when the ratio S4 is not equal to zero, the compression rate Q4 for the chapter/section of the cursor position stored in the buffer is taken out from the detection result display control unit 238 at the step 9804, and then at the step 9805, the compression rate Q4 to be supplied to the compression rate input unit 146 is changed to a new value Q4(NEW) given by the following formula (9):

$$Q4(NEW)=Q4(OLD)/C4 \qquad (9)$$

where C4 is a prescribed constant greater than one as described above.

Next, at the step 9806, the compression rate Q4(NEW) obtained at the step 9805 is supplied to the compression rate input unit 146 in the summary generation unit 14, such that the simplification of the summary for the chapter/section of the cursor position is carried out by the text re-construction unit 144 by using the appropriate threshold P2 determined by the compression rate input unit 146 according to the supplied compression rate Q4. Here, the compression rate input unit 146 determines the appropriate threshold P2 according to the formula (8) described above.

Then, the list L2 of sentence numbers of the summary sentences in the chapter/section of the cursor position in the simplified summary is produced at the step 9807, the number of summary sentences R4 in the chapter/section of the cursor position in the simplified summary is obtained at the step 9808, and the ratio S4 of the number of the summary sentences R4 with respect to a total number of sentences in the chapter/section of the cursor position in the original document is obtained at the step 9809.

Next, the number of summary sentences R4 and the ratio S4 for the chapter/section of the cursor position stored in the buffer are displayed at the step 9810, and the simplified summary for the chapter/section of the cursor position obtained by the summary generation unit 14 is displayed in a region starting from a next line of the chapter/section header at the step 9811.

Finally, the display pointers of those chapters/sections subsequent to the chapter/section of the cursor position are decreased to displace the displayed positions of these chapters/sections upwards for the number of lines reduced in the simplified summary for the chapter/section of the cursor position at the step 9812, and the compression rate Q4, the list L2, the number of summary sentences R4, and the ratio S4 for the chapter/section of the cursor position obtained at the steps 9805, 9807, 9808, and 9809, respectively, are stored into the buffer at the step 9813.

Figure 104:
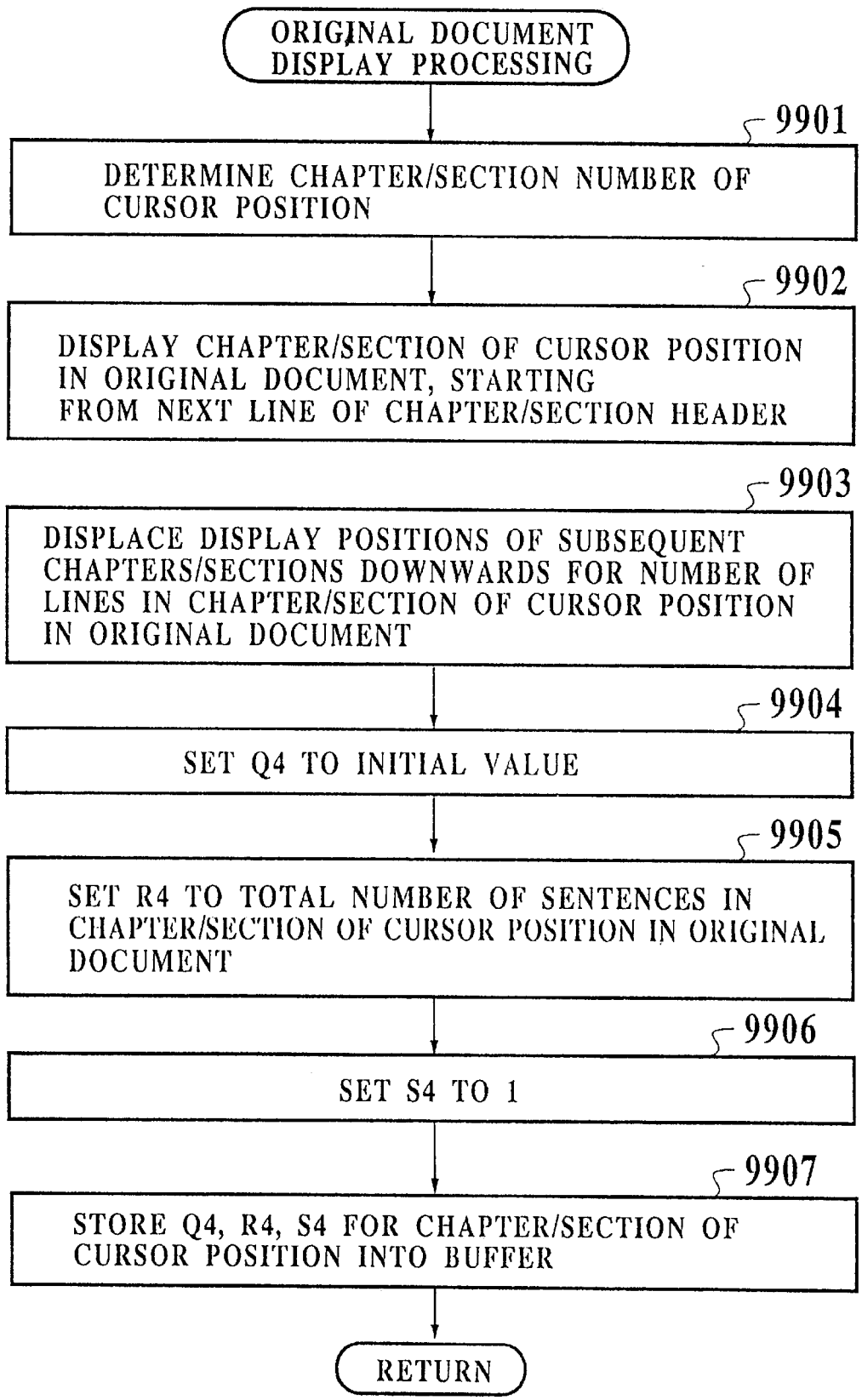
FIG. 104 is a flow chart for an operation of an original document display processing unit in the detection result output unit of FIG. 100.

In contrast, the original document display processing unit 242 operates according to the flow chart of FIG. 104 as follows.

Here, the original document display processing unit 242 is activated by the detection result display control unit 238 in response to the pressing of an "original" icon button by the user which is made in conjunction with a pointing action with respect to the displayed summary made by using a cursor controlled by a pointing device to specify a particular chapter/section in the displayed summary.

First, a chapter/section number specified by a cursor position is determined at the step 9901, and the chapter/section of the cursor position in the original document is displayed in a region starting from a next line of the chapter/section header at the step 9802, while the display pointers of those chapters/sections subsequent to the chapter/section of the cursor position are decreased to displace the displayed positions of these chapters/sections downwards for the number of lines in the chapter/section of the cursor position in the original document at the step 9803.

Then, the compression rate Q4 is set to the initial value at the step 9904, the number of summary sentences R4 is set to the total number of sentences in the chapter/section of the cursor position in the original document at the step 9905, and the ratio S is set to one at the step 9906.

Finally, the compression rate Q4, the number of summary sentences R4, and the ratio S4 for the chapter/section of the cursor position obtained at the steps 9904, 9905, and 9906, respectively, are stored into the buffer at the step 9907.

Thus, by this original document display processing unit 242, the original document can be displayed immediately, without using the summary detailing and simplification processing units 240 and 241.

As a concrete example, with respect to the display summary as shown in FIG. 105, the user can make the pointing action by using the cursor indicated as a black triangle specifying the chapter 1 in FIG. 105. Then, FIG. 106 indicates the display resulting from the pressing of the "detail" icon button in the state of FIG. 105, in which the emphasis in a form of the reversed color is added to the displayed portion of two summary sentences newly incorporated as a result of the summary detailing processing.

It is also to be noted that, in the operations described above, in displaying the detailed or simplified summary obtained by the summary generation unit 14, the newly generated detailed or simplified summary is inserted into the same display window as that for displaying the summary before the detailing or the simplifying, but it is also possible to generate a new display window for displaying the newly generated detailed or simplified summary.

Next, the seventh variation concerning the control of an amount of summary sentences in each summary to be displayed will be described.

In this seventh variation, the configurations of the summary generation unit 14 and the detection result output unit 17' have the same configurations as in the sixth variation described above, but the operations of the document selection processing unit 232, the summary detailing processing unit 240, and the summary simplification processing unit 241 are modified as follows.

Namely, in this seventh variation, the summary and the corresponding original document are displayed simultaneously, side by side, such that the locations of the summary sentences of the displayed summary in the original document can be recognized immediately.

Figure 107:
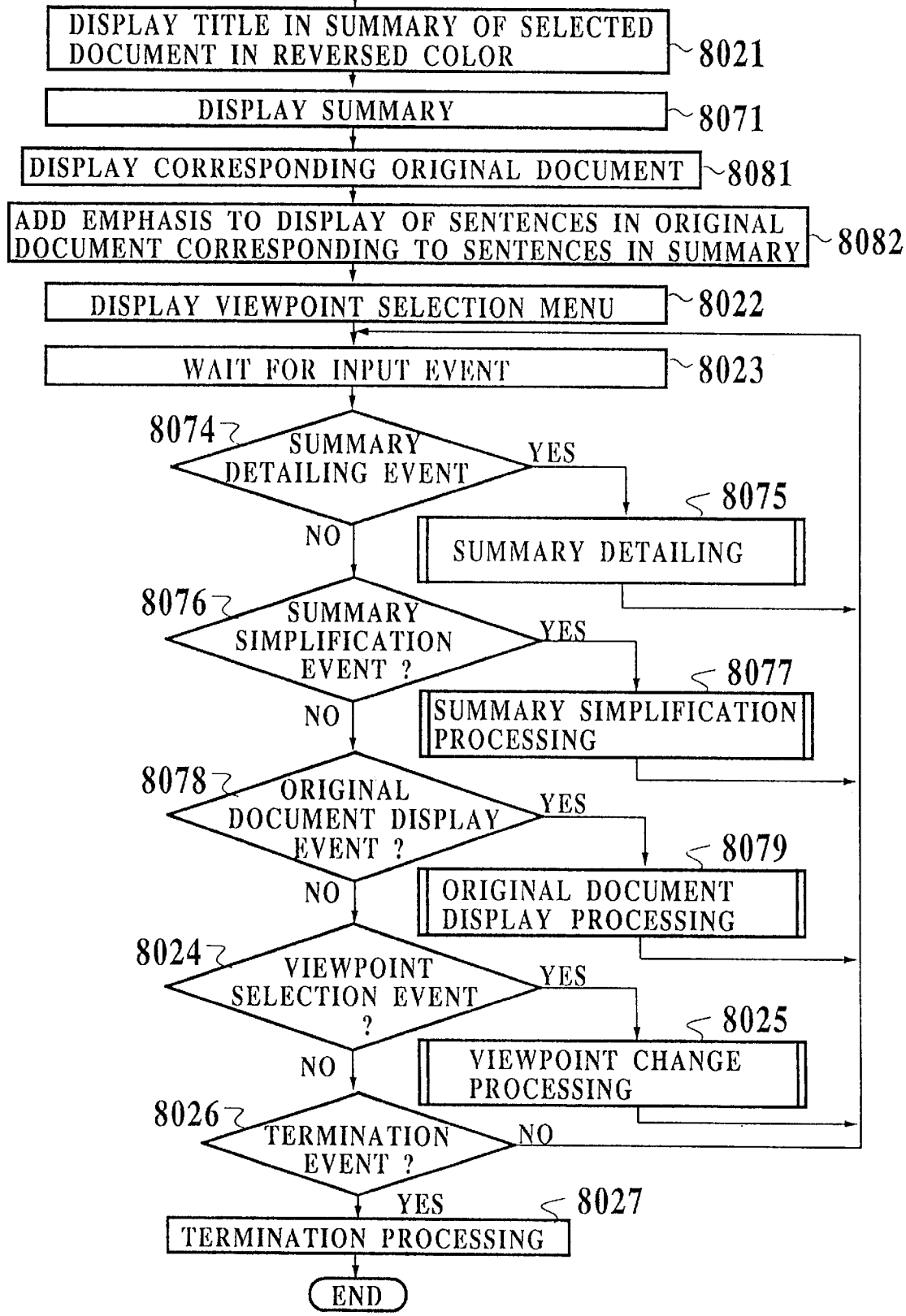
FIG. 107 is a flow chart for an operation of a document selection processing unit in the detection result output unit shown in FIG. 100 in the seventh variation of the second embodiment.

To this end, the document selection processing unit 232 operates according to the flow chart of FIG. 107, which differs from that shown in FIG. 101 for the sixth variation described above in that there are additional steps of the step 8081 for displaying the original document corresponding to the displayed summary, and the step 8082 for adding the emphasis such as shading or reversed coloring to the display of sentences in the original documents which are corresponding to the summary sentences of the displayed summary, between the steps 8071 and 8022.

Figure 102B:
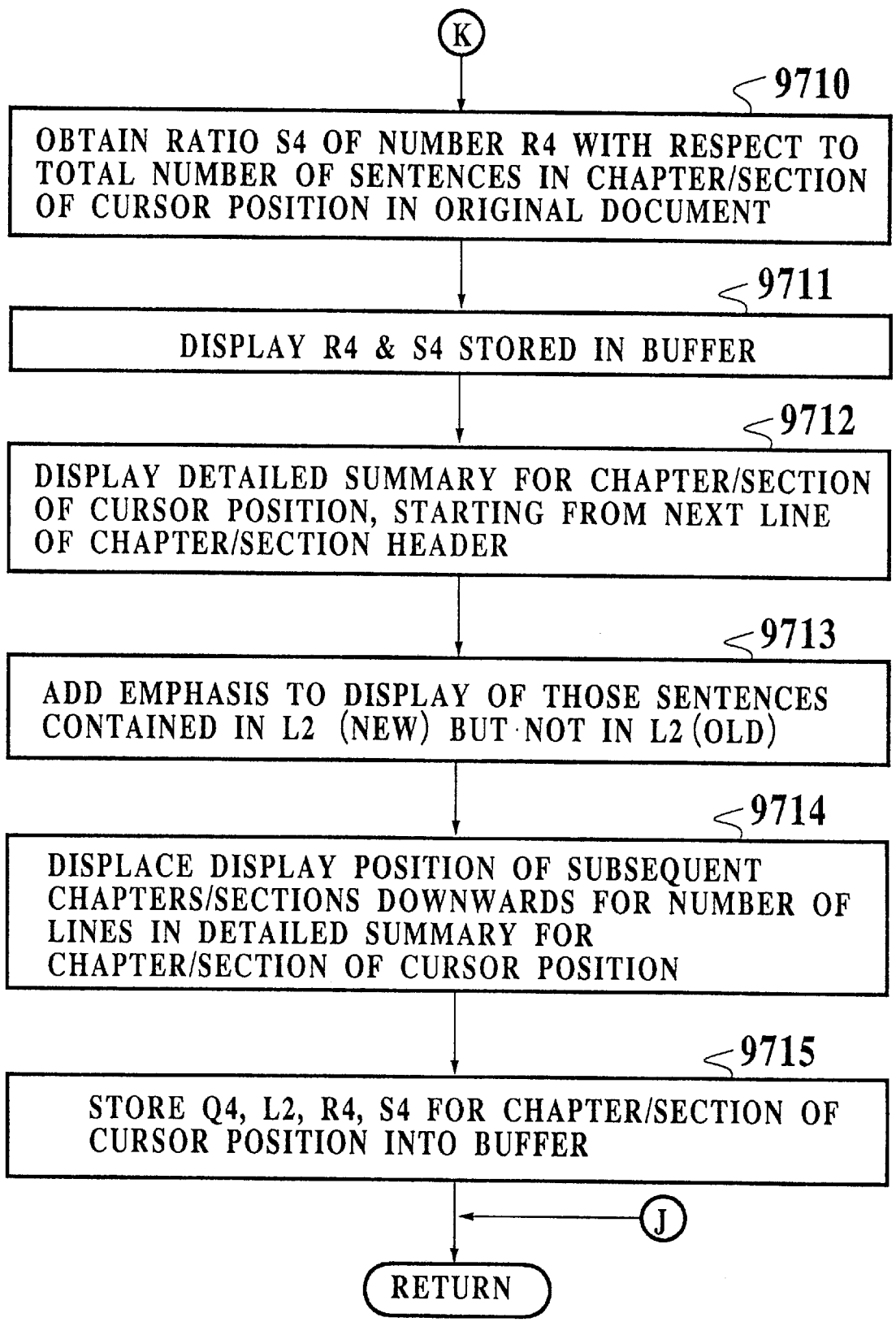
Figure 108B:
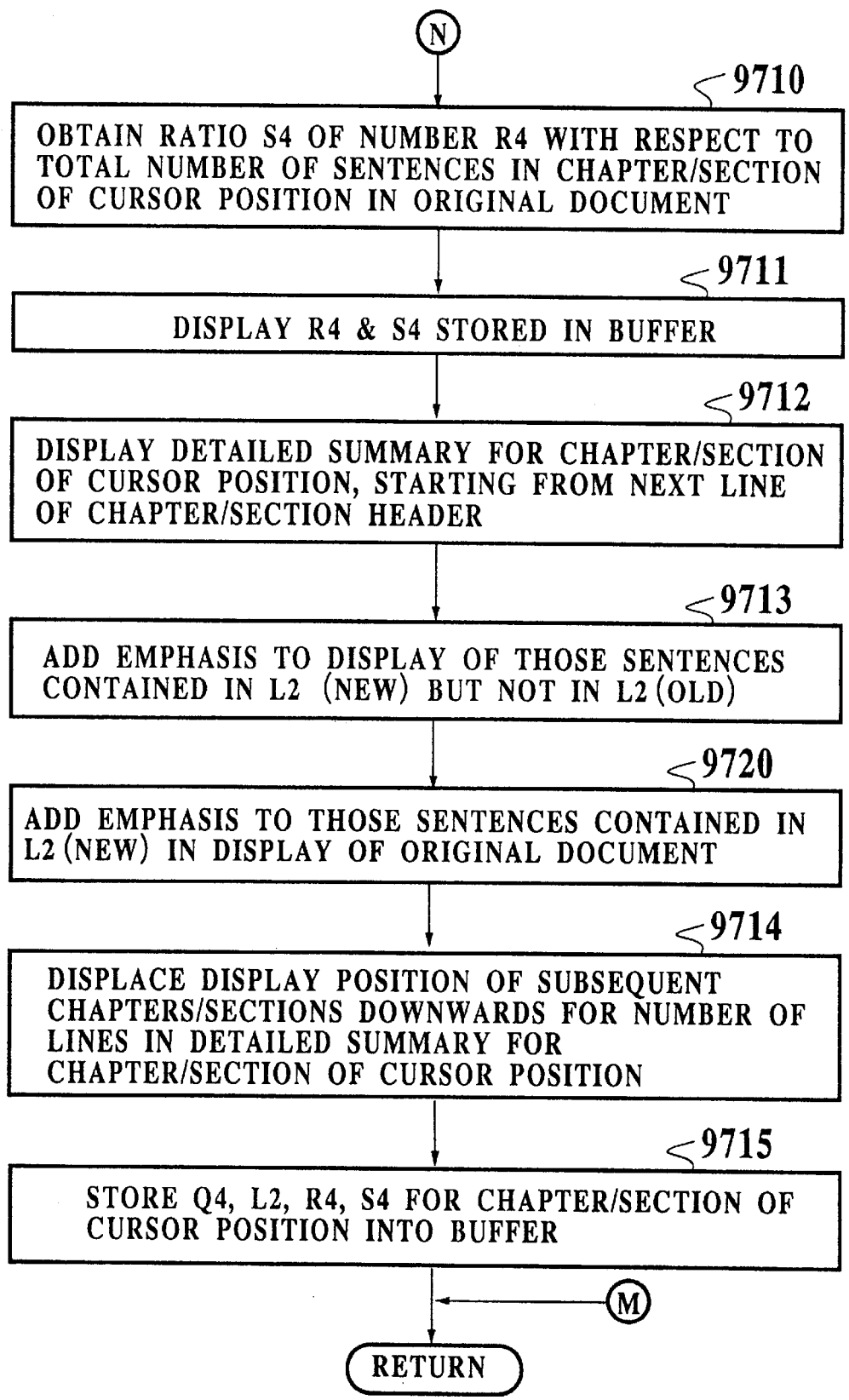

Also, the summary detailing processing unit 240 operates according to the flow chart of FIG. 108, which differs from that shown in FIG. 102 for the sixth variation described above in that there is an additional step of the step 9720 between the steps 9713 and 9714, for adding the emphasis such as shading or reversed coloring to the display of the sentences in the original documents whose sentence numbers are contained in the list L2(NEW) obtained at the step 9708.

Figure 109:
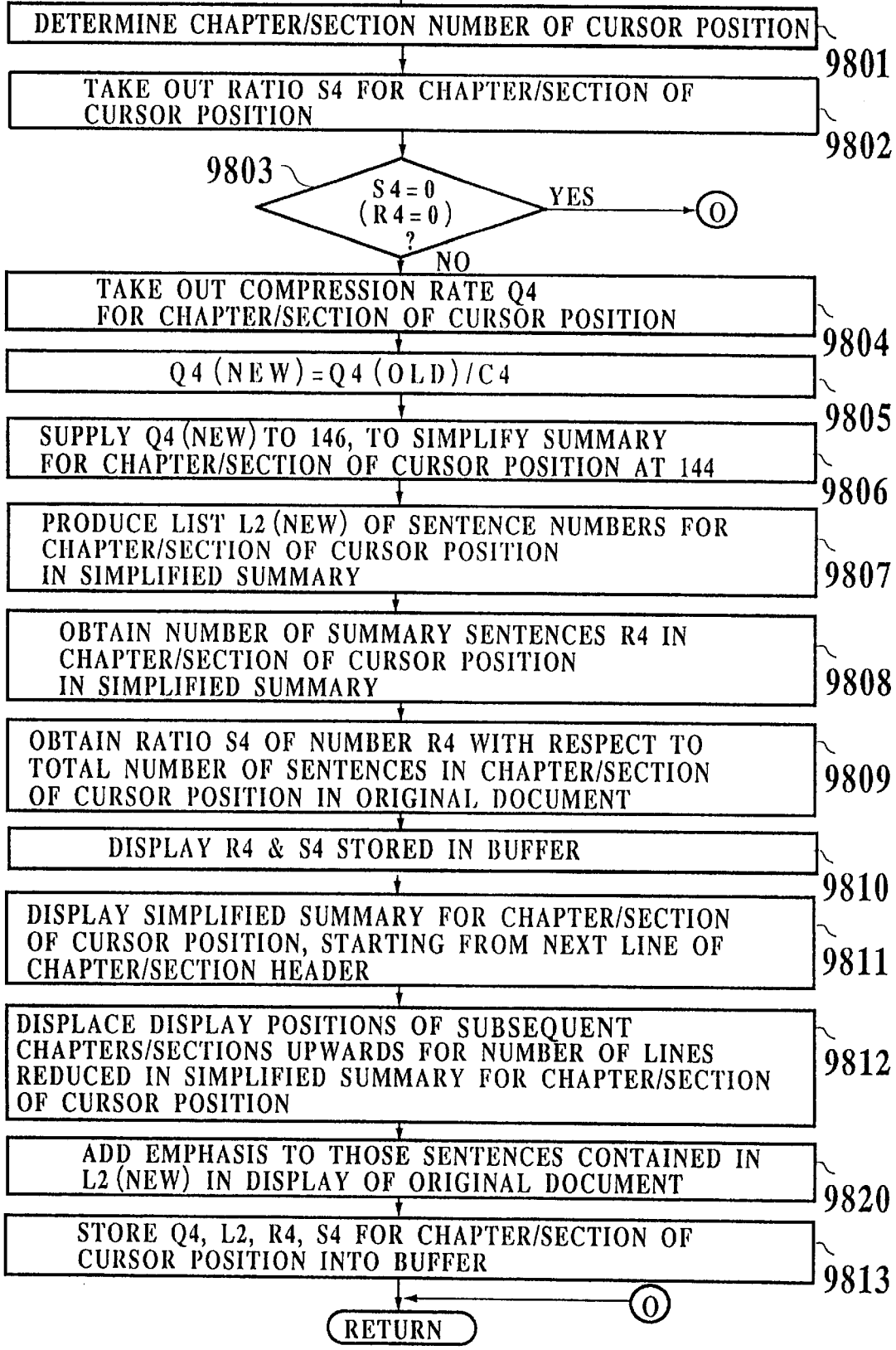
FIG. 109 is a flow chart for an operation of a summary simplification processing unit in the detection result output unit shown in FIG. 100 in the seventh variation of the second embodiment.

Also, the summary simplification processing unit 241 operates according to the flow chart of FIG. 109, which differs from that shown in FIG. 103 for the sixth variation described above in that there is an additional step of the step 9820 between the steps 9812 and 9813, for adding the emphasis such as shading or reversed coloring to the display of the sentences in the original documents whose sentence numbers are contained in the list L2(NEW) obtained at the step 9807.

As a concrete example, with respect to the display summary as shown in FIG. 110A, the user can make the pointing action by using the cursor indicated as a black triangle specifying the chapter 1 in FIG. 110A. Then, FIG. 110B indicates the display of the corresponding original document resulting from the pressing of the "original" icon button in the state of FIG. 110A, in which the emphasis in a form of the reversed color is added to the displayed portions of two sentences which are contained in the displayed summary of FIG. 110A as the summary sentences. Here, the correspondence between the summary sentences and the sentences in the original documents can be recognized from the information concerning which sentence in the original document is each summary sentence originated from, that can be obtained at a time of selecting the sentences with the penalty below the threshold P2 at the text re-construction unit 144.

It is to be noted that the above operation may be modified such that only the sentences of the original document are displayed with the graded emphasis indications added to the sentences in a descending order of their penalties.

Next, the eighth variation concerning the arrangement of the summary sentences in each summary to be displayed will be described.

In this eighth variation, the configurations of the system is basically similar to that of the second embodiment described above, but the document structure analysis unit 141 and the text re-construction unit 144 in the summary generation unit 14 also carries out the additional operations for the purpose of arranging the summary sentences originating from the different paragraphs in the original documents as belonging to the different paragraphs in the summary as well.

Figure 111:
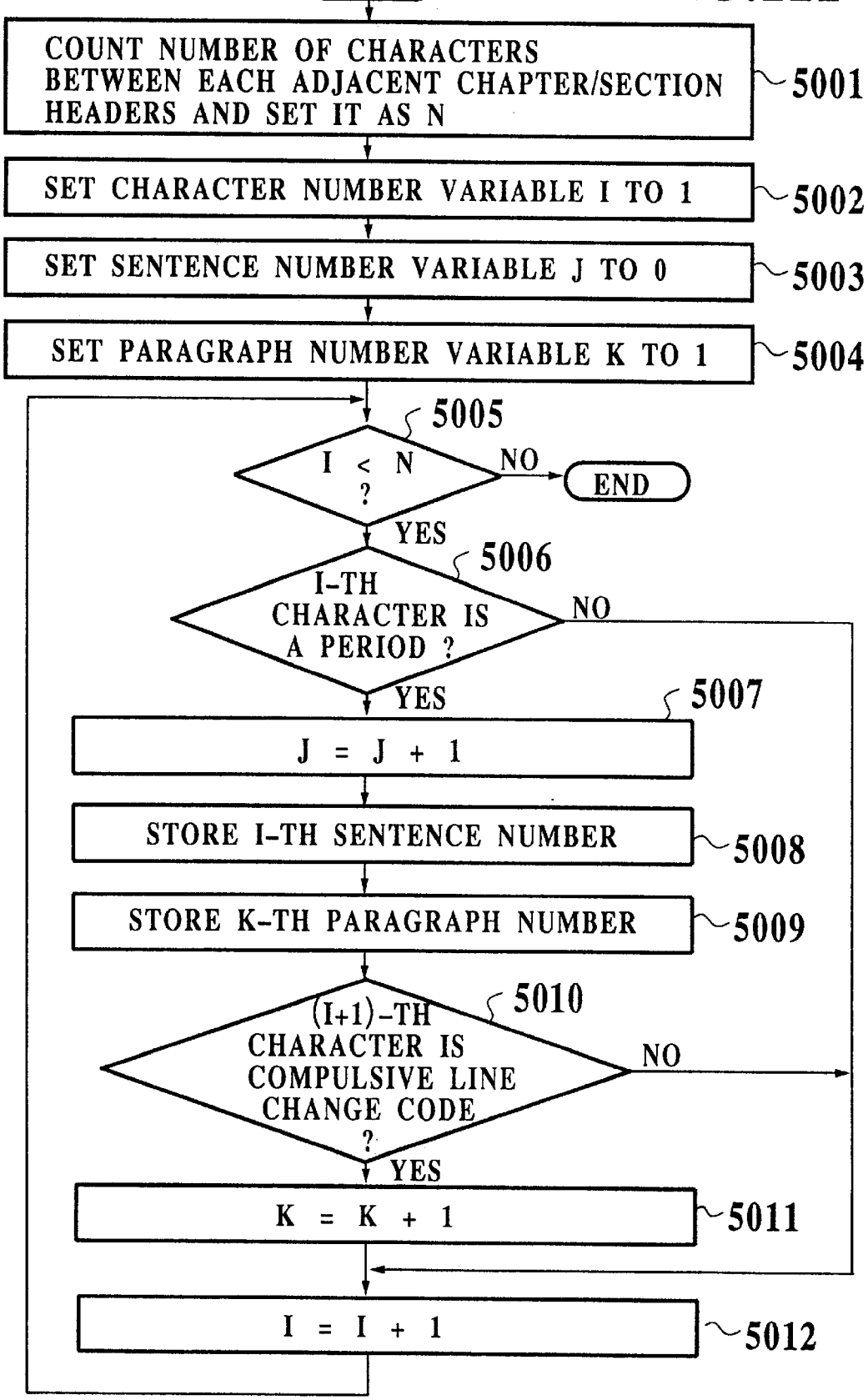
FIG. 111 is a flow chart for an operation of a document structure analysis unit in the summary generation unit in the eighth variation of the second embodiment.

More specifically, the document structure analysis unit 141 carries out the additional operation according to the flow chart of FIG. 111 to extract the paragraph data concerning the paragraphs in the original documents, as follows.

First, at the step 5001, a number of characters between each adjacent chapter/section headers in the original document is counted and set to a variable N.

Then, a character number variable I is set to one at the step 5002, a sentence number variable J is set to zero at the step 5003, and a paragraph number variable K is set to one at the step 5004, initially.

Next, at the step 5005, whether a current value of the character number variable I is less than N is judged. When the character number variable I is not less than N, this operation of the document structure analysis unit 141 is terminated. Otherwise, next at the step 5006, whether the I-th character is a period or not is judged. When the I-th character is not a period, the operation proceeds to the step 5012 described below.

On the other hand, when the I-th character is a period, a value of the sentence number variable J is incremented by one at the step 5007, and the J-th sentence number is stored in the document structure analysis unit 141 at the step 5008, while the K-th paragraph number is also stored in the document structure analysis unit 141 at the step 5009.

Then, at the step 5010, whether the (I+1)-th character is a compulsive line change code or not is judged. When the (I+1)-th character is not a compulsive line change code, the operation proceeds to the step 5012 described below, whereas otherwise the paragraph number variable K is incremented by one at the step 5011.

Then, the character number variable I is incremented by one at the step 5012, and the operation returns to the step 5005 above to repeat the steps 5005 to 5012 for the new value of the character number variable I.

As a concrete example, with respect to the exemplary original document as shown in FIG. 112, the sentence structure analysis unit 141 obtains the paragraph data as shown in FIG. 113 in which the sentence number, the sentence type, and the paragraph number for each sentence are registered in correspondence.

Figure 114:
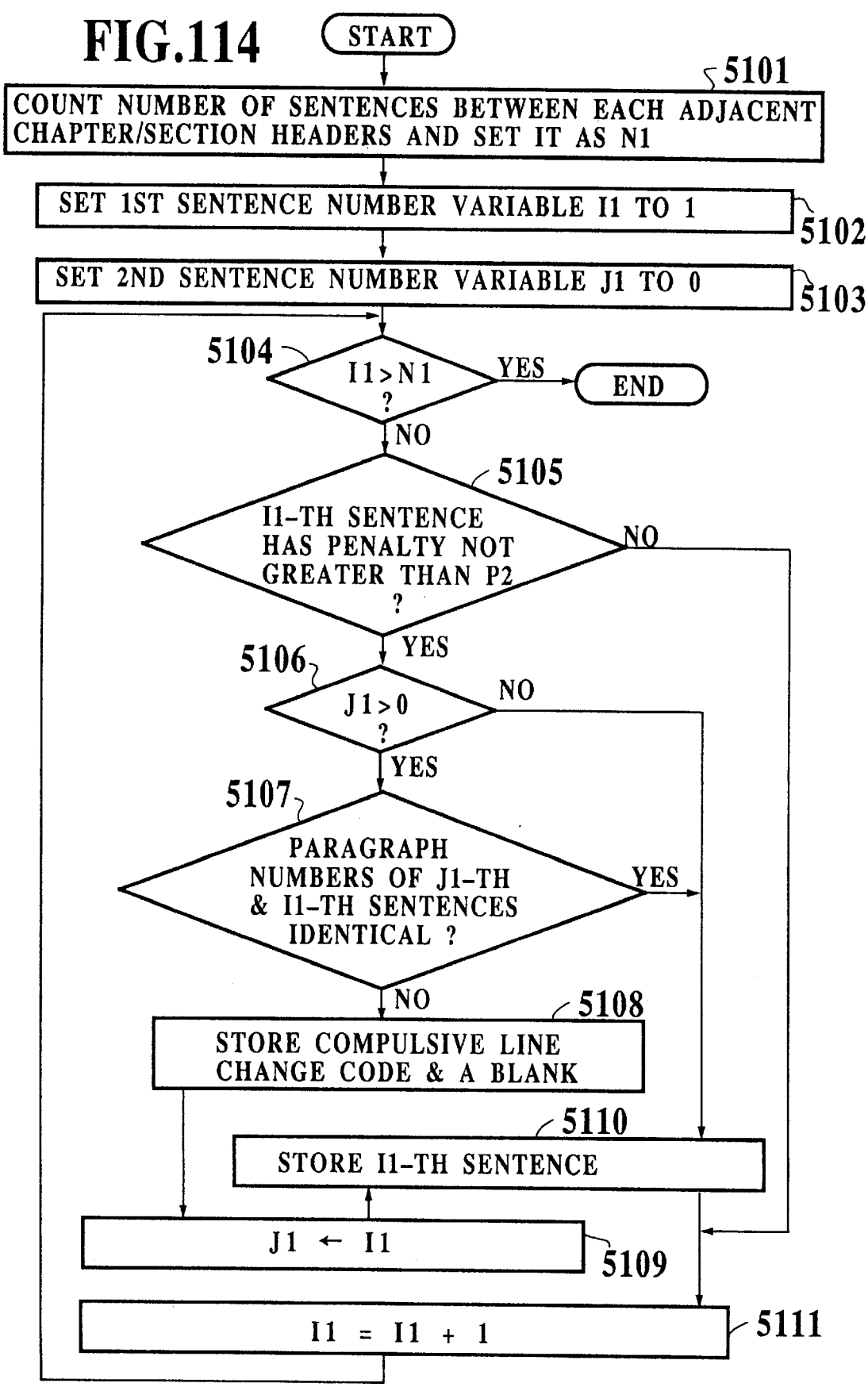
FIG. 114 is a flow chart for an operation of a text re-construction unit in the summary generation unit in the eighth variation of the second embodiment.

On the other hand, the text re-construction unit 144 carries out the operation according to the flow chart of FIG. 114 to select the summary sentences and arrange them in accordance with the paragraph data obtained by the document structure analysis unit 141, as follows.

First, at the step 5101, a number of sentences between each adjacent chapter/section headers in the original document is counted and set to a variable N1.

Then, a first sentence number variable I1 is set to one at the step 5102, and a second sentence number variable J1 is set to zero at the step 5103, initially.

Next, at the step 5104, whether a current value of the first sentence number variable I1 is greater than N1 or not is judged. When the first sentence number variable I1 is greater than N1, this operation of the text re-construction unit 144 is terminated. Otherwise, next at the step 5105, whether the I1-th sentence has the penalty not greater than the threshold P2 or not is judged. When the I1-th sentence has the penalty greater than the threshold P2, the operation proceeds to the step 5111 described below. Otherwise, next at the step 5106, whether the second sentence variable J1 is greater than zero or not is judged. When the second sentence variable J1 is zero, the operation proceeds to the step 5110 described below. Otherwise, next at the step 5107, the paragraph numbers of the J1-th and I1-th sentences are identical or not is judged. When they are identical, the operation proceeds to the step 5110 described below. Otherwise, the compulsive line change code followed by a black is stored into a buffer provided in the text re-construction unit 144 at the step 5108, and the current value of the first sentence number variable I1 is set to the second sentence number variable J1 at the step 5109.

Then, the I1-th sentence is stored into the buffer at the step 5110, and the first sentence number variable I1 is incremented by one at the step 5111, and then the operation returns to the step 5104 above to repeat the steps 5104 to 5111 with the new value of the first sentence number variable I1.

Figure 115:
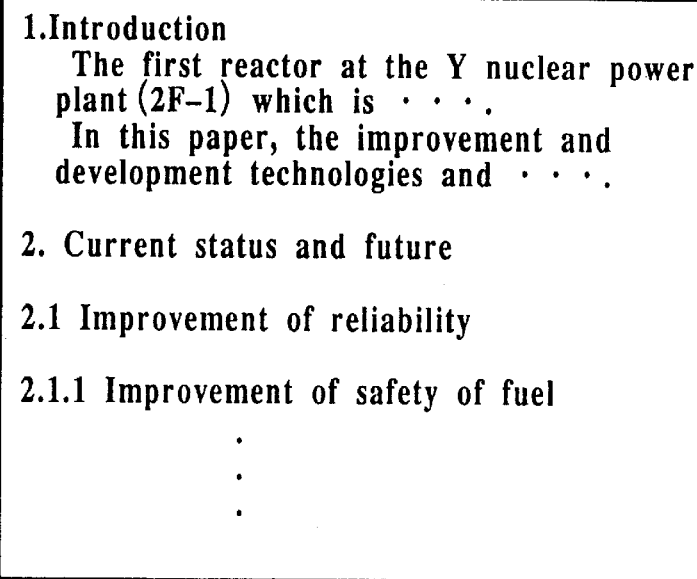
FIG. 115 is an illustration of the exemplary summary obtained from the original document of FIG. 112 by the operation of FIG. 114.

As a concrete example, FIG. 115 shows an exemplary summary obtained by the text re-construction unit 144 for the chapter 1 in the exemplary original document shown in FIG. 112, which includes the first and sixth sentences in the chapter 1 of the original document. Here, as the first and sixth sentences in the chapter 1 of the original document originate from different paragraphs (first and third paragraphs) in the original document of FIG. 112, the corresponding summary sentences are also arranged as belonging to the different paragraphs in the summary shown in FIG. 115.

Next, the ninth variation concerning a detection of available window display space will be described.

Figure 116:
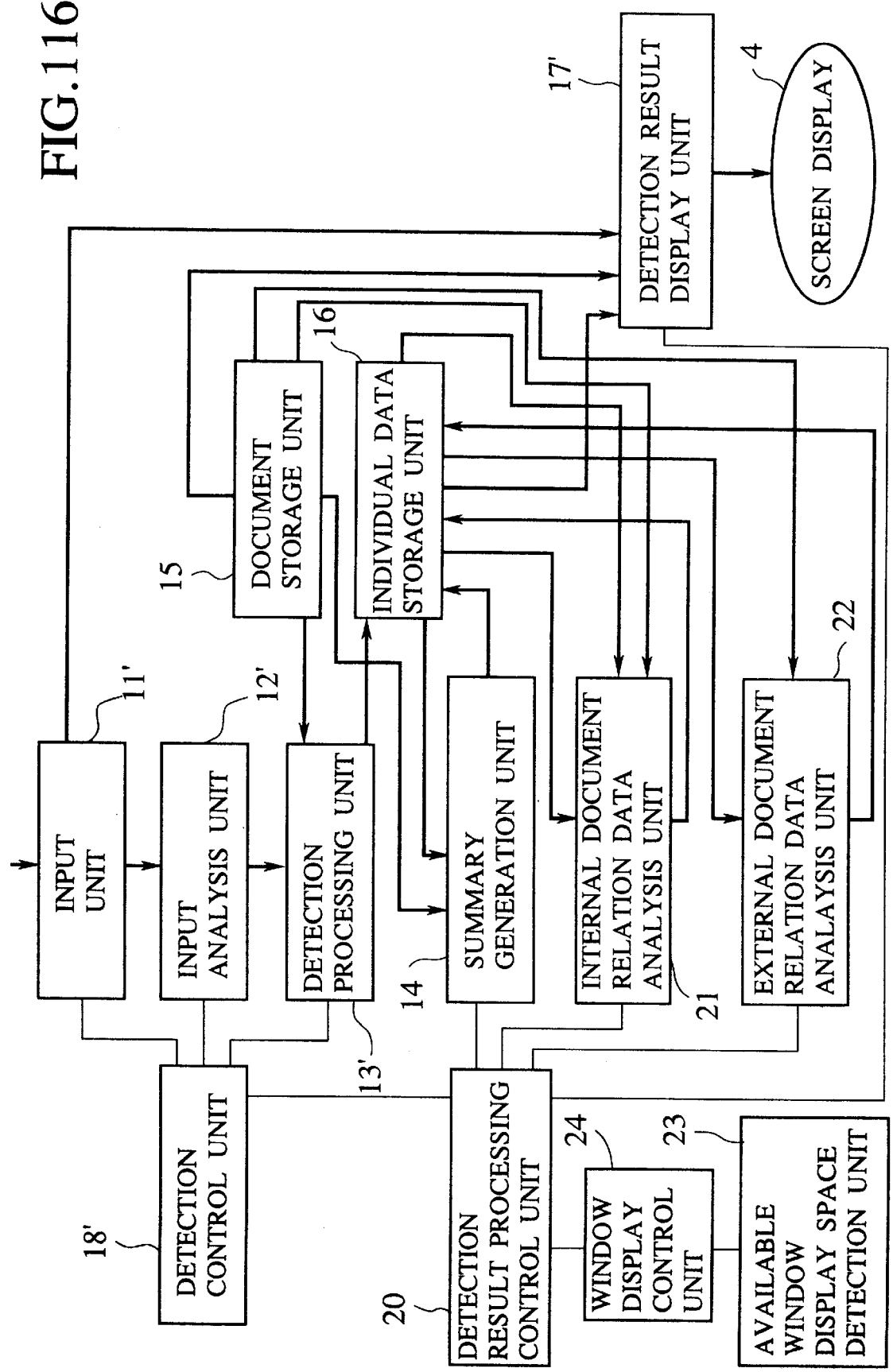
FIG. 116 is a block diagram for a functional configuration of a main part of the document detection system in the ninth variation of the second embodiment.

In this ninth variation, the functional configuration of FIG. 66 for the second embodiment described above is modified as shown in FIG. 116 to incorporate an available window display space detection unit 23 and a window display control unit 24 connected between the available window display space detection unit 23 and the detection result processing control unit 20.

This available window display space detection unit 23 detects a size of space available in the display window for the display of the summaries, and supplies the detected amount to the window display control unit 24.

The window display control unit 24 compares the size (size 1) supplied from the available window display space detection unit 23 with the size (size 2) of the summary currently generated by the summary generation unit 14 obtained through the detection result processing control unit 20, and commands the detection result processing control unit 20 to transfer the summary currently generated by the summary generation unit 14 to the detection result output unit 17' when the size 2 exceeds the size 1.

After that, the summary generation unit 14 continues its summary generation operation to generate the other summaries for the other detected documents, and these other summaries are transferred to the detection result output unit 17' when their transfer is requested from the detection result output unit 17'.

In this manner, in this ninth variation, the summary generated by the summary generation unit 14 can be displayed as soon as the size of the summary reaches to that of the available window display space, without waiting for the completion of the summary generation operation for all the detected documents, such that the handling of the system can be improved.

Next, the tenth variation concerning a detection processing for the summary as the detection target will be described.

Figure 117:
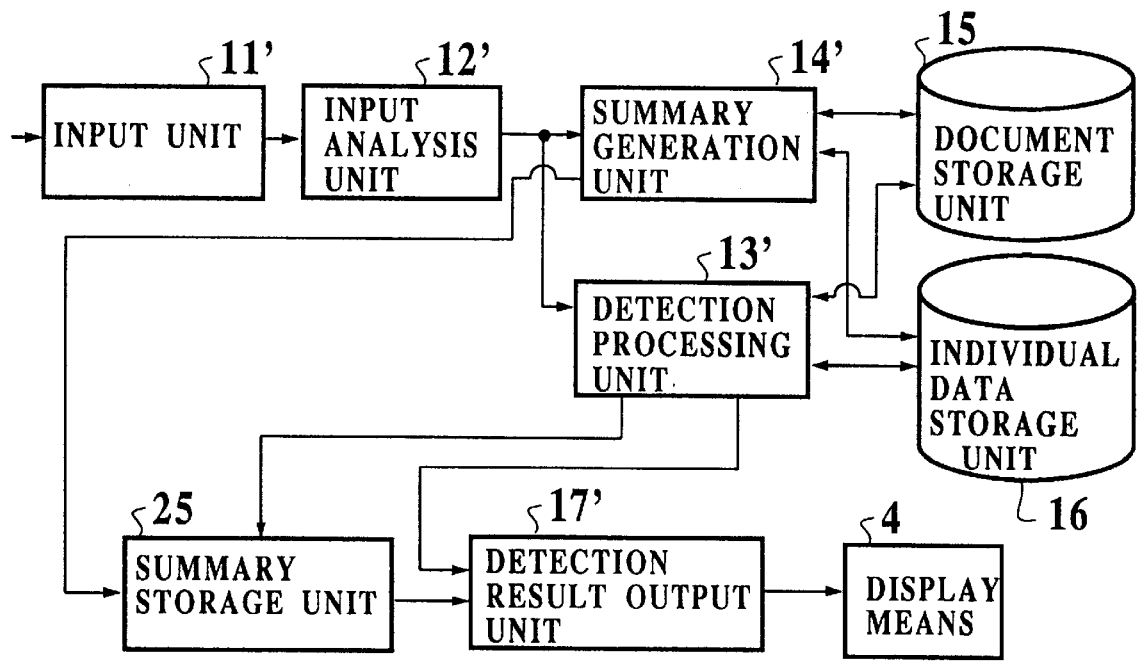
FIG. 117 is a block diagram for a functional configuration of a main part of the document detection system in the tenth variation of the second embodiment.

In this tenth variation, the system has a schematic configuration as shown in FIG. 117, which incorporates a summary storage unit 25 connected with the detection processing unit 13', the summary generation unit 14, and the detection result output unit 17'.

In this configuration of FIG. 117, the summary generation unit 14 generates the summaries for all the documents stored in the document storage unit 15 in advance, and stores the generated summaries in the summary storage unit 25.

Then, the detection processing unit 13' carries out the detection processing for the summary as the detection target, so as to select the appropriate summary to be displayed at the display means 4 through the detection result output unit 17'. Here, the detection processing unit 13' possesses the data indicating the correspondences between the detected summary and the original document in the document storage unit 15, so that the original document corresponding to the detected summary can also be displayed easily.

Figure 118:
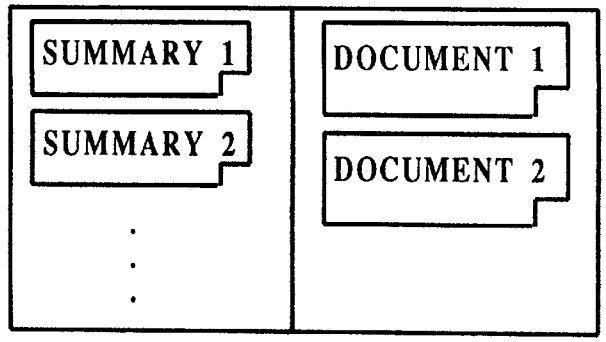
FIG. 118 is an illustration of a possible manner of detection result display in the document detection system according to the present invention.

It is to be noted that, in the second embodiment and its variations described above, it is possible to display the summaries and the original documents in correspondence on the screen display as shown in FIG. 118. In such a case, the summaries and the original documents should be scrolled together automatically to maintain their correspondence on the screen display.

As described in detail above, according to the second embodiment and its variations, the detection result can be displayed in the desired viewpoint specified by the user, so that it becomes possible to provide a document detection system capable of automatically preparing and displaying a document summary for each document in a viewpoint which is efficiently comprehensible for the user, considering the limited visual data processing ability of the human user, such that the user can make a judgement concerning the appropriateness of the detection result quickly. In addition, the summaries generated at a time of the detection result display are stored in correspondence to the original documents, so that there is no need to generate the summaries again in the subsequent operations and consequently the subsequent processing time can be reduced considerably.

It is to be noted further that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A document detection system, comprising:

input means for entering a detection command containing detection keywords specified by a user;

document storage means for storing a plurality of detection target documents;

summary generation means for generating a summary of each detection target document stored in the document storage means, and extracting keywords of each detection target document from the summary of each detection target document; and detection processing means for identifying those detection target documents stored in the document storage means whose keywords extracted by the summary generation means match with the detection keywords in the detection command entered at the input means as detected documents and for retrieving the detected documents.

2. The system of claim 1, further comprising:

input analysis means for determining a semantic structure of the detection command containing natural language expressions entered by a user; and wherein the summary generation means also extracts a semantic structure of each sentence in the summary of each detection target document, and the detection processing means identifies those detection target documents whose keywords match with the detection keywords and whose summary contain the sentence structure extracted by the summary generation means which matches with the sentence structure of the detection command determined by the input analysis means.

* * * * *